US011949215B2

(12) United States Patent
Horgan

(10) Patent No.: US 11,949,215 B2
(45) Date of Patent: Apr. 2, 2024

(54) DEPTH GAUGE

(71) Applicant: Gary Anthony Horgan, Waltham, MA (US)

(72) Inventor: Gary Anthony Horgan, Waltham, MA (US)

(*) Notice: Subject to any disclaimer, the term of this patent is extended or adjusted under 35 U.S.C. 154(b) by 358 days.

(21) Appl. No.: 17/029,019

(22) Filed: Sep. 22, 2020

(65) Prior Publication Data

US 2021/0091547 A1 Mar. 25, 2021

Related U.S. Application Data

(60) Provisional application No. 63/063,278, filed on Aug. 8, 2020, provisional application No. 62/965,857, filed on Jan. 25, 2020, provisional application No. 62/903,890, filed on Sep. 22, 2019.

(51) Int. Cl.
*H02G 1/12* (2006.01)
*G01B 5/02* (2006.01)

(52) U.S. Cl.
CPC ............. *H02G 1/1204* (2013.01); *G01B 5/02* (2013.01)

(58) Field of Classification Search
CPC .. H02G 1/1212; H02G 1/1214; H02G 1/1295; H02G 1/005; H02G 1/1224; H02G 1/1204; G01B 5/02; G01B 3/30; B25B 7/02; B25B 7/14; B25B 7/18
USPC ............. 30/90.8, 90.1, 90.4, 90.6, 146, 294; 7/107, 127, 128, 129, 132, 158; 81/9.4, 81/9.44
See application file for complete search history.

(56) References Cited

U.S. PATENT DOCUMENTS

| | | | | |
|---|---|---|---|---|
| 2,346,315 A | * | 4/1944 | Levy ....................... | F21V 29/00 362/217.08 |
| 2,386,327 A | * | 10/1945 | Martin ................. | H02G 1/1214 30/91.2 |
| 3,796,115 A | * | 3/1974 | Dane .................... | H02G 1/1214 30/91.2 |
| 4,677,702 A | * | 7/1987 | Cairns ................ | H01R 43/0421 30/90.1 |
| 5,035,054 A | * | 7/1991 | Ellenberger ............ | B26B 29/04 24/304 |
| 5,328,411 A | * | 7/1994 | Thornton ................ | A63D 15/16 473/39 |

(Continued)

FOREIGN PATENT DOCUMENTS

| | | | | |
|---|---|---|---|---|
| CN | 204216511 U | * | 3/2015 | ........... H02G 1/1204 |
| CN | 204597212 U | * | 8/2015 | ........... H02G 1/1204 |

(Continued)

*Primary Examiner* — Ghassem Alie

(57) ABSTRACT

A depth gauge is provided that is configured to be removably coupled to a tool. The depth gauge having a gauge body, a coupling means to removably couple the gauge body to the tool and a fiducial on the gauge body whereby the fiducial signifies a distance between the fiducial and a portion of the tool. In some embodiments, the coupling means comprises a magnet. In some embodiments, the tool is a wire stripper whereby when the wire stripper is actuated on a coated wire, the wire stripper cuts a portion of the wire coating equal to the distance defined by the fiducial. In some embodiments, the fiducial comprises an abutment protruding from the gauge body. In some embodiments, the depth gauge has multiple fiducials and the gauge body and the fiducials are formed as one piece.

20 Claims, 47 Drawing Sheets

(56) References Cited

U.S. PATENT DOCUMENTS

| | | | | |
|---|---|---|---|---|
| 2009/0223060 A1* | 9/2009 | Zeitlin | .................... | B26B 11/00 |
| | | | | 30/124 |
| 2011/0035949 A1* | 2/2011 | Fesler | ..................... | B26B 13/22 |
| | | | | 30/233 |
| 2012/0017442 A1* | 1/2012 | King | ......................... | B26B 1/10 |
| | | | | 30/155 |
| 2014/0215830 A1* | 8/2014 | Ducret | ................ | H02G 1/1217 |
| | | | | 30/90.9 |
| 2015/0333492 A1* | 11/2015 | Campbell | ............ | H02G 1/1209 |
| | | | | 30/90.1 |
| 2016/0031112 A1* | 2/2016 | Nasrallah | ................ | B26B 11/00 |
| | | | | 30/128 |
| 2019/0058313 A1* | 2/2019 | Murg | ..................... | H02G 1/005 |
| 2019/0166984 A1* | 6/2019 | Wall | ........................ | A45F 5/021 |

FOREIGN PATENT DOCUMENTS

| | | | | | |
|---|---|---|---|---|---|
| CN | 105922299 A | * | 9/2016 | ................ | B43L 7/00 |
| CN | 207732365 U | * | 8/2018 | ........... | H02G 1/1204 |

\* cited by examiner

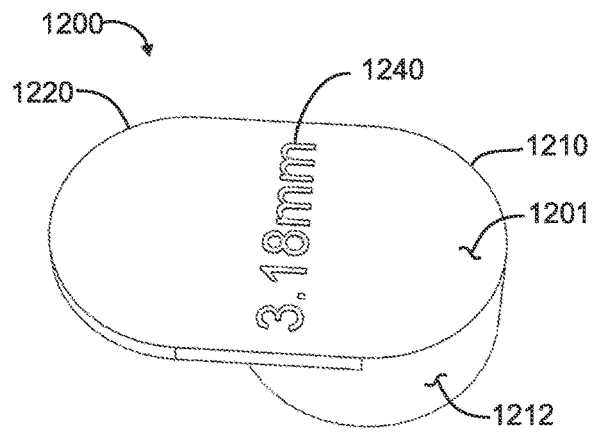
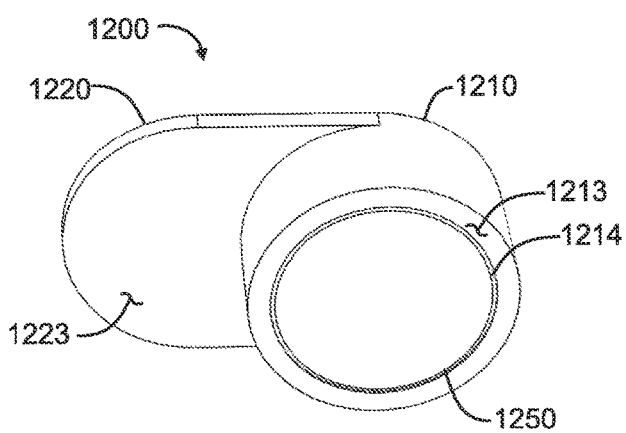
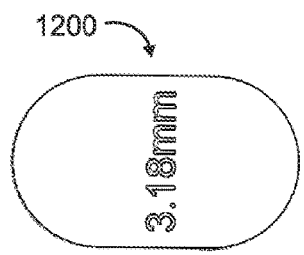
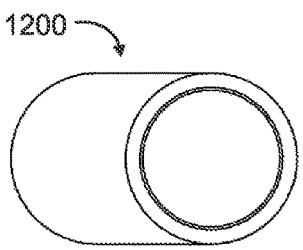
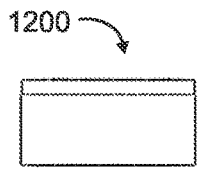
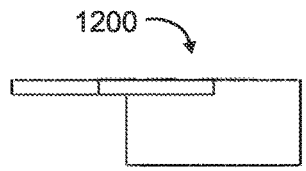
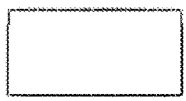
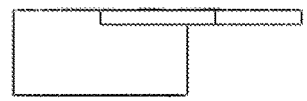

*FIG. 6A*
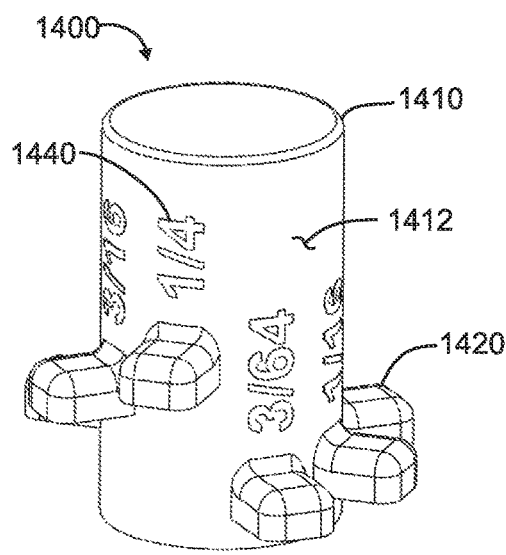
*FIG. 6B*
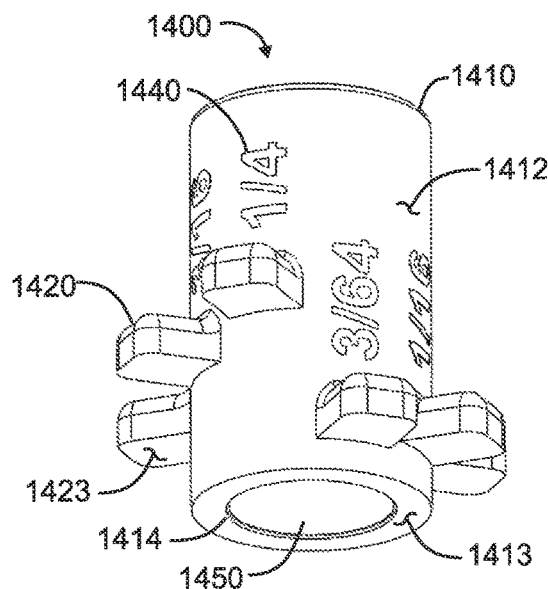
*FIG. 6C*
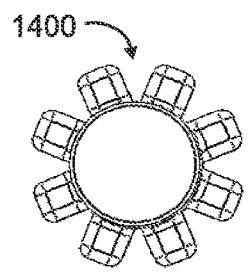
*FIG. 6D*
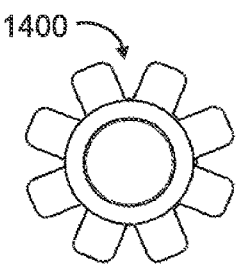
*FIG. 6E*   *FIG. 6F*   *FIG. 6G*   *FIG. 6H*
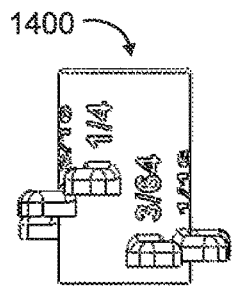 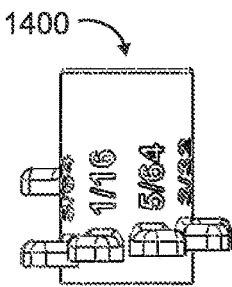 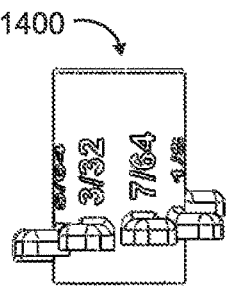 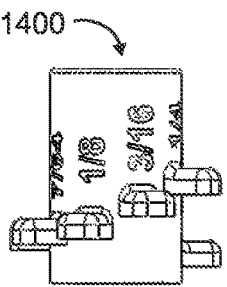

VIEW 10D - 10D

FIG. 11A
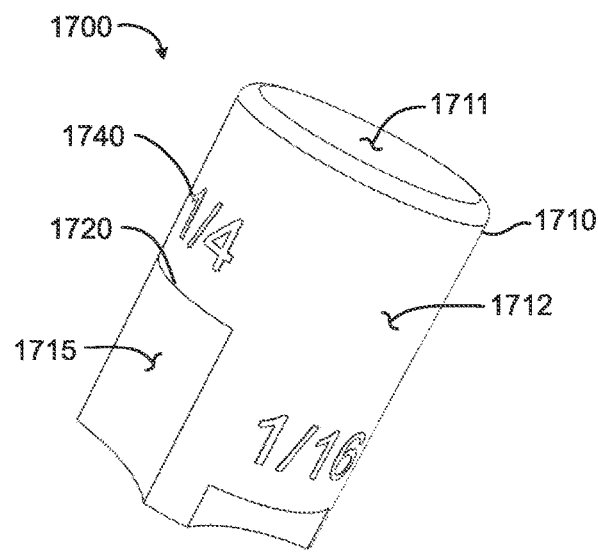
FIG. 11B
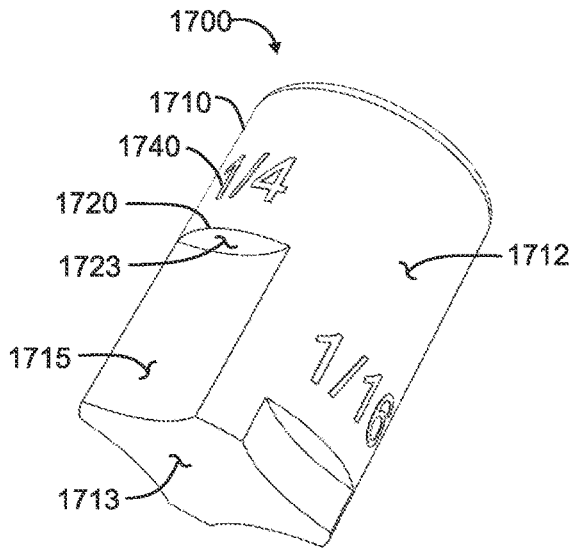
FIG. 11C
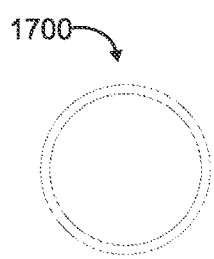
FIG. 11D
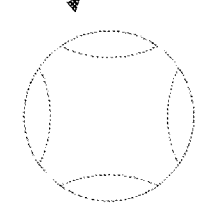
FIG. 11E    FIG. 11F    FIG. 11G    FIG. 11H
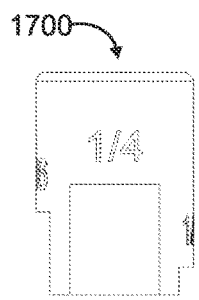    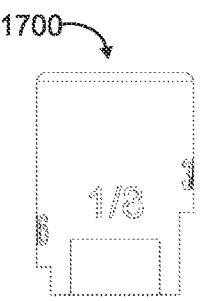  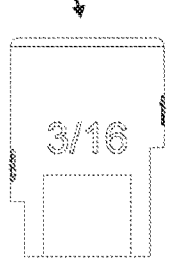

*FIG. 14A*
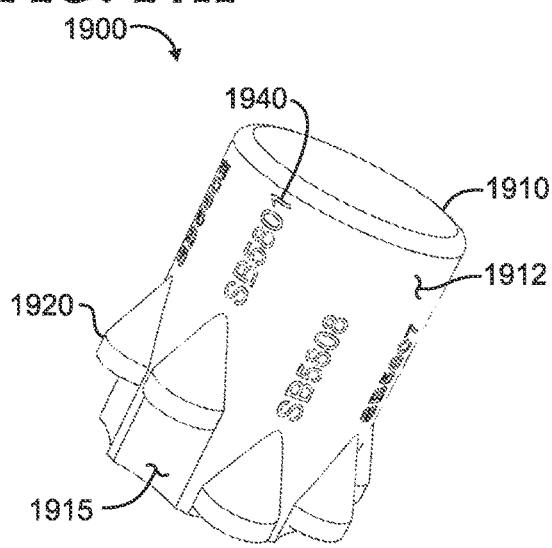
*FIG. 14B*
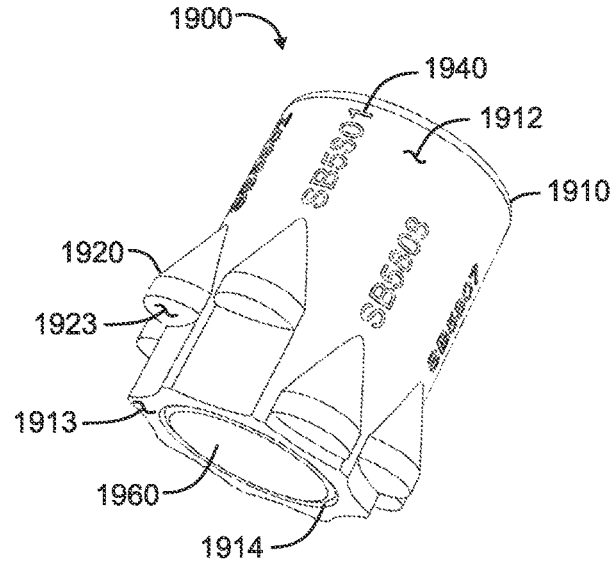
*FIG. 14C*
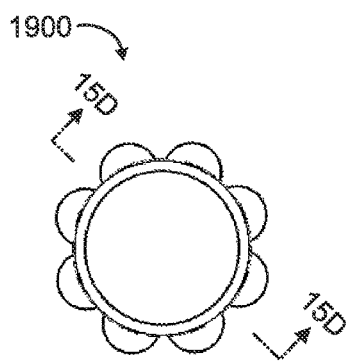
*FIG. 14D*
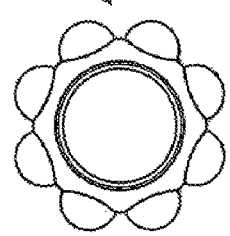
*FIG. 14E*  *FIG. 14F*  *FIG. 14G*  *FIG. 14H*
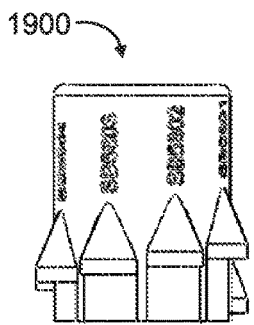 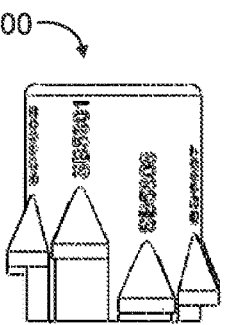 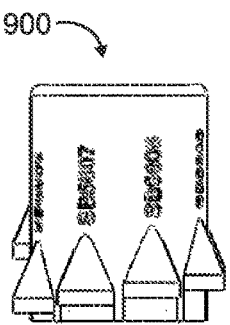 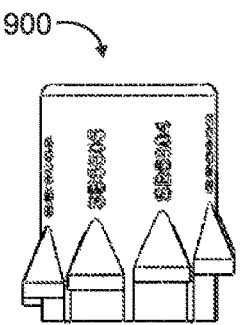

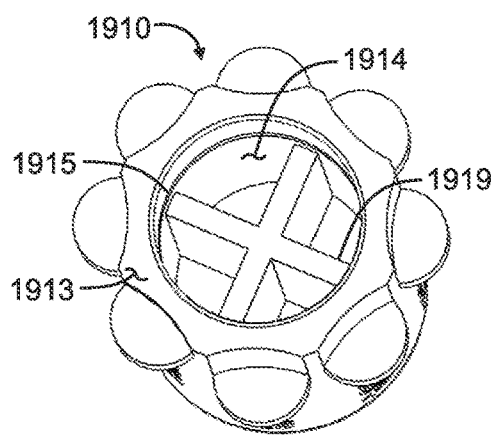
FIG. 15A
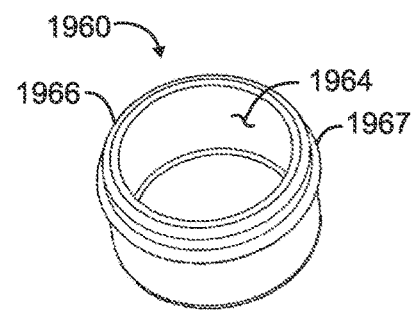
FIG. 15B
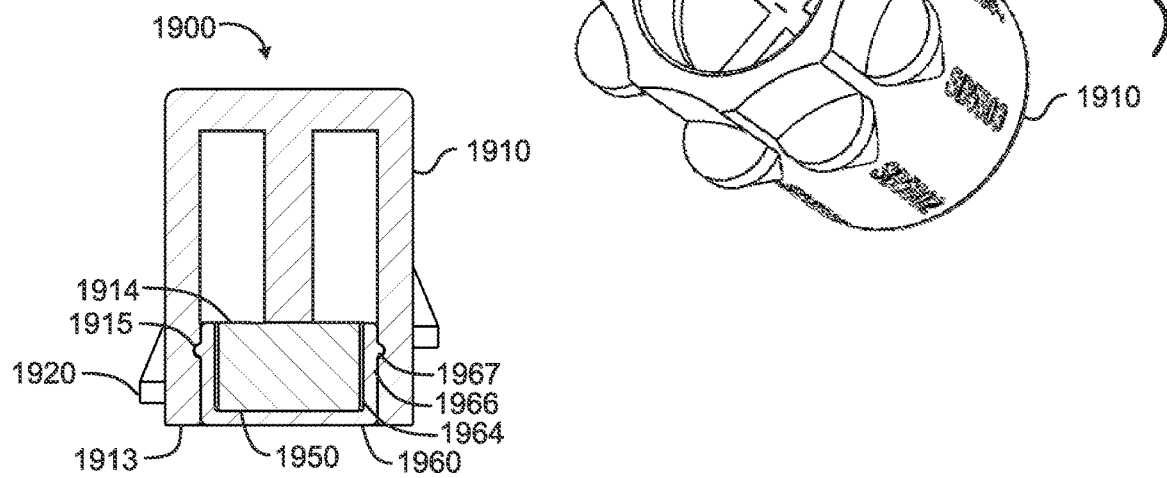
FIG. 15C
FIG. 15D
VIEW 15D - 15D

VIEW 22 - 22

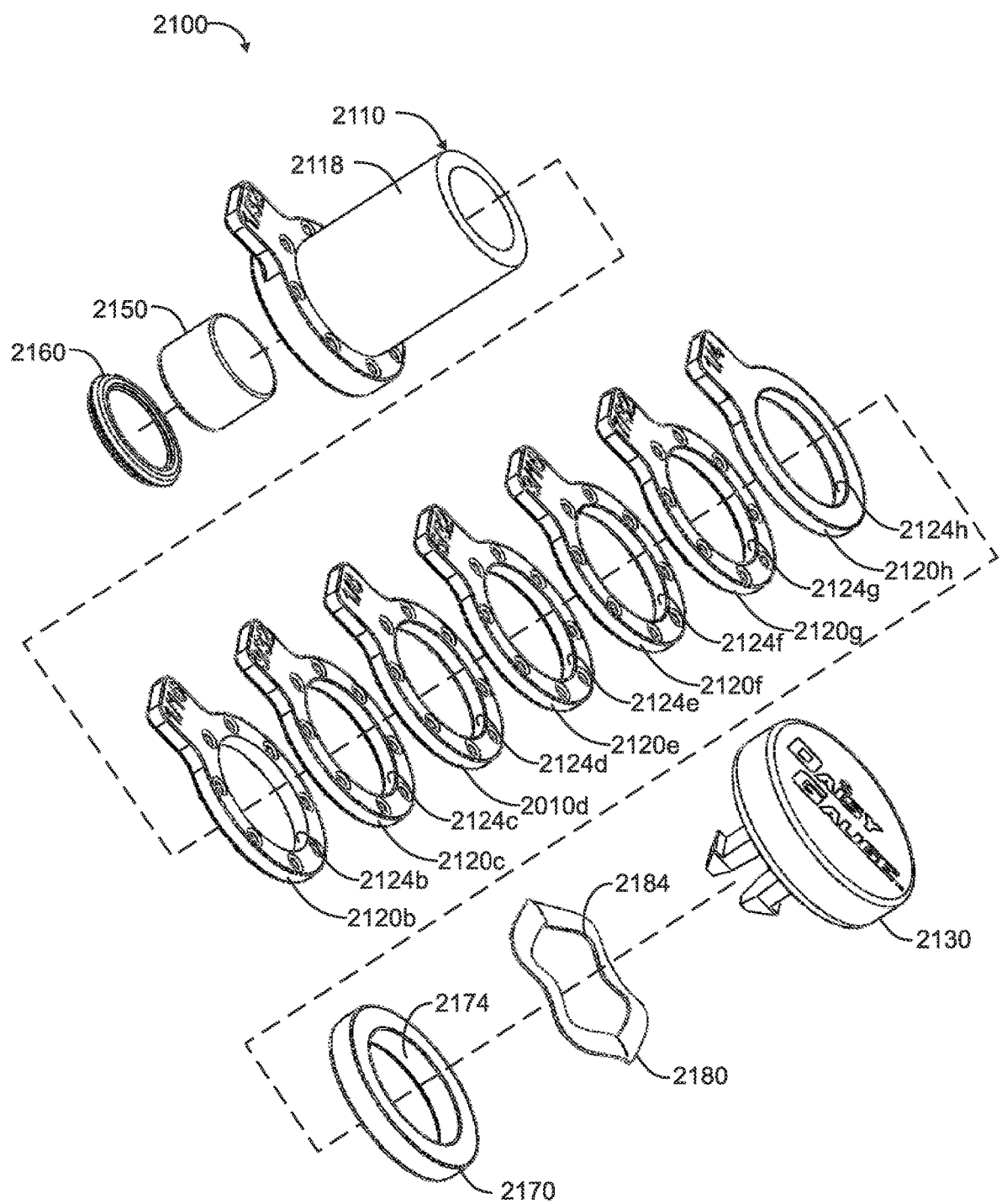

VIEW 28A - 28A

FIG. 29A
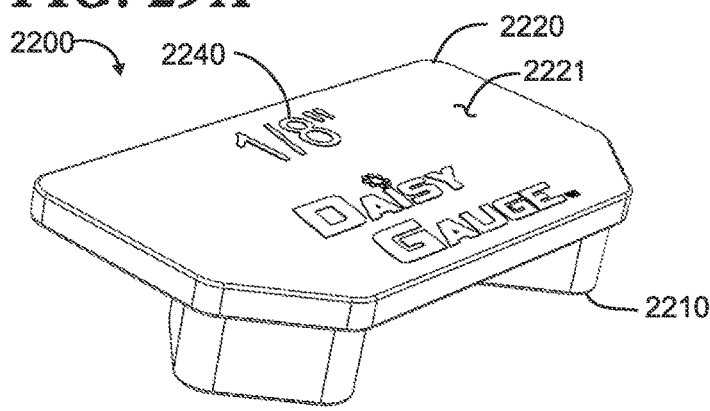
FIG. 29B
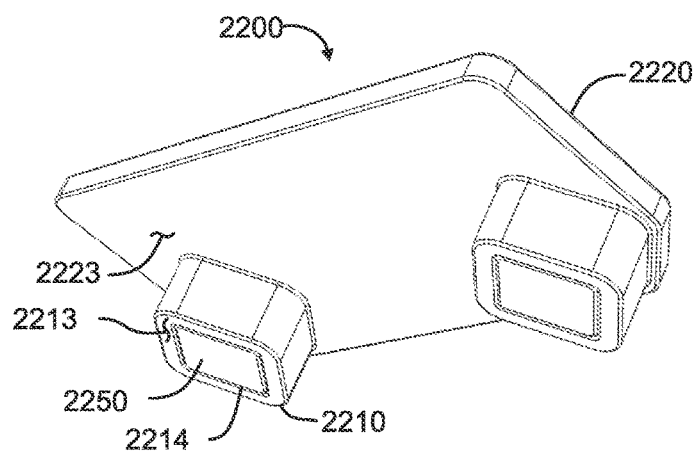
FIG. 29C
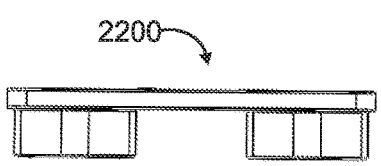
FIG. 29D
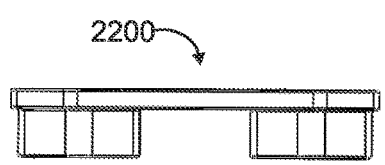
FIG. 29E FIG. 29F FIG. 29G FIG. 29H
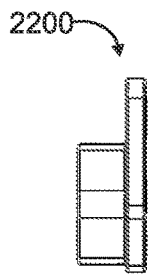 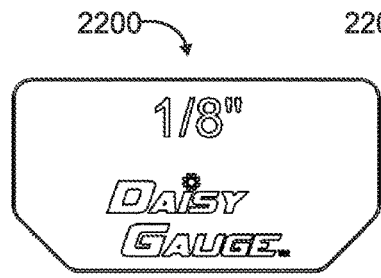 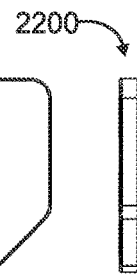 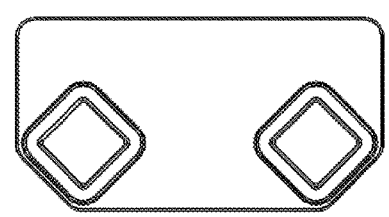

FIG. 30A
FIG. 30B
FIG. 30C
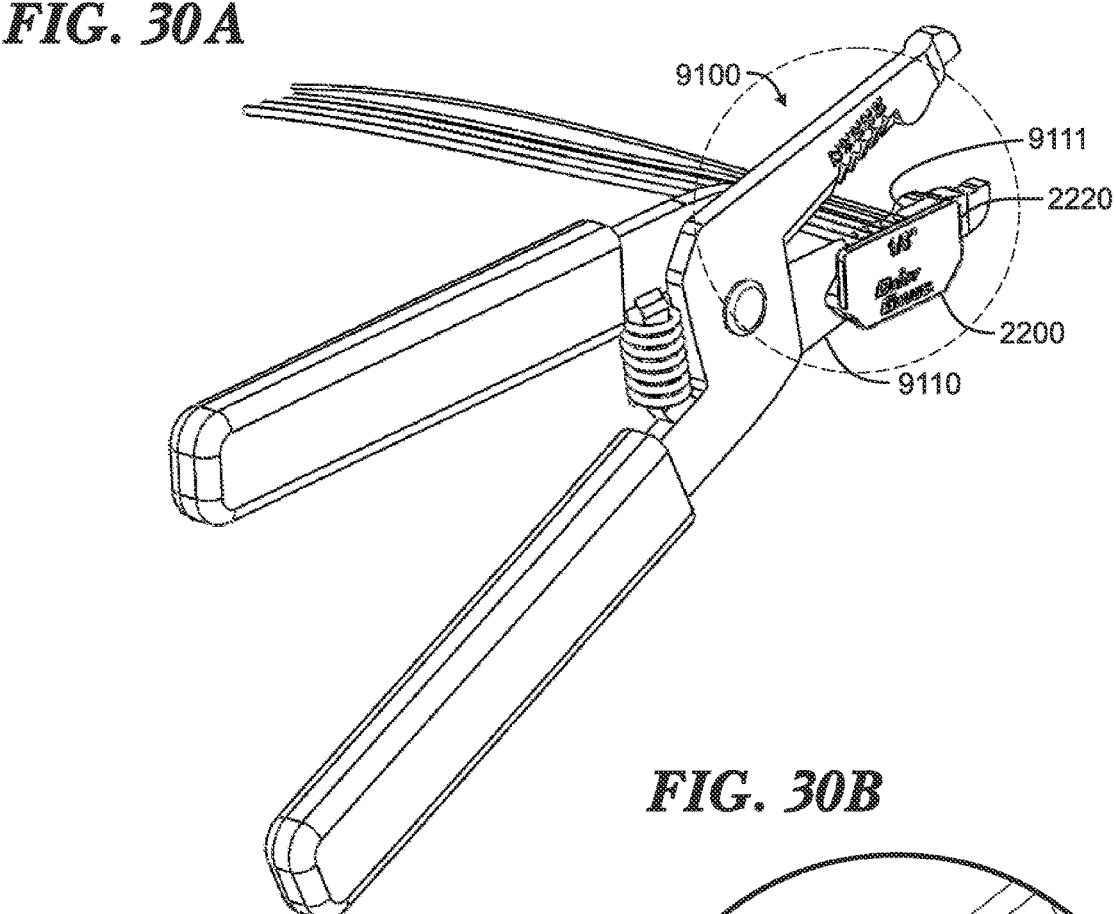
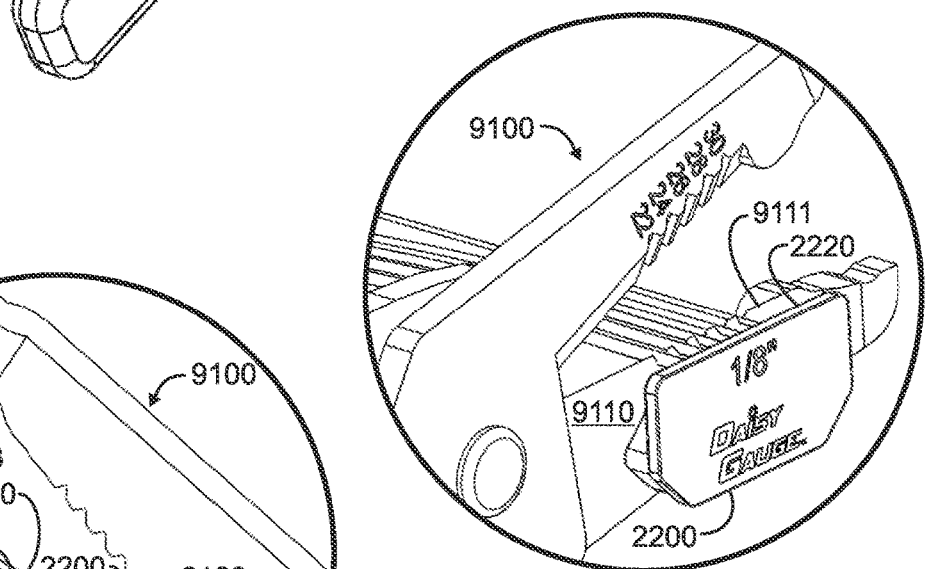
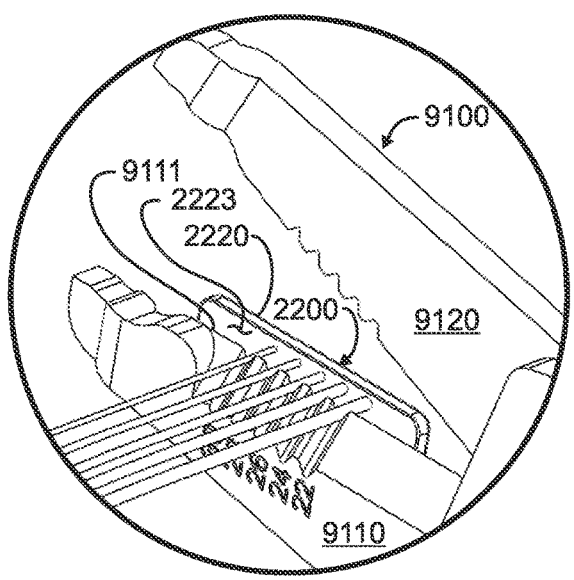

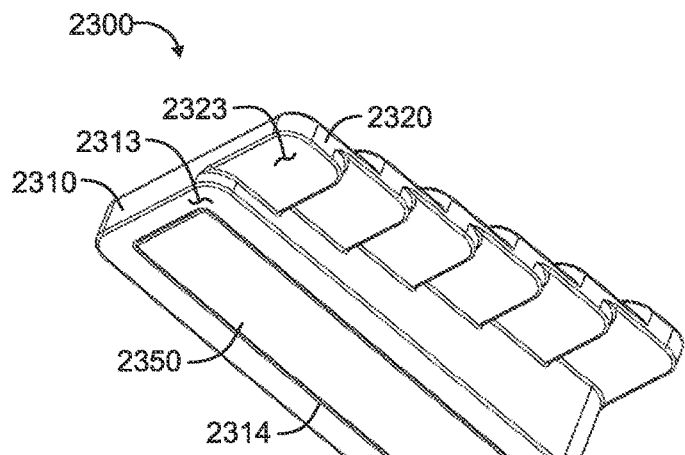
FIG. 31B
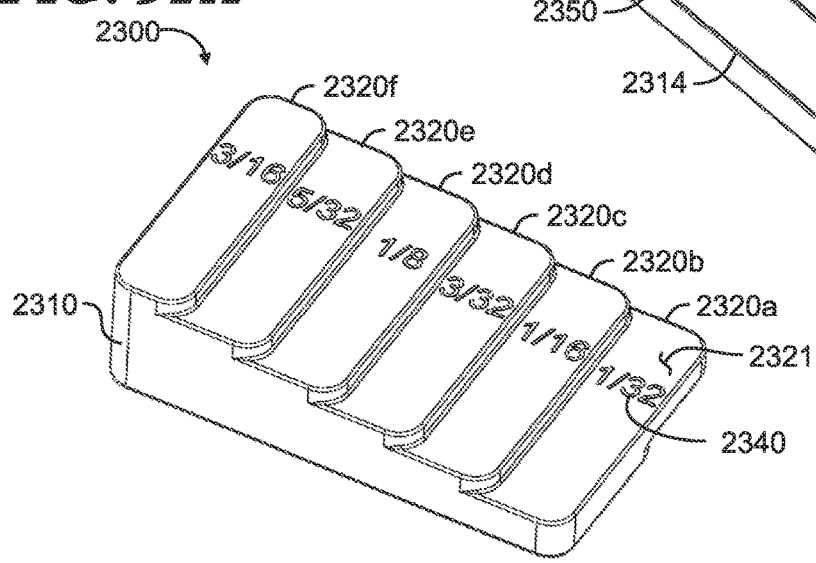
FIG. 31A
FIG. 31C
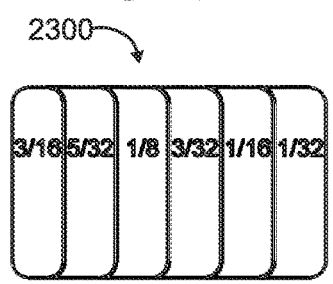
FIG. 31D
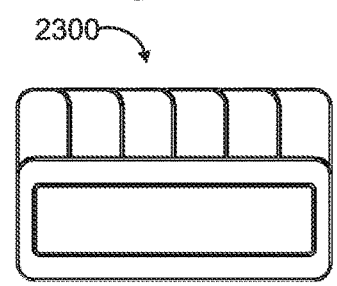
FIG. 31E
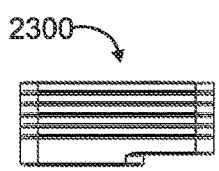
FIG. 31F
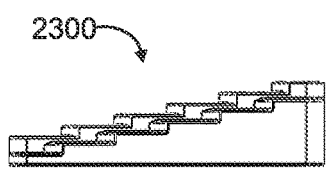
FIG. 31G
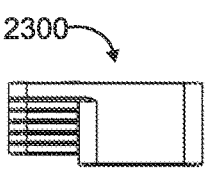
FIG. 31H
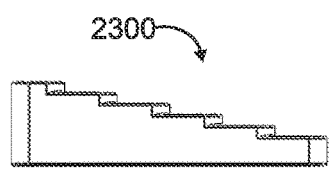

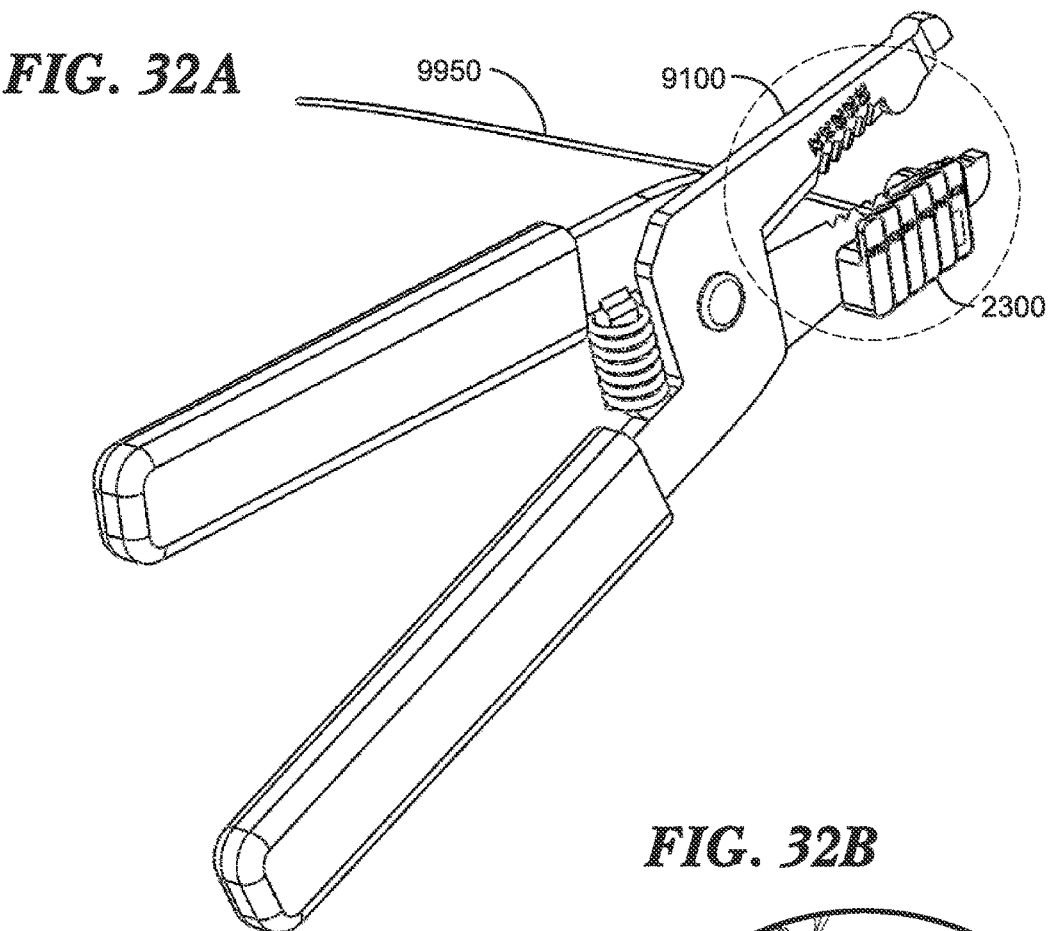
FIG. 32A
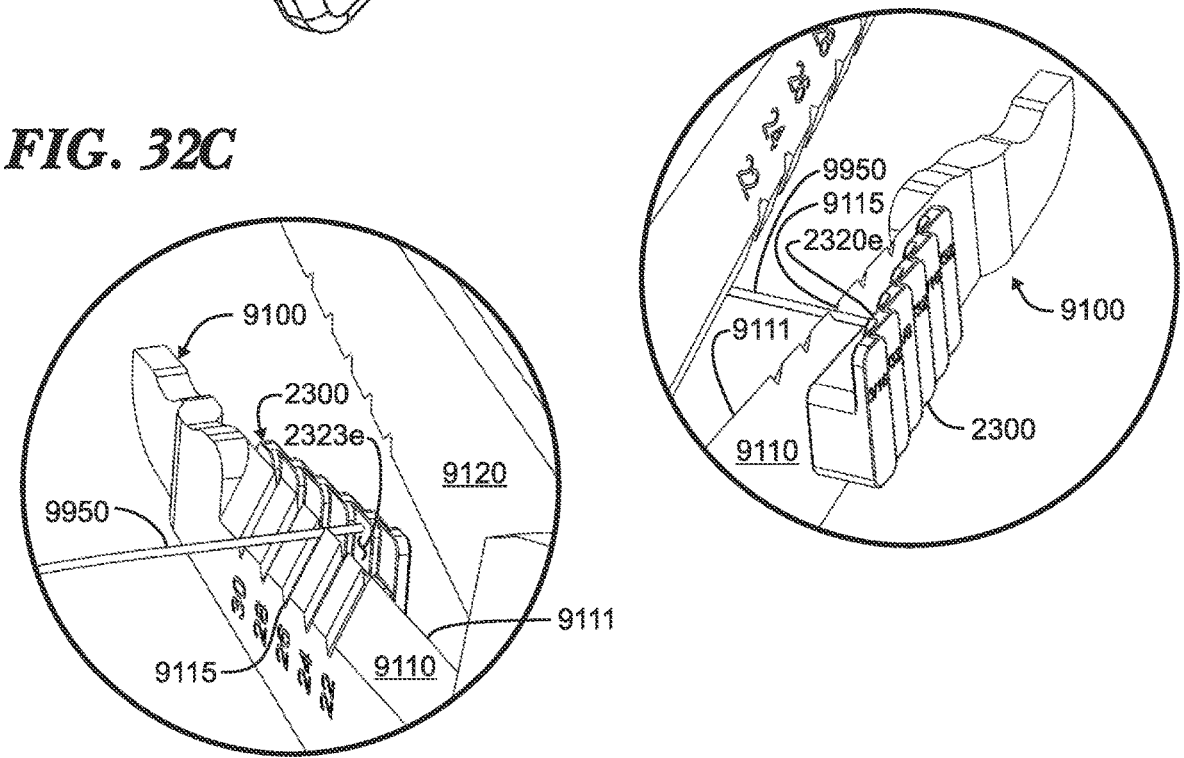
FIG. 32B
FIG. 32C

*FIG. 35B*
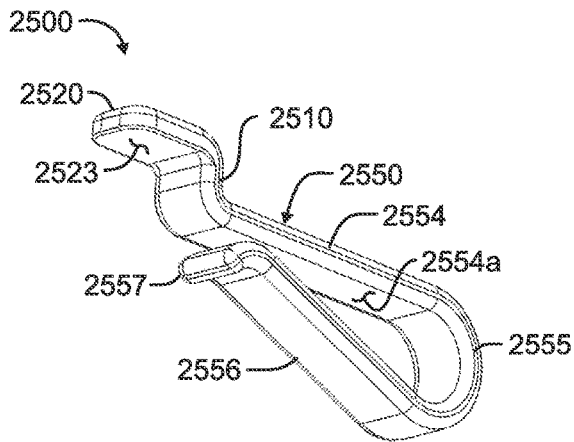
*FIG. 35A*
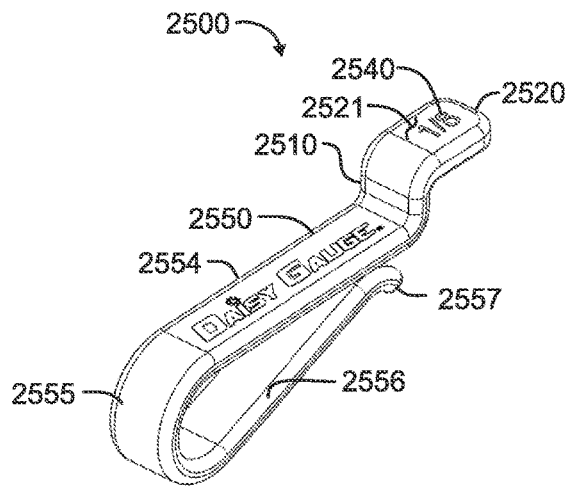
*FIG. 36*
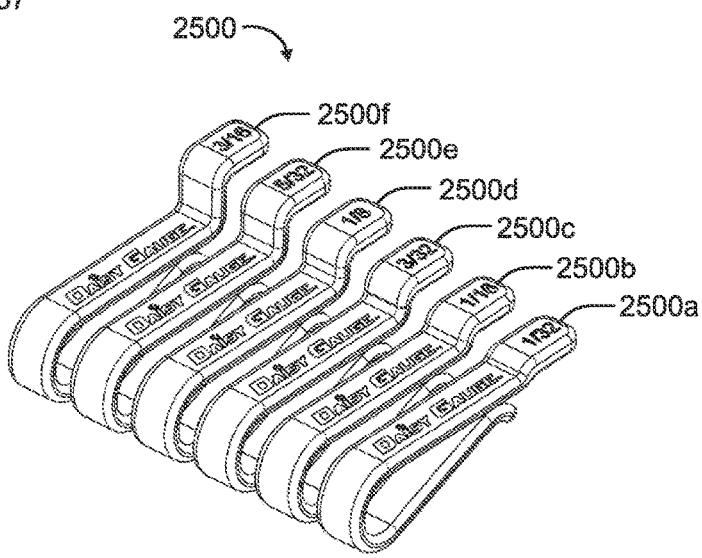
*FIG. 35C*
*FIG. 35D*
*FIG. 35E*   *FIG. 35F*   *FIG. 35G*   *FIG. 35H*
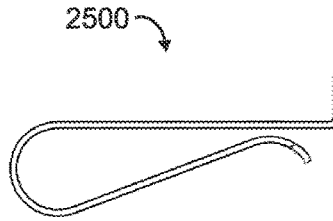 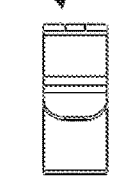 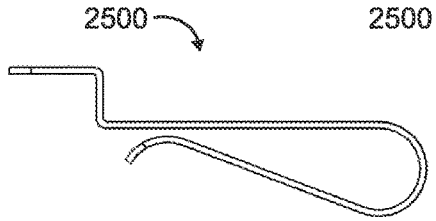 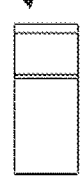

*FIG. 40A*
*FIG. 40B*
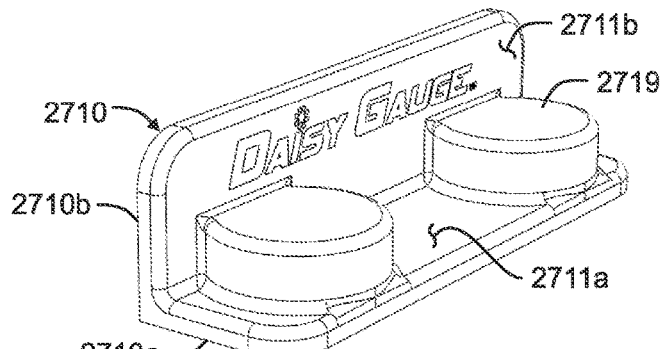
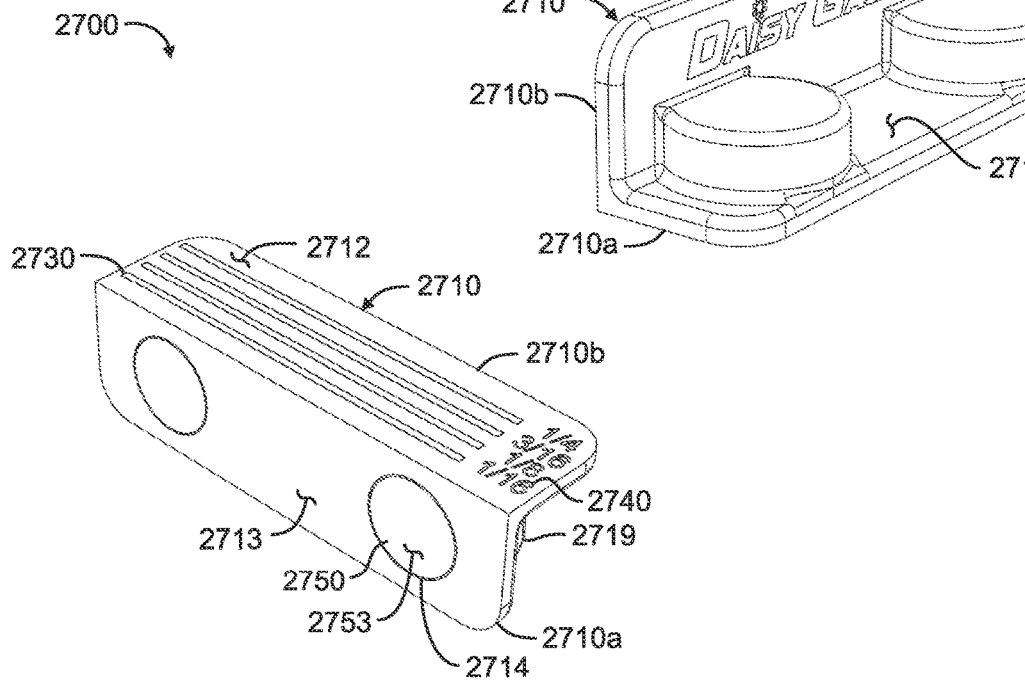
*FIG. 40C*
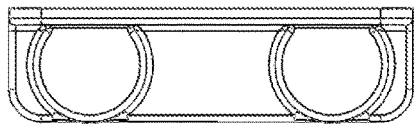
*FIG. 40D*
*FIG. 40E*  *FIG. 40F*  *FIG. 40G*  *FIG. 40H*
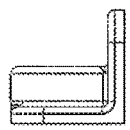 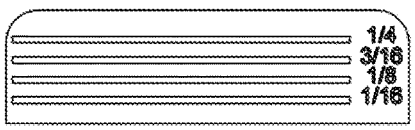 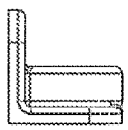 

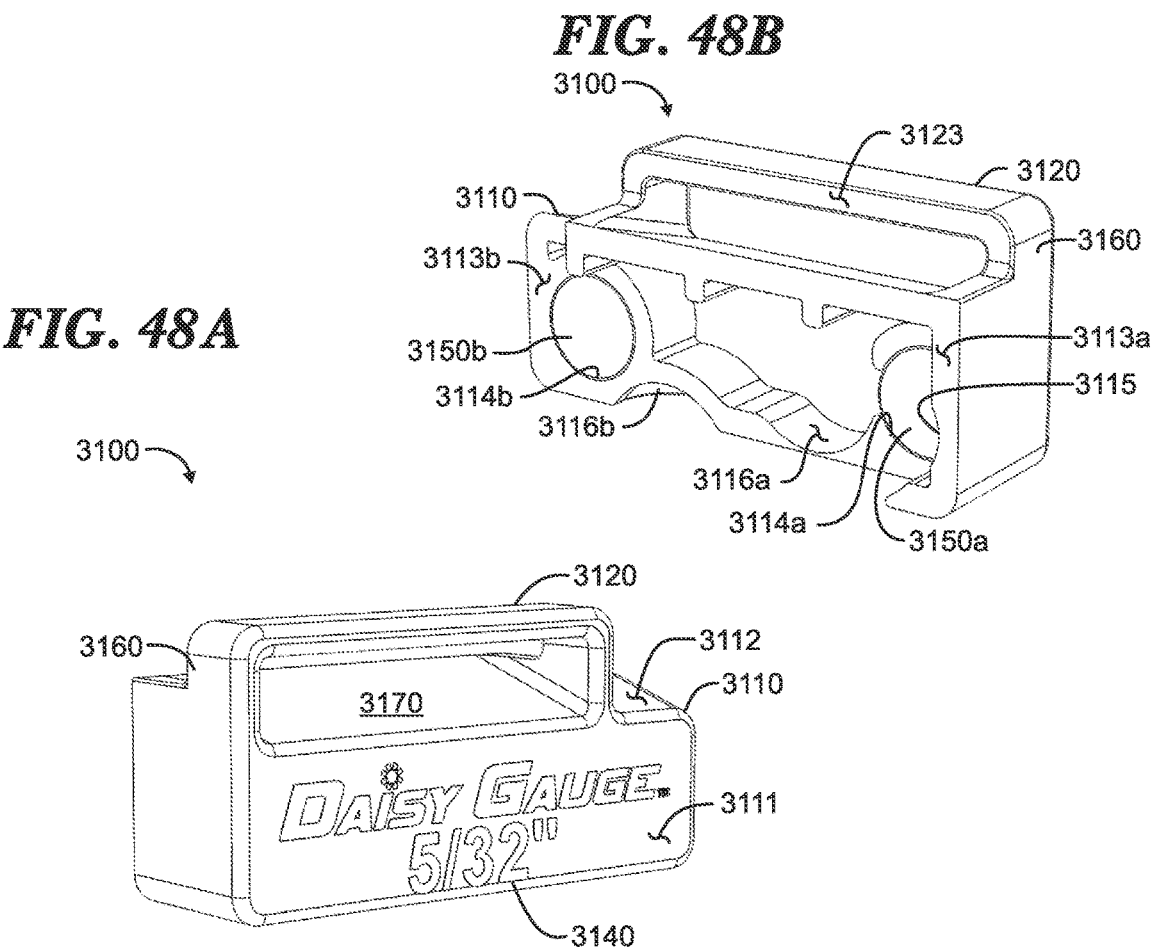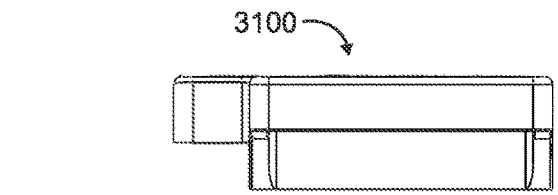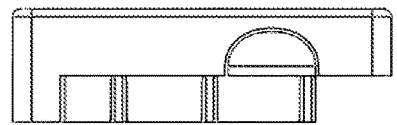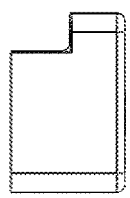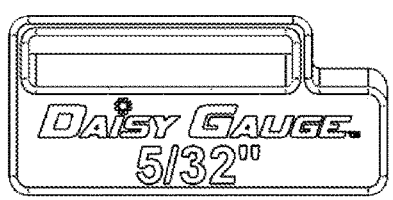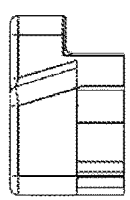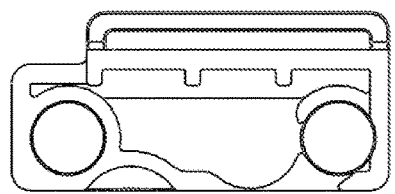

VIEW 54 - 54

DEPTH GAUGE

CROSS-REFERENCE TO RELATED APPLICATIONS

This application claims the benefit of U.S. App. No. 62/903,890, filed on Sep. 22, 2019, entitled "Depth Gauge for Wire Strippers—Supplement 01", U.S. App. No. 62/965,857, filed on Jan. 25, 2020, entitled "Depth Gauge for Wire Strippers—Supplement 02", and U.S. App. No. 63/063,278, filed on Aug. 8, 2020, entitled "Depth Gauge for Wire Strippers", the entire contents of all are incorporated herein by reference.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

This invention relates to tool fiducials, in particular, a positionable gauge to provide measuring reference points for use with tools such as cutting tools.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

In one embodiment, a depth gauge is configured to be removably coupled to a tool, wherein the depth gauge comprises, a gauge body, a coupling means to removably couple the gauge body to a portion of the tool, and a fiducial whereby the fiducial signifies a distance between the fiducial and a portion of the tool. In some embodiments, the fiducial is on the gauge body.

In some embodiments, the gauge body and coupling means comprises a magnet coupled to a fiducial made of a flat rigid material.

In some embodiments, the gauge body and the fiducial are formed as one integral component, and the coupling means comprising a magnetic coupling means partially encased within a gauge body.

In some embodiments, the gauge body and the fiducial are formed as one integral component, and the coupling means comprising a magnetic coupling means fully encased within the gauge body.

In some embodiments, the gauge body comprises a cylindrical gauge body, the coupling means comprising a magnetic coupling means and the fiducial comprising a plurality of fiducials protruding from the side of the gauge body.

In some embodiments, the gauge body comprises a cylindrical gauge body, the coupling means comprising a magnetic coupling means and the fiducial comprises a plurality of fiducials, with reinforcement plates coupled to their abutment faces, protruding from the side of the gauge body comprising a polygonal profile.

In some embodiments, the gauge body comprises cylindrical gauge body, having a magnetic coupling means and a plurality of fiducials protruding from the side of the gauge body, with a recess in its proximal end into which a magnet is disposed while having a cap that closes off the recess opening and holds the magnet in place at the distal end of the recess.

In some embodiments, the gauge body comprises a magnet gauge body and the fiducials wherein the fiducials are located at the ends of abutment channels formed on the surface of the magnet gauge body.

In some embodiments, the coupling means comprises a magnetic coupling means and the gauge body having a recess in its distal face into which a magnet is disposed while having a cap that closes off the recess opening and holds the magnet in place at the distal end of the recess and also having fiducials that are combination of protrusions and abutment channels.

In some embodiments, the coupling means comprises a magnetic coupling means and the fiducials comprise a plurality of stacked rotational fiducials positioned around a tubular gauge body.

In some embodiments, the coupling means comprises a magnetic coupling means and the fiducials comprise a plurality of stacked indexed rotational fiducials, with indexing dimples, positioned around the tubular gauge body In some embodiments, the gauge body comprises two gauge bodies each having a magnetic coupling means disposed within and one fiducial spanning the two gauge bodies In some embodiments, the coupling means comprises a magnetic coupling means and the gauge body comprises a rectangular gauge body comprising a plurality of graduated plateaus each having a fiducial protruding from at least one side that are planer with their respective plateau, resembling a staircase with stair treads protruding from at least one side.

In some embodiments, the coupling means comprises a pinch clip coupling means supporting a planar gauge body defining a plurality of graduated plateaus each having a fiducial protruding from its side that are planer with their respective plateau, resembling a staircase.

In some embodiments, the coupling means comprises a pinch clip coupling means supporting a planar gauge body defining a fiducial protruding horizontally from its top edge.

In some embodiments, the coupling means comprises a magnetic coupling means and the fiducials comprise a plurality of visual fiducials marked on the side of the gauge body.

In some embodiments, the depth gauge comprises a magnetic coupling means and a gauge body comprising an angle channel with two magnet housings formed on the coupling face while visual fiducials and visual indicators are marked on the adjacent outer face.

In some embodiments, the coupling means comprises a pinch clip coupling means and the gauge body comprising a planar gauge body defining a plurality of visual fiducials and visual indicators marked on its outer face.

In some embodiments, the coupling means comprises a magnetic coupling means and the gauge body having a gauge body coupling face contoured to conform to the irregular multifaceted surface of a tool while, having a planar fiducial positioned parallel with the coupling faces of the gauge body.

In some embodiments, the coupling means comprises a magnetic coupling means and the gauge body having a gauge body coupling face contoured to conform to the irregular multifaceted surface of a tool while, a plurality of vertical planar fiducials are positioned on a sloped top side surface perpendicular to the coupling faces of the gauge body.

In some embodiments, the coupling means comprises a magnetic coupling means and the gauge body having a gauge body coupling face contoured to conform to the irregular multifaceted surface of a tool while, having a horizontal planar fiducial positioned parallel with the coupling faces of the gauge body.

In some embodiments, the coupling means comprises a magnetic coupling means and the gauge body having a gauge body coupling face contoured to conform to the irregular multifaceted surface of a tool, while having a plurality of visual fiducials and visual indicators marked on the top side surface of the gauge body positioned parallel with the coupling faces of the gauge body.

In some embodiments, the gauge body comprises cylindrical gauge body, having a magnetic coupling means and a helical compound fiducial, comprising a continuous circumferential protrusion, defining multiple abutment faces formed into its distal surface, protruding from the side of the gauge body, with a recess formed in its distal end extending to its proximal end into which a magnet is disposed while a plurality of ribs formed within the recess serve to position the magnet at the desired depth within the recess.

Other objects, features, and advantages of the techniques disclosed in this specification will become more apparent from the following detailed description of embodiments in conjunction with the accompanying drawings.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A-3H show another example embodiment of a depth gauge having a magnetic coupling means partially encased within a gauge body;

FIGS. 6A-6H show another example embodiment of a depth gauge having a magnetic coupling means and a plurality of fiducials protruding from the side of the gauge body;

FIGS. 11A-11H show another example embodiment of a depth gauge having a magnet gauge body and fiducials wherein the fiducials are located at the ends of abutment channels formed on the surface of the magnet gauge body;

FIGS. 14A-14H show another example embodiment of a depth gauge having a magnetic coupling means with a recess in its distal face into which a magnet is disposed while having a cap that closes off the recess opening and holds the magnet in place at the distal end of the recess and also having fiducials that are combination of protrusions and abutment channels;

FIG. 15A shows a perspective view of the gauge body, having abutment channels and protrusions combining to create fiducials on the depth gauge shown in FIGS. 14A-14H;

FIG. 15B shows a perspective view of the magnet retaining cap of the depth gauge shown in FIGS. 14A-14H;

FIG. 15C shows an exploded view of the depth gauge shown in FIGS. 14A-14H;

FIG. 15D shows cross-sectional view 15D-15D of the depth gauge shown in FIG. 14C;

FIG. 27 shows an exploded view of the depth gauge shown in FIGS. 23A-23B;

FIGS. 29A-29H show another example embodiment of a depth gauge having two gauge bodies each having a magnetic coupling means disposed within, and one fiducial spanning the two gauge bodies;

FIGS. 30A-30C show an example method of using the depth gauge shown in FIGS. 29A-29H;

FIGS. 31A-31H show another example embodiment of a depth gauge having a magnetic coupling means and having a rectangular gauge body comprising a plurality of graduated plateaus each having a fiducial protruding from at least one side that are planer with their respective plateau, resembling a staircase with stair treads protruding from at least one side;

FIGS. 32A-32C show an example method of using the depth gauge shown in FIGS. 31A-31H;

FIGS. 35A-35H show another example embodiment of a depth gauge having a pinch clip coupling means supporting a planar gauge body defining a fiducial protruding horizontally from its top edge;

FIG. 36 shows a set of six example depth gauges having a variety of strip depths;

FIGS. 40A-40H show another example embodiment of a depth gauge having a magnetic coupling means and having a gauge body comprising an angle channel with two magnet housings formed on the coupling face while visual fiducials and visual indicators are marked on the adjacent outer face;

FIGS. 48A-48H show another example embodiment of a depth gauge having a magnetic coupling means and a gauge body coupling face contoured to conform to the irregular multifaceted surface of a tool, while having a horizontal planar fiducial positioned parallel with the coupling faces of the gauge body;

DETAILED DESCRIPTION OF THE INVENTION

Figure 1A:
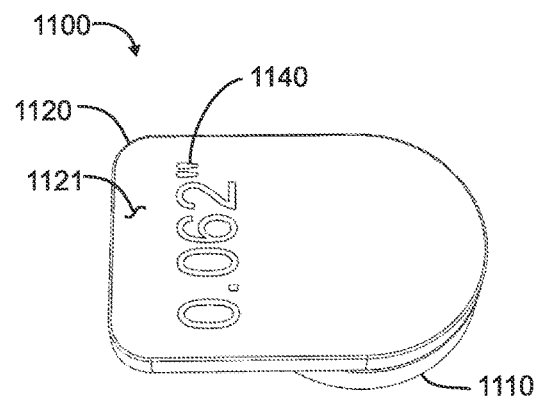
FIGS. 1A-1H show an example embodiment of a depth gauge having a thin rigid piece of material coupled to, and is wider than, a magnet that serves as a gauge body and as a coupling means.

COPYRIGHT NOTICE: A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright © 2019-2020, Gary A. Horgan, All Rights Reserved.

Abutment Face: as used herein, in addition to the definitions of the term as used in the art, "abutment face" shall mean the distal surface of a fiducial that protrudes from, and/or is cut into, the outer surface of a gauge body.

Coated Wire: as used herein, in addition to the definitions of the term as used in the art, "coated wire" shall mean any type of coated wire, such as but not limited to, insulated electrical wire, wire coated with identifying colors, or wire coated with information and/or designs.

Coupling Face: as used herein, in addition to the definitions of the term as used in the art, "coupling face" shall mean the distal surface of a gauge body that couples to a tool.

Cylindrical: as used herein, in addition to the definitions of the term as used in the art, "cylindrical" shall mean the surface traced by a straight line moving parallel to a fixed straight line and intersecting a fixed planar closed shape at both ends; the fixed planar closed shape may be curved, polygonal, or a combination of both.

Fiducial: as used herein, in addition to the definitions of the term as used in the art, "fiducial" shall mean any mark, landmark, surface, protrusion or other physical device capable of serving as a fixed basis of comparison or reference from the fiducial to another location.

Fiducial, Compound: as used herein, in addition to the definitions of the term as used in the art, "compound fiducial" shall mean any mark, landmark, surface, protrusion or other physical device having multiple features (i.e. abutment faces, marked lines) as fixed bases of comparison or reference from each feature to another location.

Fiducial, Visual: as used herein, in addition to the definitions of the term as used in the art, "visual fiducial" shall mean any visual mark capable of serving as a fixed basis of comparison or reference from the visual fiducial to another location.

Gauge Body: as used herein, in addition to the definitions of the term as used in the art, "gauge body" shall mean the portion of a depth gauge that integrates, supports or otherwise couples other elements of embodiments of the depth gauge such as, but not limited to, fiducials, visual identifiers, and coupling means.

Magnet: as used herein, in addition to the definitions of the term as used in the art, "magnet" shall mean any type of magnet used commercially such as, but not limited to, neodymium, ceramic, ferrite, iron boron, or alnico magnets.

Marked: as used herein, in addition to the definitions of the term as used in the art, "marked" shall mean, a) any type of alphanumeric symbol, symbol, or other image displayed on a surface, created in a different color, or colors, than the surface color of which it is displayed; b) any type of alphanumeric symbol, symbol, or other image formed on a surface, that is engraved, or embossed, on the surface of which it is formed; or, c) a combination of both a) and b) above.

Proximal: as used herein, in addition to the definitions of the term as used in the art, "proximal" shall mean the near portion of an object; Situated close to an object or feature.

Distal: as used herein, in addition to the definitions of the term as used in the art, "distal" shall mean: the far portion of an object.

Strip Depth: as used herein, in addition to the definitions of the term as used in the art, "strip depth" shall mean the distance between a depth gauge fiducial and its coupling face; The distance, when properly coupled to a tool, between a depth gauge fiducial and the stripping edge of the tool; The length of coating that will be stripped from a coated wire when the depth gauge is used as intended with wire strippers, or any other cutting or stripping tool.

Visual Identifier: as used herein, in addition to the definitions of the term as used in the art, "visual identifier" shall mean the information marked on the outer surface of a gauge body or fiducial that conveys information relative to the position of a fiducial in relation to a coupling face of a gauge body, or the stripping edge of a wire stripper.

Generally, the depth gauge comprises a gauge body, a coupling means, a fiducial, and a visual identifier.

The gauge body may comprise any type of structure capable of being coupled to a tool and provide a structure to maintain the fiducial in a fixed position relative to a portion of a tool. For example only, and not for limitation, the gauge body may comprise a cylindrical shape consisting of a curved profile, a polygonal profile, or a combination of both. In another example the gauge body may have a planar shape. In yet another example the gauge body may have a rectangular shape.

The coupling means may comprise any type of device used to couple the gauge body to the portion of the tool. In a preferred embodiment, the coupling means is configured to removably couple the gauge body to the tool. For example only, and not for limitation, the coupling means may comprise at least one magnet embedded or concealed within the gauge body configured to couple the gauge body to the surface of a metal tool. In another example the coupling means may comprise a pinch type clip. The coupling means may also comprise any type of fastener such as clips, buttons, snaps, screws, rivets, nuts and bolts, hook and loop fasteners or other types of fasteners configured to couple the gauge body to a tool. The coupling means may also comprise a permanent type of fastener such as glues, epoxies, welding or any other type of permanent adhesive.

The fiducial may comprise any type of mark or structure capable of providing a fixed reference point between the fiducial and a portion of the tool. For example only, and not for limitation, the fiducial may comprise a physical abutment protruding from the side of the gauge body. In another example the fiducial may comprise an abutment formed at the end of an abutment channel cut into the side of the gauge body parallel with the gauge body's longitudinal axis. In yet another example the fiducial may comprise a combination of a physical abutment protruding from the side of the gauge body and an abutment formed at the end of an abutment channel cut into the side of the gauge body parallel with the gauge body's longitudinal axis. In still another example the fiducial may comprise a marking, such as a line, on the surface of the gauge body parallel with the coupling face of the gauge body.

The visual identifier comprises any information marked on the outer surface of a gauge body or fiducial that conveys information relative to the position of a fiducial in relation to a coupling face of a gauge body, or the stripping edge of a wire stripper. For example only, and not for limitation, the visual identifier can be marked on a gauge body outer surface proximal to its respective fiducial. In another example the visual identifier may be marked directly on its respective fiducial. In yet another example the visual identifier may be a fractional measurement. In another example the visual identifier may be a decimal measurement. In another example the visual identifier may be a metric measurement. In still another example the visual identifier may be a part number for an electrical connector contact crimp for which its respective strip depth is ideal for.

Example Embodiments of the Depth Gauge:

For illustration purposes and not for limitation, one example embodiment of the depth gauge is shown in FIGS. 1A-1H, 2A-2D.

As shown in FIG. 1A, the depth gauge 1100 comprises a magnet gauge body 1110, a fiducial 1120, and a visual identifier 1140. In this embodiment, the coupling means is provided by the gauge body 1100 being a magnet. The gauge body 1100 comprises a 0.062" thick circular magnet, having a distal end and a proximal end, but may be of any thickness a particular application may require while having the visual identifier convey the correct thickness of the gauge body 1100, while the fiducial 1120 comprises an abutment made of a flat rigid material such as, but not limited to plastic or metal alloy, having a proximal face 1121 and a distal abutment face (see 1123 in FIG. 1B) wherein a portion of the abutment face (see 1123 in FIG. 1B) of the fiducial 1120 is coupled to the proximal face [1111] of the gauge body 1110.

The fiducial 1120 has a footprint larger than a footprint of the gauge body 1110 wherein an overhang of the fiducial 1120 is created when coupled to the proximal face [1111] of the gauge body 1110. The fiducial 1120 further comprises an abutment face (see 1123 in FIG. 1B) positioned to define a distance between the coupling face (see 1113 in FIG. 1B) and the abutment face (see 1123 in FIG. 1B) of the fiducial 1120. The depth gauge 1100 is configured to be magnetically coupled to a wire stripper whereby the distance is defined by the abutment face (see 1123 in FIG. 1B) of the fiducial 1120 when the fiducial 1120 is aligned proximal to the stripping edge of the wire stripper. The proximal face 1121 of the fiducial 1120 may have at least one visual identifier 1140 marked onto its surface, which conveys information regarding a position of the fiducial relative to the coupling face (see 2613 in FIG. 38B) of the gauge body 2610, or any other information a particular application may require.

Figure 1B:
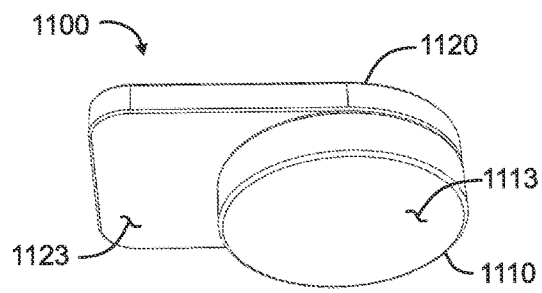

As shown in FIG. 1B, a lower perspective view of the depth gauge 1100 illustrates the distance between the coupling face 1113 of the magnet gauge body 1110, and the abutment face 1123 of the fiducial 1120 where the distance between the two faces defines the strip depth, which in this example, is 0.062". While the 0.062" strip depth is used as an example, any thickness magnet gauge body 1110 may be used in order to create a different strip depth for stripping a different length of coating from a coated wire. The distance between the fiducial 1120 and the coupling face 1113 comprises a distances between the fiducial 1120 and the coupling face 1113, wherein the fiducial 1120 comprise an abutment face 1123 positioned to define a distance between the coupling face 1113 and the abutment face 1123. While the magnet gauge body 1110 profile is circular in this example, the magnet gauge body 1110 may be of any shape a particular application may require. The fiducial 1120 is made of a section of flat thin rigid material bonded to the magnet gauge body 1110 and may be of any shape a particular application may require. While the abutment face 1123 extends past a portion of the circular magnet gauge body 1110 perimeter, the abutment face 1123 may extend past as much of the circular magnet gauge body 1110 perimeter as a particular application may require. The circular magnet gauge body 1110 in this example embodiment is typically anywhere from 0.20" to 0.40" in diameter, but may be of any diameter a particular application may require.

Figure 1C:
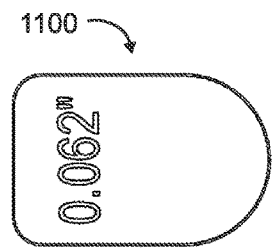
Figure 1D:
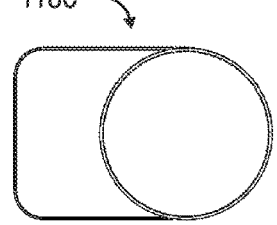
Figure 1E:
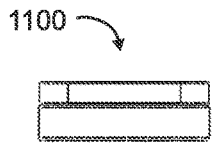
Figure 1F:
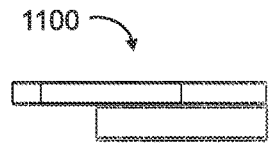
Figure 1G:
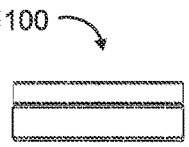
Figure 1H:
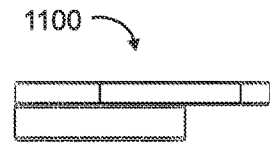

Additional views of the depth gauge 1100 are shown in FIG. 1C with a proximal plan view thereof, FIG. 1D with a distal plan view thereof, FIG. 1E with a front side elevational view thereof, FIG. 1F with a right side elevational view thereof, FIG. 1G with a back side elevational view thereof, and FIG. 1H with a left side elevational view thereof.

Figure 2A:
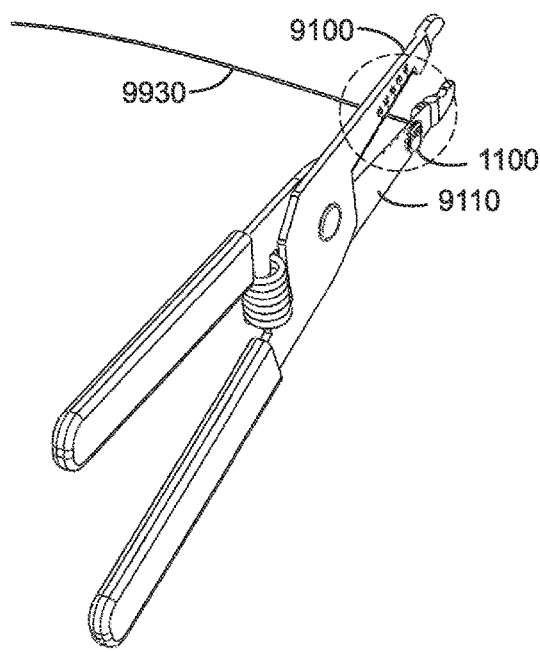
FIGS. 2A-2D show an example method of using the depth gauge of FIGS. 1A-1H.

As shown in FIG. 2A, the depth gauge 1100 is magnetically coupled to the flat side of the lower jaw 9110 of a pair of shear type wire strippers 9100, similar to wire stripper model 45-125 produced by Ideal® Tool Company in Sycamore, IL, with a 30 gauge coated wire 9930 extending past the wire stripper 9100 and up to the depth gauge 1100.

Figure 2B:
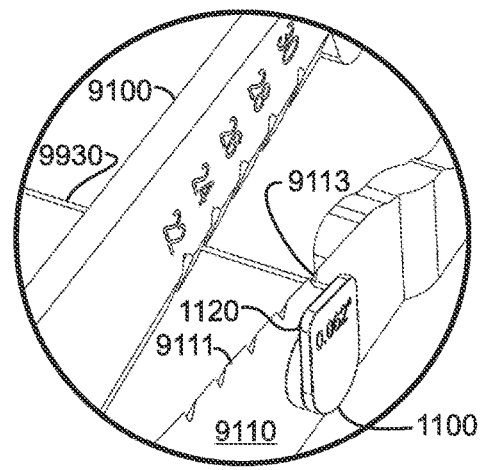

As shown in FIG. 2B, an enlarged sectional view of the depth gauge 1100 shown in FIG. 2A is magnetically coupled to the flat side of the lower jaw 9110 of a pair of shear type wire strippers 9100 with the fiducial 1120 aligned proximal to the stripping edge 9111 30 gauge slot 9113, with a 30 gauge coated wire 9930 positioned in the 30 gauge slot 9113 and extending up to the depth gauge 1100 fiducial 1120.

Figure 2C:
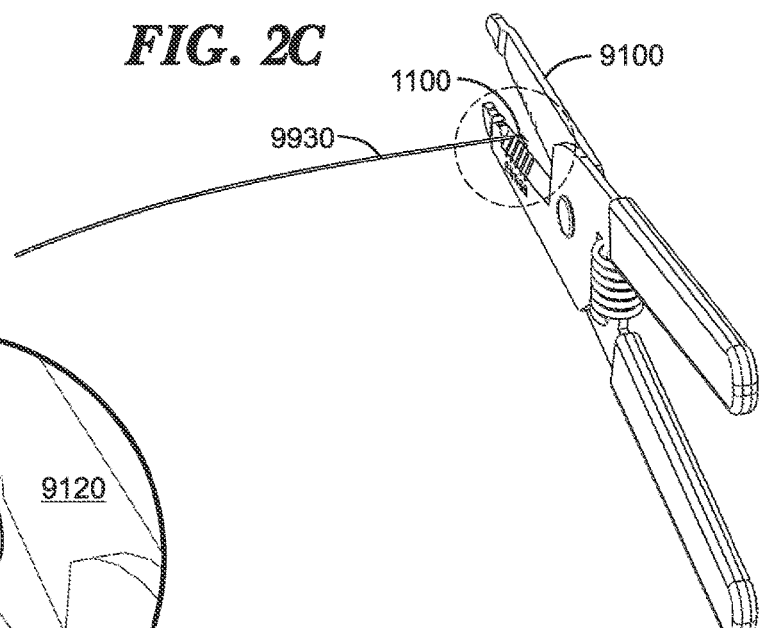

As shown from the opposite side of FIG. 2A, FIG. 2C shows the depth gauge 1100 magnetically coupled to a pair of shear type wire strippers 9100 with a 30 gauge coated wire 9930 extending past the wire stripper 9100 and up to the depth gauge 1100.

Figure 2D:
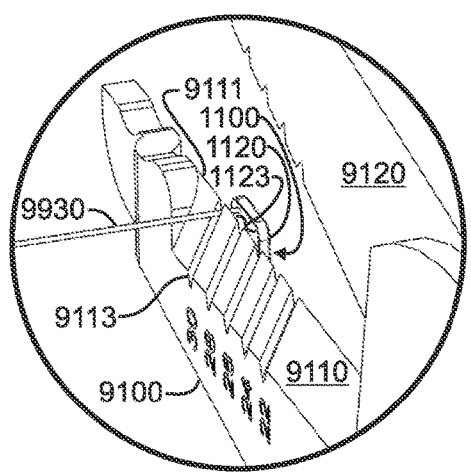

In an operational example, as shown in an enlarged sectional view FIG. 2D of FIG. 2C, the depth gauge 1100 is magnetically coupled to the flat side of the lower jaw 9110 of a pair of shear type wire strippers 9100 with the fiducial 1120 aligned proximal to the 30 gauge slot 9113 of the stripping edge 9111 of the wire stripper 9100 with a 30 gauge coated wire 9930 positioned in the 30 gauge slot 9113 and extending up to the abutment face 1123 of the fiducial 1120. The wire stripper 9100 is actuated on the coated wire 9930 extending past the stripping edge 9111 to the fiducial 1120 abutment face 1123, the wire stripper 9100 cuts a portion of the coating of the coated wire 9930 extending from the stripping edge 9111 to the fiducial 1120 abutment face 1123 equal the distance between the stripping edge 9111 and the fiducial 1120 abutment face 1123, wherein the coated wire 9930 is then pulled from between the closed jaws 9110 and 9120, whereby a 0.062" section of coating is stripped from the coated wire 9930 equal to the 0.062" distance between the stripping edge 9111 and the abutment face 1123 of the fiducial 1120. In order to strip a different gauge coated wire, the depth gauge 1100 is repositioned with its fiducial 1120 proximal to a second gauge slot in the stripping edge 9111 of the wire stripper 9100 with a second gauge coated wire positioned in the second gauge slot and extending up to the abutment face 1123 of the fiducial 1120. The wire stripper 9100 is actuated on the second coated wire extending past the stripping edge 9111 to the fiducial 1120 abutment face 1123, the wire stripper 9100 cuts a portion of the coating of the second coated wire extending from the stripping edge 9111 to the fiducial 1120 abutment face 1123 equal the distance between the stripping edge 9111 and the fiducial 1120 abutment face 1123, wherein the second coated wire is then pulled from between the closed jaws 9110 and 9120, whereby a 0.062" section of coating is stripped from the second coated wire equal to the 0.062" distance between the stripping edge 9111 and the abutment face 1123 of the fiducial 1120.

For illustration purposes and not for limitation, another example embodiment of the depth gauge is shown in FIGS. 3A-3H as a slight variation of the depth gauge 1100 shown in FIGS. 1A-1H.

As shown in FIG. 3A, the depth gauge 1200 comprises a gauge body 1210, having a distal end and a proximal end, and a fiducial 1220, formed integrally as one piece made of a rigid material such as, but not limited to, plastic or metal alloy, wherein the fiducial 1220 protrudes laterally from the side surface 1212 of the gauge body 1210. The proximal face 1201 of the depth gauge may have at least one visual identifier 1240 marked onto its surface, which conveys information regarding a position of the fiducial 1220 abutment face relative to the coupling face (see 1223, 1213 in FIG. 3B) of the gauge body 1210. In this example the strip depth is measured in millimeters, but may be expressed in any measurement system, or be of any other information, a particular application may require.

As shown in FIG. 3B, a lower perspective view of the depth gauge 1200 illustrates that the distance between the coupling face 1213 of the gauge body 1210, and the abutment face 1223 of the fiducial 1220, defines the strip depth, which in this example is 3.18 mm. The distance between the fiducial 1220 and the coupling face 1213 comprises a distances between the fiducial 1220 and the coupling face 1213, wherein the fiducial 1220 comprise an abutment face 1223 positioned to define a distance between the coupling face 1213 and the abutment face 1223. A magnet 1250 is disposed within a recess 1214 formed into the distal end of the gauge body 1210. The magnet 1250 is held in place by any means a particular application may require, such as but not limited to, press fitting or bonding. The gauge body 1210 in this example embodiment is typically anywhere from 0.20" to 0.40" in diameter, but may be of any diameter a particular application may require.

In an operational example, the depth gauge 1200 coupling face 1213 is magnetically coupled to the flat side of the lower jaw of a pair of shear type wire strippers with the fiducial 1220 aligned proximal to the stripping edge of the wire stripper with a coated wire extending past the stripping edge and up to the abutment face 1223 of the fiducial 1220. The wire stripper is actuated on the coated wire extending past the stripping edge to the fiducial 1220, the wire stripper cuts a portion of the coating of the coated wire extending from the stripping edge to the fiducial 1220 equal the distance between the stripping edge and the fiducial 1220, wherein the coated wire is then pulled from between the closed jaws and, whereby a 3.18 mm section of coating is stripped from the coated wire equal to the 3.18 mm distance between the stripping edge and the abutment face 1223 of the fiducial 1220. In order to strip a different gauge coated wire, the depth gauge 1200 is repositioned with its fiducial 1220 proximal to a second gauge slot in the stripping edge 9111 of the wire stripper 9100 with a second gauge coated wire positioned in the second gauge slot and extending up to the abutment face 1223 of the fiducial 1220. The wire stripper 9100 is actuated on the second coated wire extending past the stripping edge 9111 to the fiducial 1220 abutment face 1223, the wire stripper 9100 cuts a portion of the coating of the second coated wire extending from the stripping edge 9111 to the fiducial 1220 abutment face 1223 equal the distance between the stripping edge 9111 and the fiducial 1220 abutment face 1223, wherein the second coated wire is then pulled from between the closed jaws 9110 and 9120, whereby a 3.18 mm section of coating is stripped from the second coated wire equal to the 3.18 mm distance between the stripping edge 9111 and the abutment face 1223 of the fiducial 1220.

Additional views of the depth gauge 1200 are shown in FIG. 3C with a proximal plan view thereof, FIG. 3D with a distal plan view thereof, FIG. 3E with a front side elevational view thereof, FIG. 3F with a right side elevational view thereof, FIG. 3G with a back side elevational view thereof, and FIG. 3H with a left side elevational view thereof.

For illustration purposes and not for limitation, another example embodiment of the depth gauge is shown in FIGS. 4A-4H, 4J, 5 as a slight variation of the depth gauge 1200 shown in FIGS. 3A-3H.

Figure 4A:
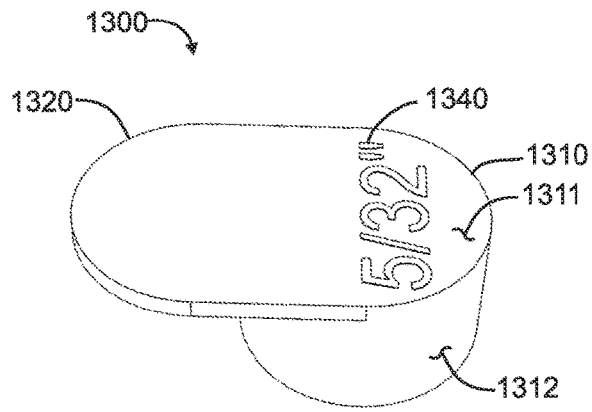
FIGS. 4A-4H, 4J show another example embodiment of a depth gauge having a magnetic coupling means fully encased within the gauge body.

As shown in FIG. 4A, the depth gauge 1300 comprises a gauge body 1310 and fiducial 1320 formed integrally as one piece, made of a rigid material such as, but not limited to, plastic or metal alloy, the gauge body having a distal end and a proximal end, wherein the fiducial 1320 protrudes from the side surface 1312 of the gauge body 1310. The proximal face 1311 of the depth gauge 1300 may have at least one visual identifier 1340 printed or formed onto its surface, which conveys information regarding a position of the fiducial 1320 relative to the coupling face (see 1313 in FIG. 4B) of the gauge body 1310, as well as any other information a particular application may require. In this example the strip depth is measured in fractions of an inch, but may be expressed in any measurement system, and may include any other information a particular application may require.

Figure 4B:
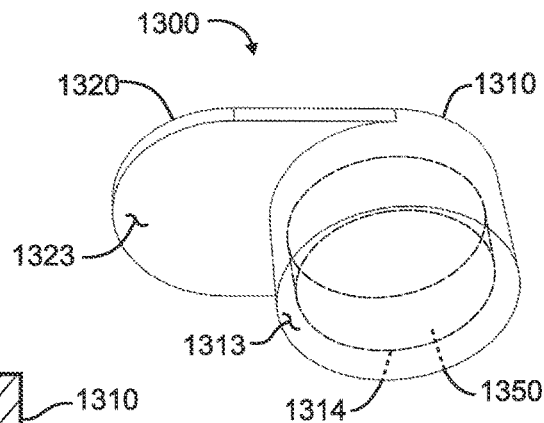

As shown in FIG. 4B, a lower perspective view of the depth gauge 1300 illustrates that the distance between the coupling face 1313 of the gauge body 1310, and the abutment face 1323 of the fiducial 1320 defines the strip depth, which in this example, is $5/32$". The distance between the fiducial 1320 and the coupling face 1313 comprises a distances between the fiducial 1320 and the coupling face 1313, wherein the fiducial 1320 comprise an abutment face 1323 positioned to define a distance between the coupling face 1313 and the abutment face 1323. A magnet 1350 is disposed within a cavity 1314 within the gauge body 1310. The gauge body 1310 in this example embodiment is typically anywhere from 0.20" to 0.40" in diameter, but may be of any diameter a particular application may require.

Figure 4J:
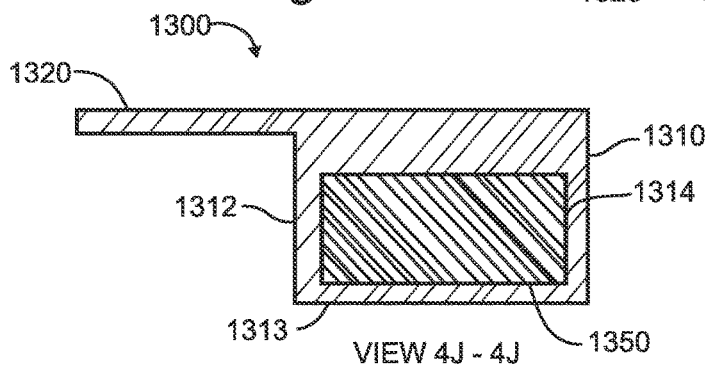
Figure 4C:
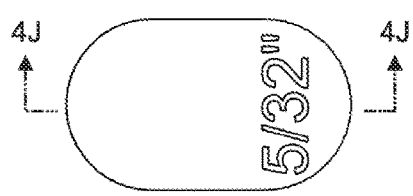
Figure 4D:
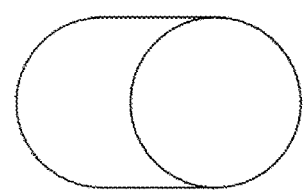
Figure 4E:
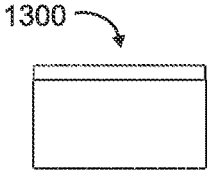
Figure 4F:
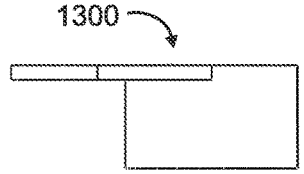
Figure 4G:
Figure 4H:
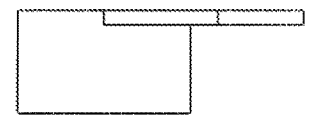

Additional views of the depth gauge 1300 are shown in FIG. 4C with a proximal plan view thereof, FIG. 4D with a distal plan view thereof, FIG. 4E with a front side elevational view thereof, FIG. 4F with a right side elevational view thereof, FIG. 4G with a back side elevational view thereof, and FIG. 4H with a left side elevational view thereof.

As shown in FIG. 4J, the cross-sectional view 4J-4J of the depth gauge 1300 shown in FIG. 4C illustrates how a magnet 1350 would be disposed within the gauge body 1310. The magnet 1350 is positioned within the sides of the gauge body 1310 while positioned proximal to the gauge body 1310 coupling face 1313. The magnet 1350 could be over-molded during a molding process of the depth gauge 1300 or the depth gauge 1300 could be made in two sections that are mechanically joined, bonded, or sonically welded together with the magnet 1350 concealed inside the cavity 1314 of the gauge body 1310. The fiducial 1320 protrudes from the gauge body 1310 outer surface 1312.

In an operational example, the depth gauge 1300 coupling face 1313 is magnetically coupled to the flat side of the lower jaw of a pair of shear type wire strippers with the fiducial 1320 aligned proximal to the stripping edge of the wire stripper with a coated wire extending past the stripping edge and up to the abutment face 1323 of the fiducial 1320. The wire stripper is actuated on the coated wire extending past the stripping edge to the fiducial 1320, the wire stripper cuts a portion of the coating of the coated wire extending from the stripping edge to the fiducial 1320 equal the distance between the stripping edge and the fiducial 1320, wherein the coated wire is then pulled from between the closed jaws and, whereby a $5/32$" section of coating is stripped from the coated wire equal to the $5/32$" distance between the stripping edge and the abutment face 1323 of the fiducial 1320. In order to strip a different gauge coated wire, the depth gauge 1300 is repositioned with its fiducial 1320 proximal to a second gauge slot in the stripping edge 9111 of the wire stripper 9100 with a second gauge coated wire positioned in the second gauge slot and extending up to the abutment face 1323 of the fiducial 1320. The wire stripper 9100 is actuated on the second coated wire extending past the stripping edge 9111 to the fiducial 1320 abutment face 1323, the wire stripper 9100 cuts a portion of the coating of the second coated wire extending from the stripping edge 9111 to the fiducial 1320 abutment face 1323 equal the distance between the stripping edge 9111 and the fiducial 1320 abutment face 1323, wherein the second coated wire is then pulled from between the closed jaws 9110 and 9120, whereby a 5⁄32" section of coating is stripped from the second coated wire equal to the 5⁄32" distance between the stripping edge 9111 and the abutment face 1323 of the fiducial 1320.

Figure 5:
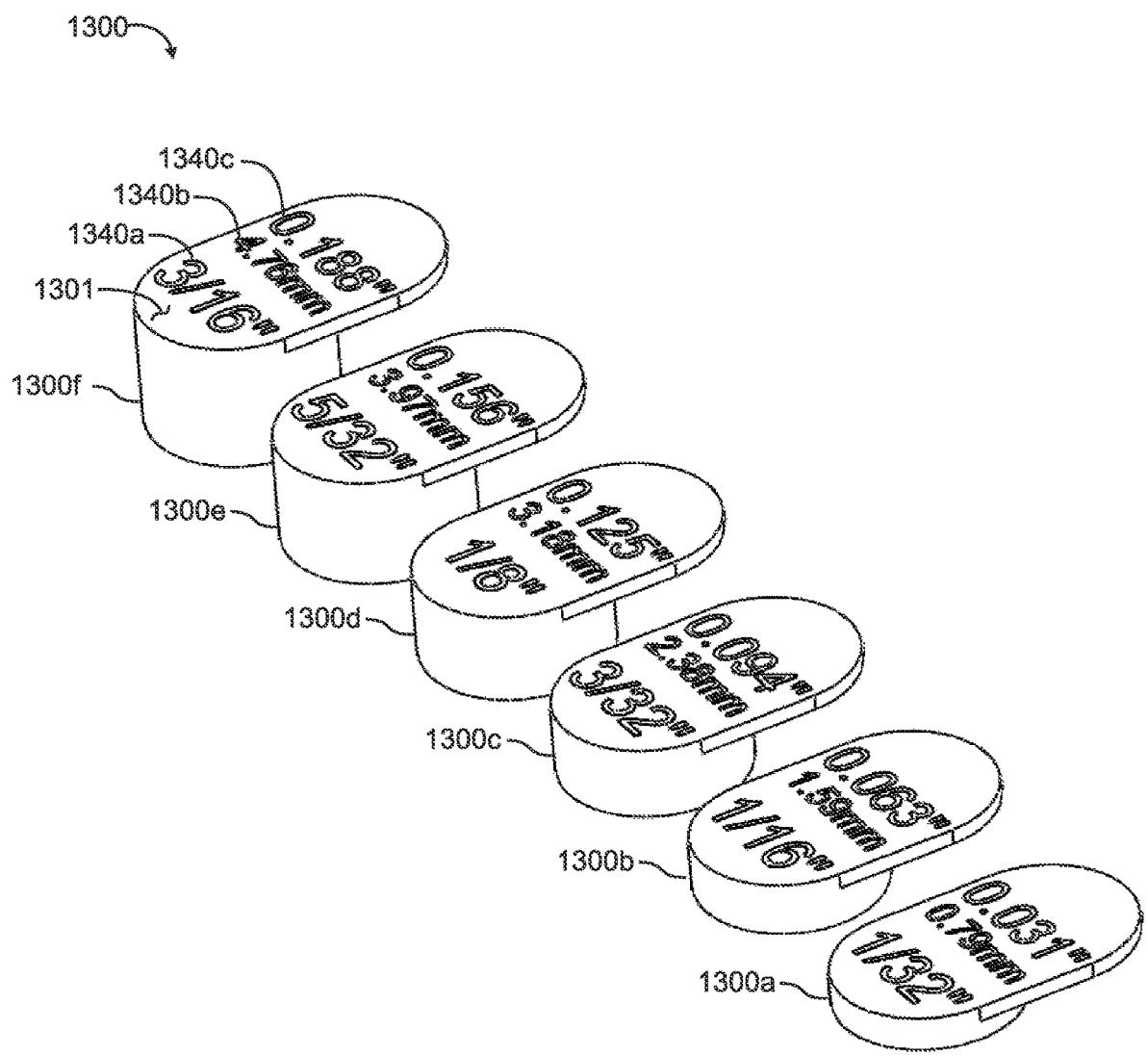
FIG. 5 shows a set of five example depth gauges having a variety of fiducial depths, each having several visual identifiers visible.

As shown in FIG. 5, a set of six depth gauges 1300 ranging from a 1⁄32" depth gauge 1300a to a 3⁄16" depth gauge 1300f in 1⁄32" increments illustrate how depth gauges 1300 could be produced in sets of varying strip depths. These strip depths are given as an example only and the depth gauge 1300 may be designed to strip any length of coating from a coated wire as a particular application may require. As another example, the visual identifiers include three different types of measurements which are displayed on the proximal face 1301 of each depth gauge 1300 featuring a fractional measurement 1340a, a millimeter measurement 1340b, and a decimal measurement 1340c, but any measurement system or other markings may be displayed as a particular application may require. The gauge body 1210 in this example embodiment is typically anywhere from 0.20" to 0.40" in diameter, but may be of any diameter a particular application may require.

For illustration purposes and not for limitation, another example embodiment of the depth gauge is shown in FIGS. 6A-6B, 7A-7B.

As shown in FIG. 6A, the depth gauge 1400 comprises a gauge body 1410 having a cylindrical shaped body having a distal end and a proximal end, wherein a plurality of fiducials 1420 protrude from an outer surface 1412 of the gauge body 1410, wherein the gauge body 1410 and fiducials 1420 are formed integrally as one piece made of a rigid material such as, but not limited to, plastic, ceramic, or metal alloy. Each fiducial 1420 has located proximal to it, a visual identifier 1440 marked onto the gauge body 1410 outer surface 1412, which conveys information regarding a position of the fiducial relative to the coupling face (see 1413 in FIG. 6B) of the gauge body 1410, or any other information a particular application may require.

As shown in FIG. 6B, a plurality of fiducials 1420 protrude from the outer surface 1412 of the depth gauge 1400 gauge body 1410, each defining a distance between the coupling face 1413 of the gauge body 1410 and each abutment face 1423 of the plurality of fiducials 1420. The fiducial 1420 comprises a plurality of fiducials 1420 protruding from the outer surface of the gauge body 1410, while the distance between the fiducial 1420 and the coupling face 1413 comprises a plurality of distances between the plurality of fiducials 1420 and the coupling face 1413, wherein the plurality of fiducials 1420 comprise a plurality of abutment faces 1423 positioned to define a plurality of distances between the coupling face 1413 and the plurality of abutment faces 1423.

The distance between each fiducial 1420 abutment face 1423 and the gauge body 1410 coupling face 1413 define a strip depth. In this example, eight fiducials 1420 protrude from the outer surface 1412 of the gauge body 1410 with the abutment faces 1423 at varying distances from the coupling face 1413 of the gauge body 1410 ranging from 3⁄64" to 1⁄4" wherein each of these distances define the length of coating that will be stripped form a coated wire when used as intended with a pair of shear type wire strippers. The distances between the abutment faces 1423 and the coupling face 1413 of the gauge body 1410 are given as an example only and may be of any distance a particular application may require. Additionally, while there are eight fiducials 1420 positioned around the perimeter of the gauge body 1410, any number of fiducials may be incorporated into the design as a particular application may require. A plurality of visual identifiers 1440 are marked on the outer surface 1412 of the gauge body 1410, positioned proximal to their respective fiducials 1420, wherein this example they are fractional measurements, but may be of any type of measuring system, or any other type of identifier, such as but not limited to an electrical connector crimp contact part number, a particular application may require. The visual identifiers shown herein convey the distance between the abutment face 1423 of the fiducials 1420 and the coupling face 1413 of the gauge body 1410. A recess 1414 is formed into the coupling face 1413 of the gauge body 1410 into which a magnet 1450 is disposed. The magnet 1450 is mechanically held in place by any means a particular application may require, such as but not limited to, press fitting or bonding. The gauge body 1410 in this example embodiment is typically anywhere from 0.20" to 0.40" in diameter, but may be of any diameter a particular application may require.

Additional views of the depth gauge 1400 are shown in FIG. 6C with a proximal plan view thereof, FIG. 6D with a distal plan view thereof, FIG. 6E with a front side elevational view thereof, FIG. 6F with a right side elevational view thereof, FIG. 6G with a back side elevational view thereof, and FIG. 6H with a left side elevational view thereof.

Figure 7A:
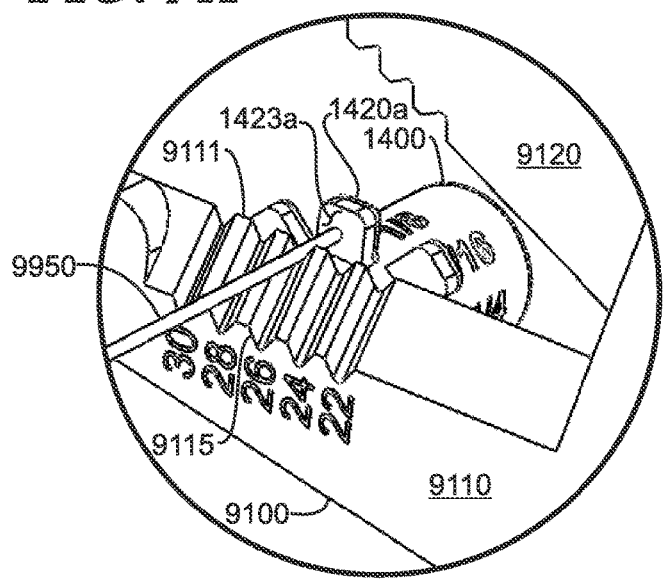
FIGS. 7A-7B show an example method of using the depth gauge shown in FIGS. 6A-6H.
Figure 7B:
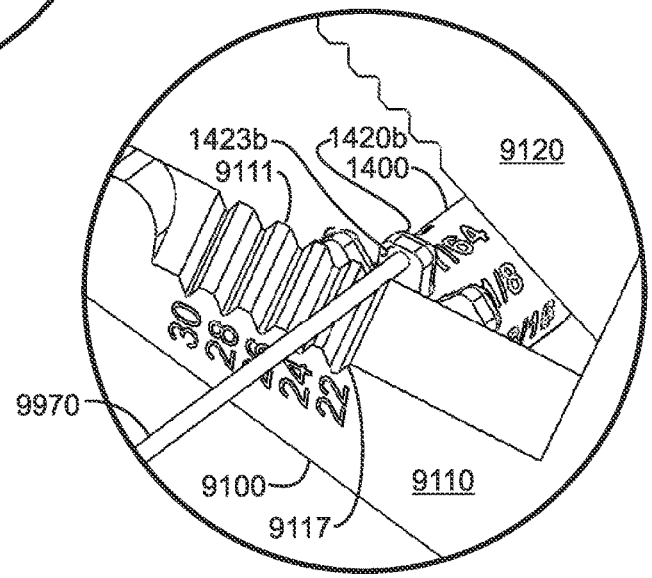

As shown in FIGS. 7A-7B, these images further detail and illustrate an operational example of the embodiments consistent with those shown in FIGS. 6A-6H and 8.

As shown in FIG. 7A, the depth gauge 1400 is magnetically coupled to the flat side of the lower jaw 9110 of the shear type wire stripper 9100, similar to wire stripper model 45-125 produced by Ideal® Tool Company in Sycamore, IL, with the 1⁄8" fiducial 1420a aligned proximal to the 26 gauge slot 9115 of the stripping edge 9111. A section of 26 gauge coated wire 9950 is positioned into the 26 gauge slot 9115 extending past the stripping edge 9111 with the end of the 26 gauge coated wire 9950 abutting the abutment face 1423a of the 1⁄8" fiducial 1420a. The wire stripper 9100 is actuated on the 26 gauge coated wire 9950 extending past the stripping edge 9111 to the abutment face 1423, the wire stripper 9100 cuts a portion of the coating of the 26 gauge coated wire 9950 extending from the stripping edge 9111 to the abutment face 1423 equal the distance between the stripping edge 9111 and the abutment face 1423, the 26 gauge coated wire 9950 is then pulled from between the closed jaws 9110 and 9120, wherein a 1⁄8" section of coating is stripped from the 26 gauge coated wire 9950 equal to the 1⁄8" distance between the stripping edge 9111 and the abutment face 1423 of the fiducial 1420.

As shown in FIG. 7B, the depth gauge 1400 is rotated around its longitudinal axis, while coupled to the wire stripper 9100 lower jaw 9110, so that the 7⁄64" fiducial 1420b is aligned proximal to the 22 gauge slot 9117 of the stripping edge 9111. A section of 22 gauge coated wire 9970 is positioned into the 22 gauge slot 9117 extending past the stripping edge 9111 with the end of the 22 gauge coated wire 9970 abutting the abutment face 1423b of the 7⁄64" fiducial 1420b. The wire stripper 9100 is actuated on the 22 gauge coated wire 9970, cutting into the coating, wherein the 22 gauge coated wire 9970 is then pulled from between the closed jaws 9110 and 9120, whereby a 7⁄64" section of coating is stripped from the end of 22 gauge coated wire 9970 equal to the 7⁄64" distance between the stripping edge 9111 and the distal abutment face 1423b of the fiducial 1420b.

Figure 8:
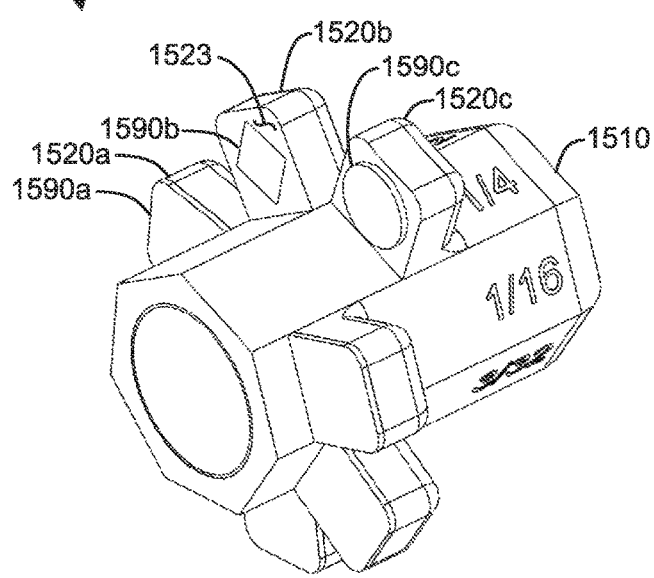
FIG. 8 shows another example embodiment of a depth gauge having a magnetic coupling means and a plurality of fiducials, with reinforcement plates coupled to their abutment faces, protruding from the side of the gauge body comprising a polygonal profile.

For illustrational purposes and not for limitation, another embodiment of the depth gauge 1500 is shown in FIG. 8 as a slight variation of the depth gauge 1400 shown in FIGS. 6A-6H, 7A-7B.

As shown in FIG. 8, the depth gauge 1500 is similar to the depth gauge 1400, except that a cylindrical gauge body 1510, having a distal end and a proximal end, has a polygonal profile as another example, but may be of any shape profile a particular application may require, wherein a plurality of fiducials 1520 protrude from a multifaceted outer surface 1512 of the gauge body 1510, wherein the gauge body 1510 and fiducials 1520 are formed integrally as one piece made of a rigid material such, as but not limited to, plastic, ceramic, or metal alloy.

The fiducials 1520 have reinforcement plates [1590] coupled to, or embedded into, their abutment faces 1523. The reinforcement plates 1590 may be of any shape a particular application requires, where several examples are shown wherein reinforcement plate 1590a having an outer perimeter conforming to the outer perimeter of the abutment face [1523a] of the fiducial 1520a to which it is coupled, and reinforcement plate 1590b having a rectangular perimeter confined within the outer perimeter of the fiducial 1520b into which it is embedded, and reinforcement plate 1590c having a circular perimeter confined within the outer perimeter of the fiducial 1520c to which it is coupled. The reinforcement plates [1590] may be of any rigid material, such as but not limited to, plastic, ceramic, or metal alloy, while they may be embedded into or bonded onto the abutment face 1523 of the fiducials 1520. The gauge body 1510 in this example embodiment is typically anywhere from 0.20" to 0.40" in diameter, but may be of any diameter a particular application may require. The method of use for this depth gauge 1500 embodiment is identical to the method of use for depth gauge 1400 shown in FIGS. 7A, 7B.

For illustration purposes and not for limitation, another example embodiment of the depth gauge 1600 is shown in FIGS. 9A-9H, 10A-10D as a slight variation of the depth gauge 1400 shown in FIGS. 6A-6H, 7A, 7B.

Figure 9A:
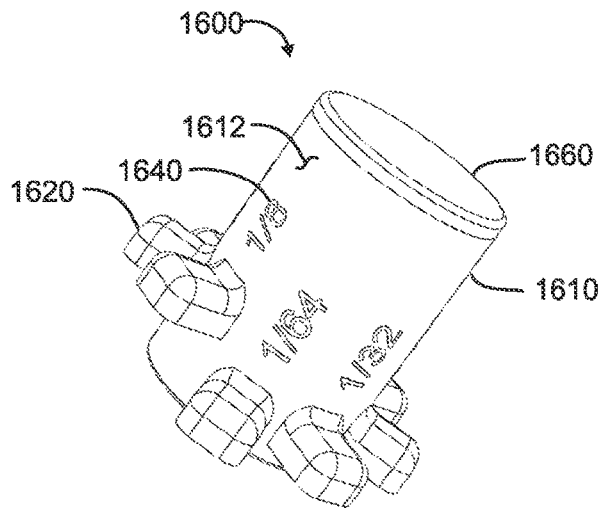
FIGS. 9A-9H show another example embodiment of a depth gauge having a magnetic coupling means with a recess in its proximal end into which a magnet is disposed while having a cap that closes off the recess opening and holds the magnet in place at the distal end of the recess.

As shown in FIG. 9A, a perspective view of the depth gauge 1600 illustrates how it slightly differs from the depth gauge 1400 shown in FIG. 6A, 6B, wherein a magnet retaining cap 1660, having a distal face and a proximal face, is coupled to the proximal face (see 1611 in FIG. 10A) of the gauge body 1610 having a distal end and a proximal end. A plurality of fiducials 1620 protrude from the outer surface 1612 of the gauge body 1610, wherein the gauge body 1610 and fiducials 1620 are formed as one integral component. The gauge body 1610 and fiducials 1620, and the magnet retaining cap 1660, are made of a rigid material such as, but not limited to plastic, composite, or metal alloy. A plurality of visual identifiers 1640 are marked on the outer surface 1612 of the gauge body 1610, positioned proximal to their respective fiducials 1620, wherein this example they are fractional measurements, but may be of any type of measuring system, or any other type of identifier, such as but not limited to an electrical connector crimp contact part number, a particular application may require. The visual identifiers shown herein convey the distance between the abutment face 1623 of the fiducials 1620 and the coupling face 1613 of the gauge body 1610.

Figure 9B:
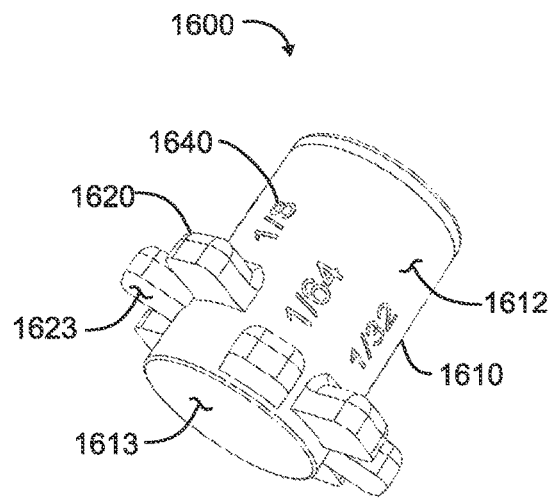

As shown in FIG. 9B, the depth gauge 1600 having a plurality of fiducials 1620 comprise a plurality of abutment faces 1623 positioned to define a plurality of distances between the coupling face 1613 and the plurality of abutment faces 1623. The fiducials 1620 are positioned around the circumference of the gauge body 1610 having their abutment faces 1623 at varying distances from the coupling face 1613 of the gauge body 1610 ranging from 1/64" to 1/8", in 1/64" increments as indicated by the visual identifiers 1640 wherein each of these distances represent the length of coating that will be stripped from a coated wire when used as intended with a pair of shear type wire strippers. The distances between the abutment faces 1623 and the coupling face 1613 of the gauge body 1610 are given as an example only and may be of any distance a particular application may require. While there are eight fiducials 1620 positioned around the perimeter of the gauge body 1610, any number of fiducials may be incorporated into the design as a particular application may require. The gauge body 1610 in this example embodiment is typically anywhere from 0.20" to 0.40" in diameter, but may be of any diameter a particular application may require. The method of use for this depth gauge 1600 embodiment is identical to the method of use for depth gauge 1400 shown in FIGS. 7A, 7B

Figure 9C:
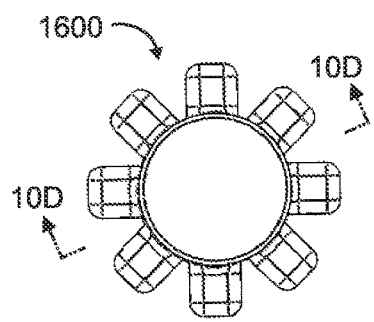
Figure 9D:
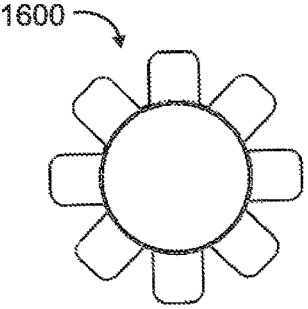
Figure 9E:
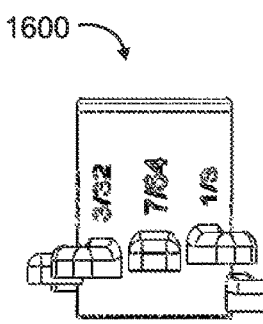
Figure 9F:
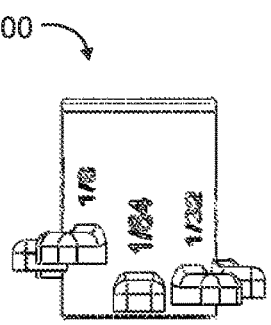
Figure 9G:
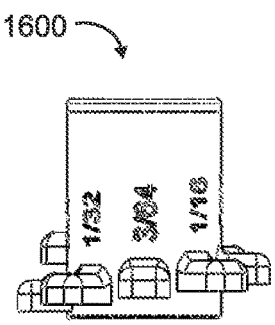
Figure 9H:
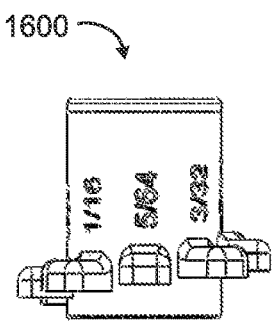

Additional views of the depth gauge 1600 are shown in FIG. 9C with a proximal plan view thereof, FIG. 9D with a distal plan view thereof, FIG. 9E with a left side elevational view thereof, FIG. 9F with a front side elevational view thereof, FIG. 9G with a right side elevational view thereof, and FIG. 9H with a back side elevational view thereof.

Figure 10A:
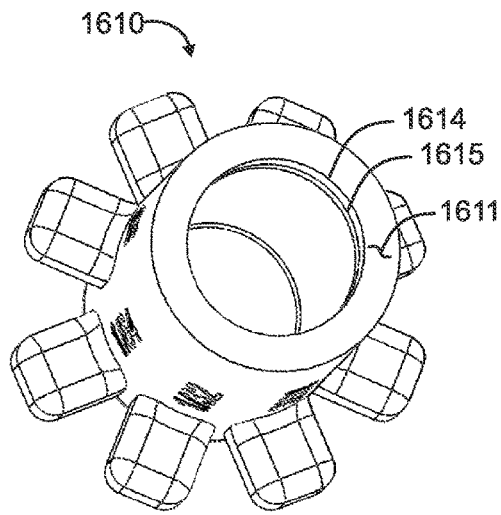
FIG. 10A shows a perspective view of the gauge body and fiducials of the depth gauge shown in FIGS. 9A-9H.

As shown in FIG. 10A, a perspective view of the gauge body 1610 reveals a recess 1614 formed into the proximal face 1611 of the gauge body 1610 extending to the distal portion of the gauge body 1610 wherein a retaining channel 1615 is formed around the inside surface of the recess 1614 proximal to the proximal face 1611 of the gauge body 1610.

Figure 10B:
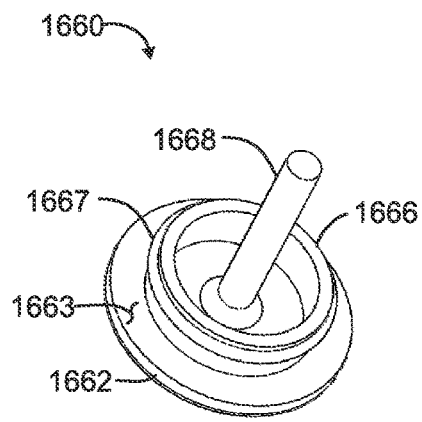
FIG. 10B shows a perspective view of the magnet retaining cap of the depth gauge shown in FIGS. 9A-9H.

As shown in FIG. 10B, a perspective view of the magnet retaining cap 1660 reveals a circular lip 1666 formed on the distal face 1663, and concentrically with the outer edge 1662, of the magnet retaining cap 1660. A retaining bead 1667 is formed around the outer surface of the circular lip 1666 of the magnet retaining cap 1660. The retaining bead 1667 is designed to engage a retaining channel (see 1615 in FIG. 10A) inside a recess of the gauge body (see 1614, 1610 in FIG. 10A) in order to mechanically secure the magnet retaining cap 1660 over an open end of the recess (see 1614 in FIG. 10A) formed into the proximal face of the gauge body (see 1611, 1610 in FIG. 10A). A plunger 1668 is formed centrally on the distal face 1663 of the magnet retaining cap 1660. The plunger 1668 is a member designed to extend from the magnet retaining cap 1660, down into the recess (see 1614 in FIG. 10A) and hold a magnet (see 1650 in FIG. 10C) at the distal end of the recess (see 1614 in FIG. 10A).

Figure 10C:
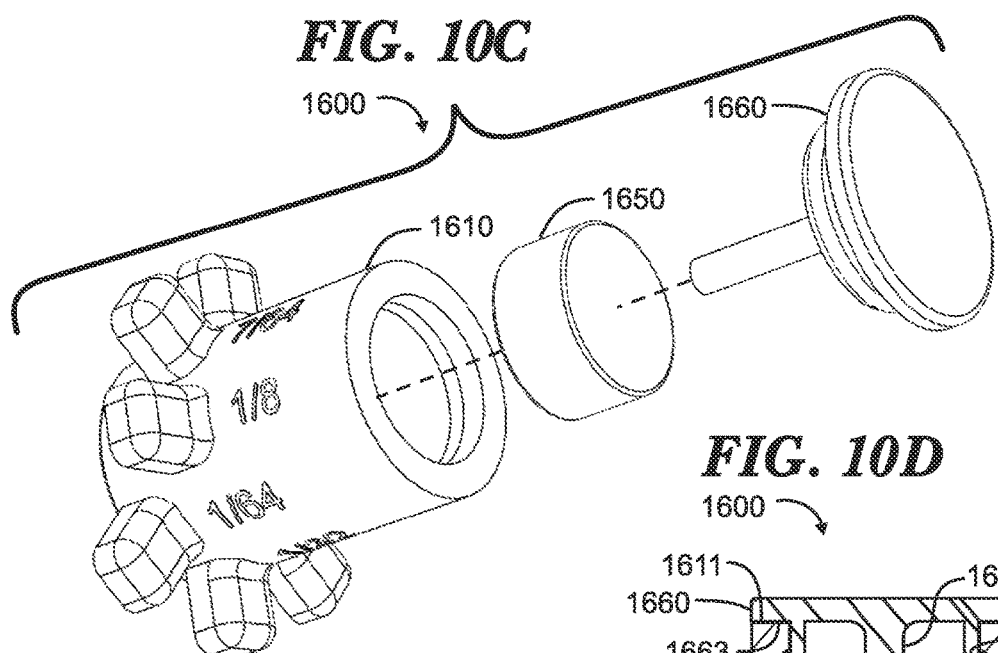
FIG. 10C shows an exploded view of the depth gauge shown in FIGS. 9A-9H.

As shown in FIG. 10C, an exploded view of the depth gauge 1600 is depicted featuring the gauge body 1610, the magnet 1650, and the magnet retaining cap 1660.

Figure 10D:
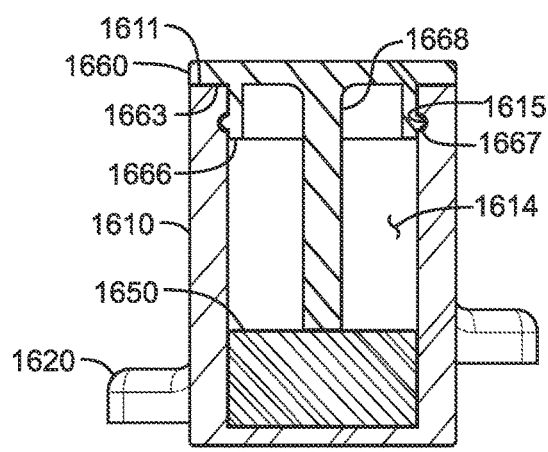
FIG. 10D shows cross-sectional view 10D-10D of the depth gauge shown in FIG. 9C.

As shown in FIG. 10D, the cross-sectional view 10D-10D of the depth gauge 1600 shown in FIG. 9C illustrates how a magnet 1650 would be securely disposed at the distal end of the recess 1614 of the gauge body 1610. The magnet 1650 is placed into the distal end of the recess 1614 of the gauge body 1610. The magnet retaining cap 1660 is positioned concentrically with the proximal face 1611 of the gauge body 1610 with its plunger 1668 extending down into the recess 1614. The retaining bead 1667 has a slightly wider diameter than the inside diameter of the recess 1614 so that the lip 1666 and retaining bead 1667 of the magnet retaining cap 1660 must be forced down into the recess 1614 until the retaining bead 1667 engages the retaining channel 1615, thus securing the magnet retaining cap 1660 over the open end of the recess 1614 with a snap-fit engagement while its distal face 1663 is coupled to the proximal face 1611 of the gauge body 1610. The plunger 1668 is shown extending down into the recess 1614 and holding the magnet 1650 in place at the distal end of the recess 1614. Two fiducials 1620 are visible protruding from the gauge body 1610.

While the magnet 1650 is secured in place with a magnet retaining cap 1660, the magnet may be secured in place by any means a particular application may require, such as, but not limited to press fitting, or bonding. While the recess 1614 is formed into the proximal end of the gauge body 1610, the recess 1614 could alternately be formed into the distal end of the gauge body 1610.

For illustration purposes and not for limitation, another example embodiment of the depth gauge 1700 is shown in FIGS. 11A-11H, 12A, 12B as a variation of the depth gauge 1400 shown in FIGS. 6A-6H, 7A, 7B.

As shown in FIG. 11A, the depth gauge 1700, having a proximal end and a distal end, has a cylindrical shape magnet gauge body 1710, but may be of any shape a particular application may require, having a distal end and a proximal end. The magnet gauge body 1710 and fiducials 1720 are formed integrally as one piece made of a rigid magnetic material. The magnet gauge body 1710 is a cylindrical magnet having abutment channels 1715 formed on its outer surface 1712, while visual identifiers 1740 are displayed proximal to their respective fiducials 1720.

As shown in FIG. 11B, the depth gauge 1700 magnet gauge body 1710 has a plurality of abutment channels 1715 on its outer surface 1712 and formed parallel with its longitudinal axis, wherein the abutment channels 1715 are at various lengths. Each abutment channel 1715 starts at the coupling face 1713 on the distal end of the magnet gauge body 1710 and ends at a depth equal to an intended strip depth. The coupling face 1713 is the flat surface at the distal end of the magnet gauge body 1710. Each abutment channel 1715 terminates at a fiducial 1720 abutment face 1723, which is typically planar, and parallel with, the coupling face 1713 of the magnet gauge body 1710. The fiducial 1720 fills in its respective abutment channel 1715 from the abutment face 1723 to the proximal face (see 1711 in FIG. 11A) at the proximal end of the gauge body 1710. The fiducials 1720 comprise a plurality of abutment channels 1715 on the outer surface 1712 of the gauge body 1710, the distance between the fiducials 1720 and the coupling face 1713 comprise a plurality of distances between the plurality of abutment channel 1715 abutment faces 1723 and the coupling face 1713. The plurality of fiducials 1720 comprise a plurality of abutment faces 1723 positioned to define a plurality of distances between the coupling face 1713 and the plurality of abutment faces 1723. A plurality of visual identifiers 1740 are marked on their respective fiducials 1720. As an example, the 1/16" abutment channel 1715 is 1/16" long with the fiducial 1720 abutment face 1723 at the end and will aid in positioning a coated wire to be stripped of a 1/16" section of coating from its end when used as intended with a shear type wire stripper. As another example, the 1/4" abutment channel 1715 is 1/4" long with the fiducial 1720 abutment face 1723 at the end, and will help position a coated wire to be stripped of a 1/4" section of coating from its end when used as intended with a shear type wire stripper. The abutment channel 1715 lengths shown herein are for illustrative purposes and may be formed at any length a particular application may require. The gauge body 1710 length should be long enough to accommodate the longest abutment channel 1715 with additional length to afford a solid fiducial 1720 at the end of the channel. While the depth gauge 1700 incorporates four fiducials 1720, any number of fiducials may be incorporated into the design as a particular application may require. The gauge body 1710 in this example embodiment is typically anywhere from 0.20" to 0.40" in diameter, but may be of any diameter a particular application may require.

Additional views of the depth gauge 1700 are shown in FIG. 11C with a proximal plan view thereof, FIG. 11D with a distal plan view thereof, FIG. 11E with a left side elevational view thereof, FIG. 11F with a front side elevational view thereof, FIG. 11G with a right side elevational view thereof, and FIG. 11H with a back side elevational view thereof.

Figure 12A:
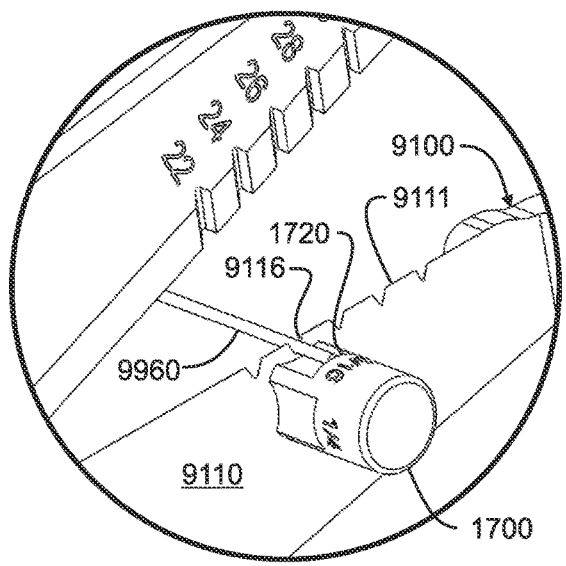
FIGS. 12A-12B show an example method of using the depth gauge shown in FIGS. 11A-11H.
Figure 12B:
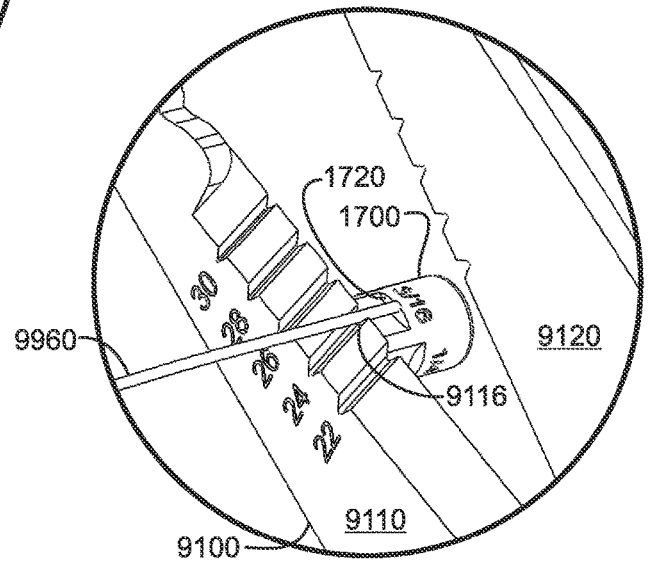

As shown in FIGS. 12A, 12B, these images further detail and illustrate an operational example of the embodiments consistent with those shown in FIGS. 11A-11H.

As shown in an enlarged sectional view FIG. 12A, the depth gauge 1700 coupling face (see 1713 in FIG. 11B) is magnetically coupled to the flat side of the lower jaw 9110 of a pair of shear type wire strippers 9100, similar to wire stripper model 45-125 produced by Ideal® Tool Company in Sycamore, IL, with the 3/16" fiducial 1720 positioned proximal to the 24 gauge slot 9116 with a 24 gauge coated wire 9960 positioned in the 24 gauge slot 9116 of the stripping edge 9111 of the wire stripper 9100 and extending up to the depth gauge 1700 fiducial 1720.

As shown from the opposite side of FIG. 12A, in FIG. 12B, the coupling face (see 1713 in FIG. 11B) of the depth gauge 1700 is magnetically coupled to the flat side of the lower jaw 9110 of a pair of shear type wire strippers 9100 with the 3/16" fiducial 1720 positioned proximal to the 24 gauge slot 9116 with a 24 gauge coated wire 9960 positioned in the 24 gauge slot 9116 of the stripping edge 9111 of the wire stripper 9100 and extending up to the depth gauge 1700 fiducial 1720. The wire stripper 9100 is actuated on the 24 gauge coated wire 9960 extending past the stripping edge 9111 to the abutment face 1723, the wire stripper 9100 cuts a portion of the coating of the 24 gauge coated wire 9960 extending from the stripping edge 9111 to the abutment face 1723 equal the distance between the stripping edge 9111 and the abutment face 1723, the 24 gauge coated wire 9960 is then pulled from between the closed jaws 9110 and 9120, wherein a 3/16" section of coating is stripped from the 24 gauge coated wire 9960 equal to the 3/16" distance between the stripping edge 9111 and the abutment face 1723 of the fiducial 1720. In order to strip a different length of coating, from a different gauge of coated wire, the depth gauge 1700 is rotated around its longitudinal axis on the wire stripper 9100 in order to align a second fiducial 1720 with a second gauge slot in the stripping edge 9111, wherein a second gauge coated wire is passed through the second gauge slot and abuts the second fiducial 1720 abutment face defining a second strip depth between the stripping edge 9111 and the second fiducial 1720 abutment face, whereby the wire stripper is actuated on the on the second gauge coated wire, the wire stripper 9100 cuts a portion of the coating of the second gauge coated wire extending from the stripping edge 9111 to the second fiducial 1720 abutment face equal the distance between the stripping edge 9111 and the second fiducial 1720 abutment face, whereby the second gauge coated wire is then pulled out from between the closed wire stripper 9100 jaws 9110, 9120 thus stripping a second length of coating from the proximal end of the second gauge coated wire.

Figure 13:
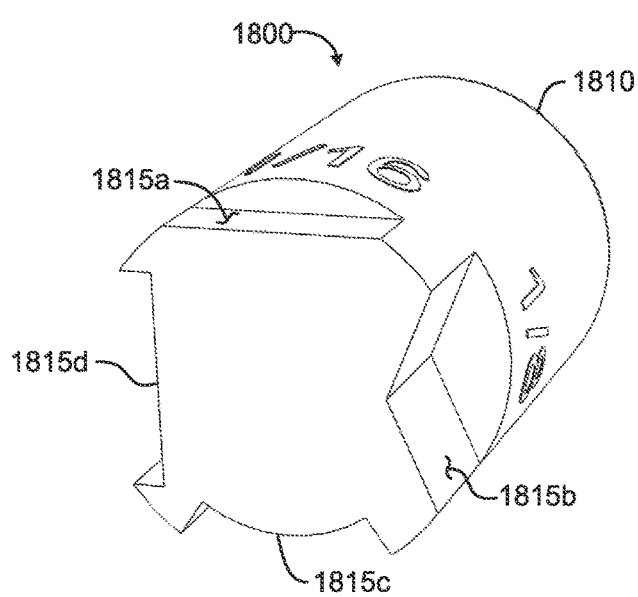
FIG. 13 shows alternate examples of abutment channel profiles formed on the surface of the gauge body of the depth gauge shown in FIGS. 11A-11H.

For illustration purposes and not for limitation, another example embodiment of the depth gauge 1800 is shown in FIG. 13 as a slight variation of the depth gauge 1700 shown in FIGS. 11A-11H, 12A, 12B.

As shown in FIG. 13, the depth gauge 1800 depicts four examples illustrating how the abutment channels may be of any shape profile a particular application may require. In this example, the abutment channel 1815a is formed with a flat cut, the abutment channel 1815b is formed with a "V" shaped cut, the abutment channel 1815c is formed with a concentric cut, and the abutment channel 1815d is formed with a slot cut. While four specific examples are shown herein, the abutment channels may be of any profile shape a particular application may require. The gauge body 1810 in this example embodiment is typically anywhere from 0.20" to 0.40" in diameter, but may be of any diameter a particular application may require.

For illustration purposes and not for limitation, another example embodiment of the depth gauge 1900 is shown in FIGS. 14A-14H, 15A-15D as a variation of the depth gauge 1400 shown in FIGS. 6A-6H, 7A, 7B.

As shown in FIG. 14A, a perspective view illustrates the depth gauge 1900 comprising a gauge body 1910, having a distal end and a proximal end, and a plurality of fiducials 1920 positioned around the circumference of the cylindrical gauge body 1910 outer surface 1912 and integrally formed as one piece made of a rigid material such as, but not limited to, plastic or metal alloy. Each fiducial 1920 is formed from a combination of an abutment channel 1915 formed into the gauge body 1910 outer surface 1912, and a protrusion on the gauge body 1910 outer surface 1912 each having a planar surface parallel with the gauge body 1910 coupling face (see 1913 in FIG. 14B), combining to form a single planar surface and fiducial 1920.

Visual identifiers 1940 are formed or marked on the outer surface 1912 of the gauge body 1910 proximal to their respective fiducials 1920. The visual identifiers 1940 in this embodiment are part numbers for various electrical connector crimp contacts for electrical wires, wherein the strip depth for each fiducial 1920 corresponds to an optimal strip depth for a particular electrical connector crimp contact.

As shown in FIG. 14B, a lower perspective view of the depth gauge 1900 affords a clearer view of some of the fiducial 1920 abutment faces 1923, wherein each fiducial 1920 is formed comprising a combination of an abutment channel 1915 formed on the outer surface 1912 of the gauge body 1910 and a protrusion from the outer surface 1912 of the gauge body 1910 wherein both of their distal planar faces combine to form a single planar abutment face 1923 that is parallel with the coupling face 1913 of the gauge body 1910. The distance between the plurality of fiducials 1920 and the coupling face 1913 comprises a plurality of distances between the plurality of fiducials 1920 and the coupling face 1913, wherein the plurality of fiducials 1920 comprise a plurality of abutment faces 1913 positioned to define a plurality of distances between the coupling face 1913 and the plurality of abutment faces 1923. In this embodiment of the depth gauge 1900, eight fiducials 1920 protrude from the outer surface 1912 of the gauge body 1910 with their abutment faces 1923 at varying distances form the coupling face 1913 of the gauge body 1910 ranging from 3/64" to 1/4" wherein each of these distances represent the length of coating that will be stripped form a coated wire when used as intended with a pair of shear type wire strippers. The distances between the abutment faces 1923 and the coupling face 1913 of the gauge body 1910 are given as an example only and may be of any distance a particular application may require. Additionally, while there are eight fiducials 1920 positioned around the perimeter of the gauge body 1910, any number of fiducials may be incorporated into the design as a particular application may require. Visual identifiers 1940 are marked on the outer surface 1912 of the gauge body 1910, positioned proximal to their respective fiducials 1920, wherein in this example they are fractional measurements, but may use any type of measuring system, or any other type of identifier a particular application may require, such as but not limited to, an electrical connector crimp contact part number. The visual identifiers shown herein indicate the distance between the abutment face 1923 of their respective fiducials 1920 and the coupling face 1913 of the gauge body 1910. A recess 1914 is formed into the coupling face 1913 of the gauge body 1910 into which a magnet (see 1950 in FIG. 15D) is disposed. The magnet (see 1950 in FIG. 15D) is mechanically held in place by a magnet retaining cap 1960, or may be secured by any other means a particular application may require, such as but not limited to, press fitting or bonding. The gauge body 1910 in this example embodiment is typically anywhere from 0.20" to 0.40" in diameter, but may be of any diameter a particular application may require. The method of use for this depth gauge 1900 embodiment is identical to the method of use for depth gauge 1700 shown in FIGS. 12A, 12B Additional views of the depth gauge 1900 are shown in FIG. 14C with a proximal plan view thereof, FIG. 14D with a distal plan view thereof, FIG. 14E with a left side elevational view thereof, FIG. 14F with a front side elevational view thereof, FIG. 14G with a right side elevational view thereof, and FIG. 14H with a back side elevational view thereof.

As shown in FIG. 15A, a perspective view of the gauge body 1910 reveals a recess 1914 formed into the distal end of the gauge body 1910 extending to the proximal end of the gauge body 1910 wherein a retaining channel 1915 is formed around the inside surface of the recess 1914 proximal to the coupling face 1913 of the gauge body 1910. Located at the proximal end of the recess 1914 a physical stop 1919 is formed extending toward the distal end of the gauge body 1910. The physical stop 1919 is extend to the position that the magnet (see 1950 in FIG. 15D) proximal face will be located and serves as a stop in order to retain the magnet (see 1950 in FIG. 15D) at the distal end of the gauge body 1910, thus preventing it from moving to the proximal end of the gauge body 1910.

As shown in FIG. 15B, a perspective view of the magnet retaining cap 1960 reveals a cup shaped cap. A retaining bead 1967 is formed around the outer surface of the lip 1966 of the magnet retaining cap 1960. The retaining bead 1967 is designed to engage the retaining channel inside the recess of the gauge body (see 1915, 1914, 1910 in FIG. 15A) in order to mechanically secure the magnet retaining cap 1960 into the open end of the recess (see 1914 in FIG. 15A).

As shown in FIG. 15C, an exploded view of the depth gauge 1900 is depicted featuring the gauge body 1910, the magnet 1950, and the magnet retaining cap 1960.

As shown in FIG. 15D, the cross-sectional view 15D-15D of the depth gauge 1900 shown in FIG. 14C illustrates how a magnet 1950 would be securely disposed at the distal end of the recess 1914 of the gauge body 1910. A physical stop 1919 is integrally formed inside the recess 1914 from a proximal end of the recess 1914 extending to a depth at which a proximal face of the magnet 1950 is to be set. The magnet 1950 is placed into the open end of the recess 1914 of the gauge body 1910 with its proximal face abutted against the distal face of the physical stop 1919, wherein the physical stop 1919 serves to hold the magnet 1950 at a desired position, at the distal end of the gauge body 1910. The magnet retaining cap 1960 is positioned concentrically with the coupling face 1913 of the gauge body 1910 with a portion of its lip 1966 inside the recess 1914. The retaining bead 1967 has a slightly wider diameter than the inside diameter of the recess 1914 so that the lip 1966 and retaining bead 1967 of the magnet retaining cap 1960 must be forced down into the recess 1914 until the retaining bead 1967 engages the retaining channel 1915, while the magnet 1950 is held inside the recess 1964 of the magnet retaining cap 1960 and up against the distal face of the physical stop 1919, thus securing the magnet retaining cap 1960 and magnet 1950 at the distal end of the recess 1914 with a snap-fit engagement. Two fiducials 1920 are visible protruding from the gauge body 1910.

For illustration purposes and not for limitation, another example embodiment of the depth gauge 2000 is shown in FIGS. 16A, 16B, 17A, 17B, 18A-18C, 19, 20, 21 and 22.

Figure 16A:
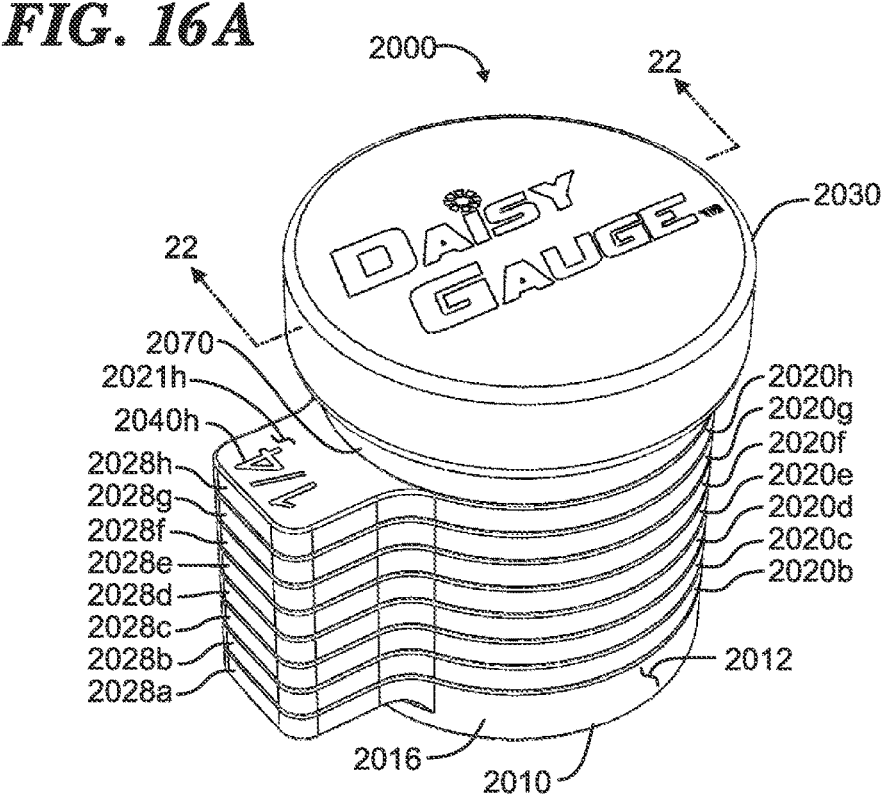
FIGS. 16A-16B show another example embodiment of a depth gauge having a magnetic coupling means with a plurality of stacked rotational fiducials positioned around a tubular gauge body.

As shown in FIG. 16A, the depth gauge 2000 comprises a tubular gauge body 2010, having a distal end and a proximal end, around which seven rotational fiducials 2020b-2020h, having a distal face and a proximal face, made of a rigid material such as, but not limited to, plastic or metal alloy, are able to be manually and independently rotated around its longitudinal axis. The tubular gauge body 2010 has a flange 2016 at its distal end designed to retain the rotational fiducials 2020b-2020h, spacer ring 2070, and compression ring (see 2080 in FIG. 19), in addition to supporting a fiducial 2028a protruding laterally from, its outer surface 2012, wherein the tubular gauge body 2010, flange 2016, and fiducial 2028a are all formed integrally as one piece made of a rigid material such as, but not limited to, plastic or metal alloy. A ¼" visual identifier 2040h is formed or marked on the proximal face 2021h of the fiducial 2028h. A retaining cap 2030 is mechanically coupled to the proximal end of the tubular gauge body 2010 in order to also retain the rotational fiducials 2020b-2020h, spacer ring 2070, and compression ring (see 2080 in FIG. 19). In this image all the fiducials 2028a-2028h are shown at the same rotational position.

Figure 16B:
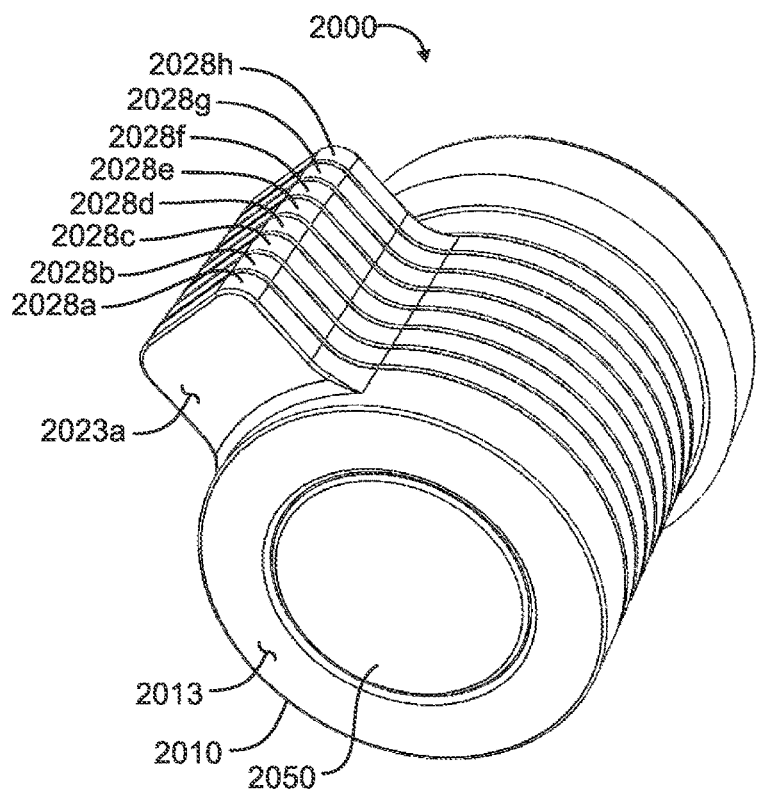

As shown in FIG. 16B, a lower perspective view of the depth gauge 2000 reveals a magnet 2050 disposed within the distal end of the tubular gauge body 2010. The magnet 2050 is secured in place by any method, such as but not limited to, bonding, or press fitting and is used to magnetically couple the coupling face 2013 to a tool such as a pair of shear type wire strippers, or any other cutting or stripping tool a particular application may require. An offset is evident between the coupling face 2013 and the abutment face 2023a of the fiducial 2028a, wherein this offset is the strip depth for that particular abutment face 2023 a. The distance between the plurality of fiducials 2028a-2028h and the coupling face 2013 comprises a plurality of distances between the plurality of fiducials 2028a-2028h and the coupling face 2013, wherein the plurality of fiducials 2028a-2028h comprise a plurality of abutment faces 2023a, [2023b-2023h] positioned to define a plurality of distances between the coupling face 2013 and the plurality of abutment faces 2023a, [2023b-2023h]. The depth gauge 2000 strip depth increments are defined by the thickness of each fiducial, with the exception of fiducial 2023a wherein its strip depth is defined by an offset from the coupling face 2013. However, the thickness of fiducial 2028a defines the strip depth increment between the abutment face 2023a of fiducial 2028a and the abutment face [2023b] of fiducial 2028b which is a ¹⁄₃₂" increment, meaning that the fiducial 2028a is ¹⁄₃₂" thick. The thickness of each rotational fiducial defines the strip depth increment of the rotational fiducial directly above it, wherein the strip depth increments are all ¹⁄₃₂", meaning the rotational fiducials 2028b-2028h are all ¹⁄₃₂" thick. While the strip depth increments are all ¹⁄₃₂" in this this example embodiment of the depth gauge 2000, the strip depth increments may be of any measurement a particular application may require, meaning the rotational fiducials may be of a different uniform thickness, or may be of various thicknesses, within a single depth gauge. Additionally, the quantity of fiducials may vary from one embodiment to another as well. The width of depth gauge 2000 in this example embodiment is typically anywhere from 0.30" to 0.60" in diameter, not counting the fiducials, but may be of any diameter a particular application may require.

Figure 17A:
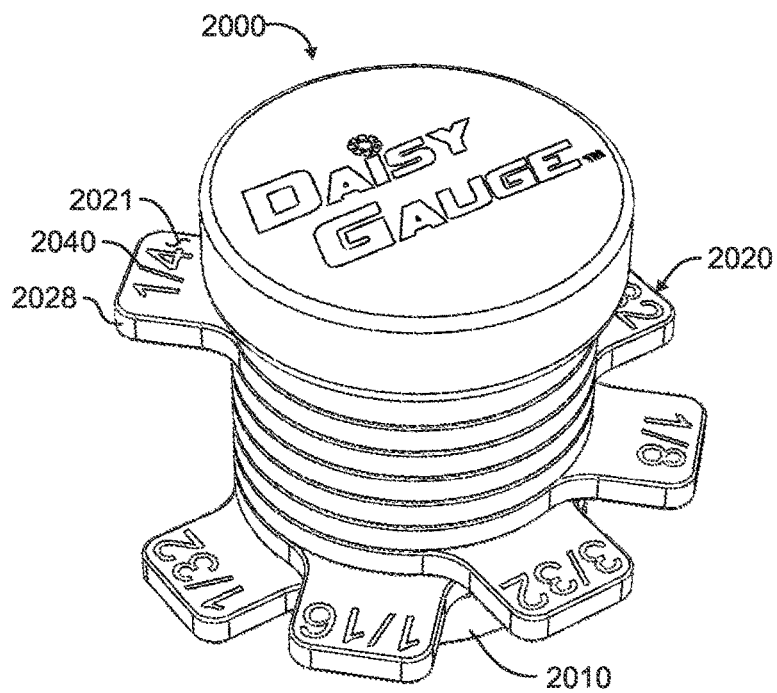
FIGS. 17A-17B show the depth gauge shown in FIGS. 16A-16B with the rotational fiducials rotated to various positions around the gauge body.

As shown in FIG. 17A, a perspective view of the depth gauge 2000 in FIGS. 16A, 16B depicts the eight rotational fiducial 2020 rotated so that their fiducials 2028 are flared out around its perimeter. Visual identifiers 2040, as fractional dimensions, are marked on the proximal face 2021 of each fiducial 2028 and represents the distance between the abutment face (see 2023a in FIG. 16B) of each respective fiducial 2028 and the coupling face (see 2013 in FIG. 16B) of the gauge body 2010, while also indicating the length of coating that will be precisely stripped from the end of a coated wire, when used as intended with a pair of shear type wire strippers.

While this embodiment of the depth gauge 2000 has seven rotational fiducials 2020b-2020h and eight total fiducials 2028a-2028h, any number of rotational fiducials and fiducials may be incorporated into the design as a particular application may require. While this embodiment of the depth gauge has ¹⁄₃₂" thick rotational fiducials, any thickness of rotational fiducials may be incorporated into the design, as a particular application may require. While this embodiment of the depth gauge uses fractions as a unit of measure, any unit of measure, or other information, may be displayed and incorporated into the design, as a particular application may require.

Figure 17B:
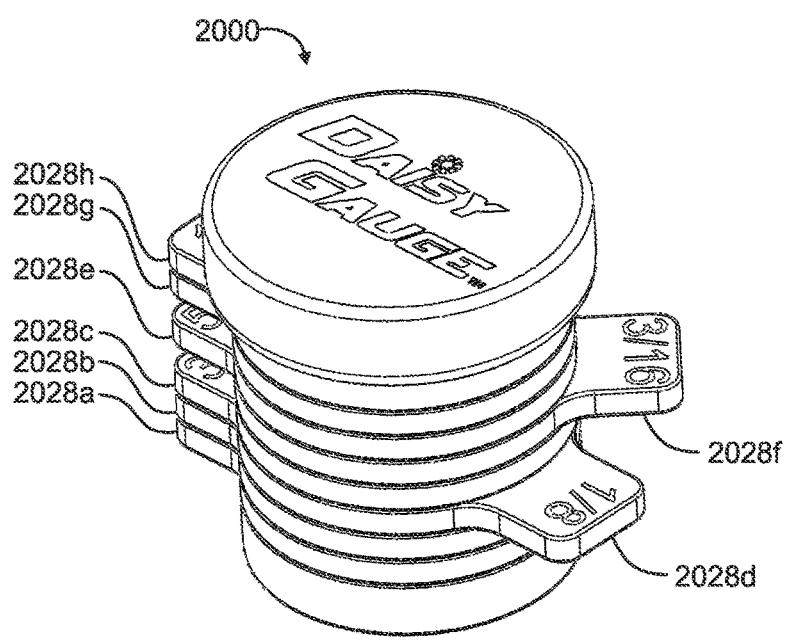

As shown in FIG. 17B, a perspective view of the depth gauge 2000 in FIGS. 16A, 16B depicts the ³⁄₁₆" fiducial 2028f and the ⅛" fiducial 2028d rotated to two adjacent positions opposite the remaining fiducials 2028a-c, e, g, h, without the ⁵⁄₃₂" fiducial 2028e obstructing access to the ³⁄₁₆" fiducial 2028f and the ⅛" fiducial 2028d, which is between the ³⁄₁₆" fiducial 2028f and the ⅛" fiducial 2028d in the stack up of fiducials 2028a-2028h.

Figure 18A:
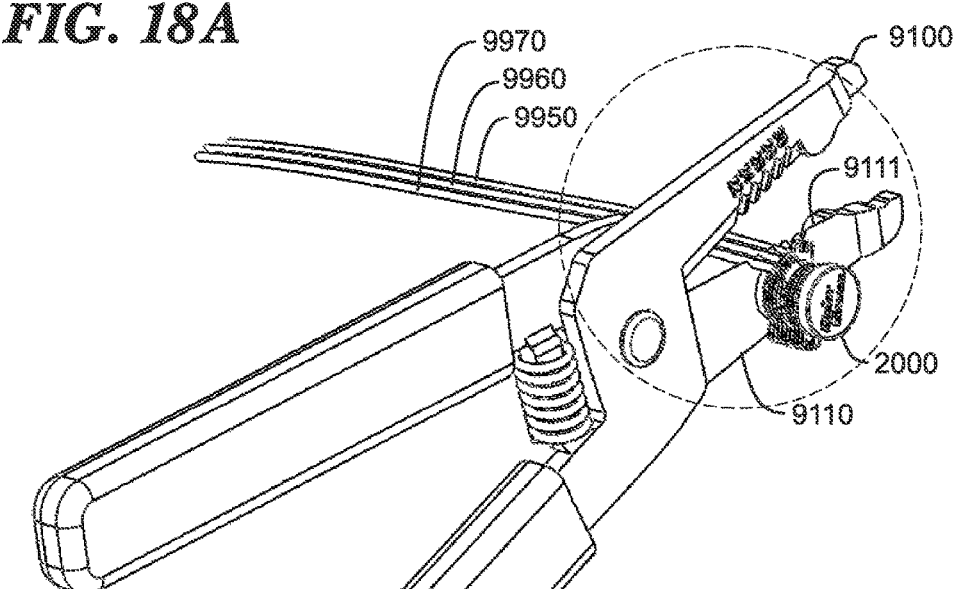
FIGS. 18A-18C show an example method of using the depth gauge shown in FIG. 17B.
Figure 18B:
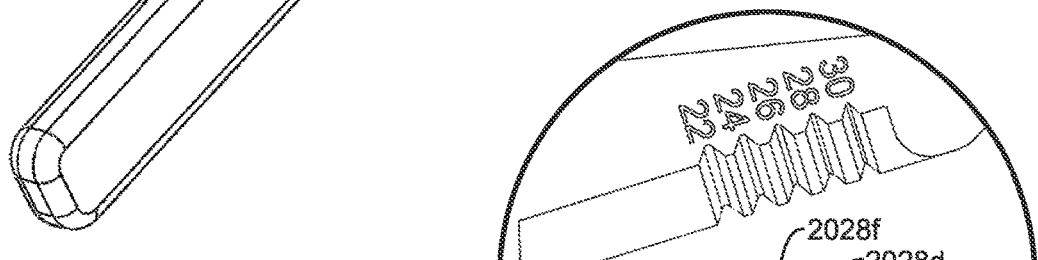
Figure 18C:
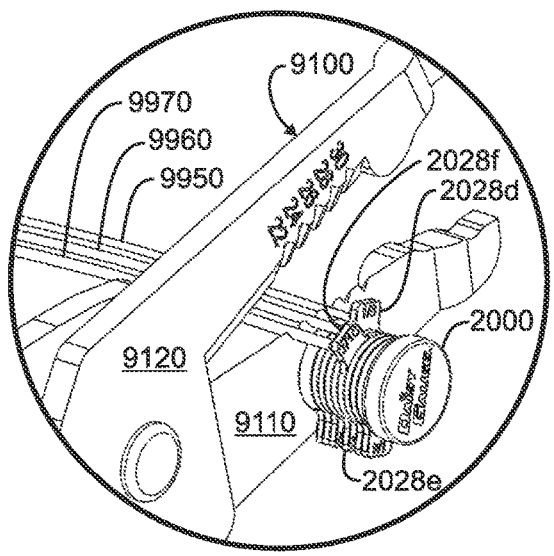

As shown in FIGS. 18A-18C, these images further detail and illustrate an operational example of the embodiments consistent with those shown in FIGS. 16A, 16B, 17A, 17B, 18A-18C, 19, 20, 21 and 22.

As shown in FIG. 18A, the depth gauge 2000 is magnetically coupled to the flat side of the lower jaw 9110 of a pair of shear type wire strippers 9100, similar to wire stripper model 45-125 produced by Ideal® Tool Company in Sycamore, IL, with a 22 gauge 9970, a 24 gauge 9960, and a 26 gauge 9950 coated wire extending past the wire stripper 9100 stripping edge 9111 and up to the depth gauge 2000.

As shown in FIG. 18B, an enlarged sectional and proximal view of the depth gauge 2000 in FIG. 18A is depicted, the depth gauge 2000 is magnetically attached to the flat side of a shear type wire stripper 9100 lower jaw 9110, wherein the ³⁄₁₆" fiducial 2028f and the ⅛" fiducial 2028d are both aligned proximal to the stripping edge 9111, without the ⁵⁄₃₂" fiducial (see 2028e in FIG. 17B) obstructing their access.

As shown in FIG. 18C, an enlarged sectional perspective view of the depth gauge 2000 in FIG. 18A is depicted, the depth gauge 2000 is magnetically attached to the flat side of a shear type wire stripper 9100 lower jaw 9110, illustrating how 22 gauge 9970, and 24 gauge 9960 coated wires can both be precisely stripped of ³⁄₁₆" of their coating, and a 26 gauge coated wire 9950 can be precisely stripped of ⅛" of its coating, all without having to change depth gauges 2000. The ⁵⁄₁₆" fiducial 2028e between the ³⁄₁₆" 2028f and ⅛" 2028d fiducials in the stack up, is positioned with the other unused fiducials and does not obstruct access to the ³⁄₁₆" 2028f and ⅛" 2028d fiducials. The individual coated wires would be placed in position and stripped one at a time, not simultaneously, as this figure is only designed to illustrate the versatility of this embodiment of the depth gauge 2000.

In an operational example, as shown in an enlarged sectional view FIG. 18C of FIG. 18A, the depth gauge 2000 is magnetically coupled to the flat side of the lower jaw 9110 of a pair of shear type wire strippers 9100 with the ³⁄₁₆" fiducial 2028f rotated and aligned proximal to the 22 and 24 gauge slots, and the ⅛" fiducial 2028d rotated and aligned proximal to the 26 gauge slot, of the stripping edge 9111 of the wire stripper 9100 with a 22 gauge coated wire 9970 positioned in the 22 gauge slot of the stripping edge 9111 and extending up to the ³⁄₁₆" fiducial 2028f abutment face [2023f]. The wire stripper 9100 is actuated on the 22 gauge coated wire 9970 extending past the stripping edge 9111 to the fiducial 2028f abutment face [2023f], the wire stripper 9100 cuts a portion of the coating of the 22 gauge coated wire 9970 extending from the stripping edge 9111 to the fiducial 2028f abutment face [2023f] equal the distance between the stripping edge 9111 and the fiducial 2028f abutment face [2023f], wherein the 22 gauge coated wire 9970 is then pulled from between the closed wire stripper jaws 9110 and 9120, whereby a ³⁄₁₆" section of coating is stripped from the 22 gauge coated wire 9970 equal to the ³⁄₁₆" distance between the stripping edge 9111 and the abutment face [2023f] of the fiducial 2028f.

Without making any changes to the depth gauge 2000, a 24 gauge coated wire 9960 positioned in the 24 gauge slot of the stripping edge 9111 and extending up to the ³⁄₁₆" fiducial 2028f abutment face [2023f]. The wire stripper 9100 is actuated on the 24 gauge coated wire 9960 extending past the stripping edge 9111 to the fiducial 2028f abutment face [2023f], the wire stripper 9100 cuts a portion of the coating of the 24 gauge coated wire 9960 extending from the stripping edge 9111 to the fiducial 2028f abutment face [2023f] equal the distance between the stripping edge 9111 and the fiducial 2028f abutment face [2023f], wherein the 24 gauge coated wire 9960 is then pulled from between the closed wire stripper jaws 9110 and 9120, whereby a ³⁄₁₆" section of coating is stripped from the 24 gauge coated wire 9960 equal to the ³⁄₁₆" distance between the stripping edge 9111 and the abutment face [2023f] of the fiducial 2028f.

Without making any changes to the depth gauge 2000, a 26 gauge coated wire 9950 positioned in the 26 gauge slot of the stripping edge 9111 and extending up to the ⅛" fiducial 2028d abutment face [2023d]. The wire stripper 9100 is actuated on the 26 gauge coated wire 9950 extending past the stripping edge 9111 to the fiducial 2028d abutment face [2023d], the wire stripper 9100 cuts a portion of the coating of the 26 gauge coated wire 9950 extending from the stripping edge 9111 to the fiducial 2028d abutment face [2023d] equal the distance between the stripping edge 9111 and the fiducial 2028d abutment face [2023d], wherein the 26 gauge coated wire 9950 is then pulled from between the closed wire stripper jaws 9110 and 9120, whereby a ⅛" section of coating is stripped from the 26 gauge coated wire 9950 equal to the ⅛" distance between the stripping edge 9111 and the abutment face [2023d] of the fiducial 2028d.

Figure 19:
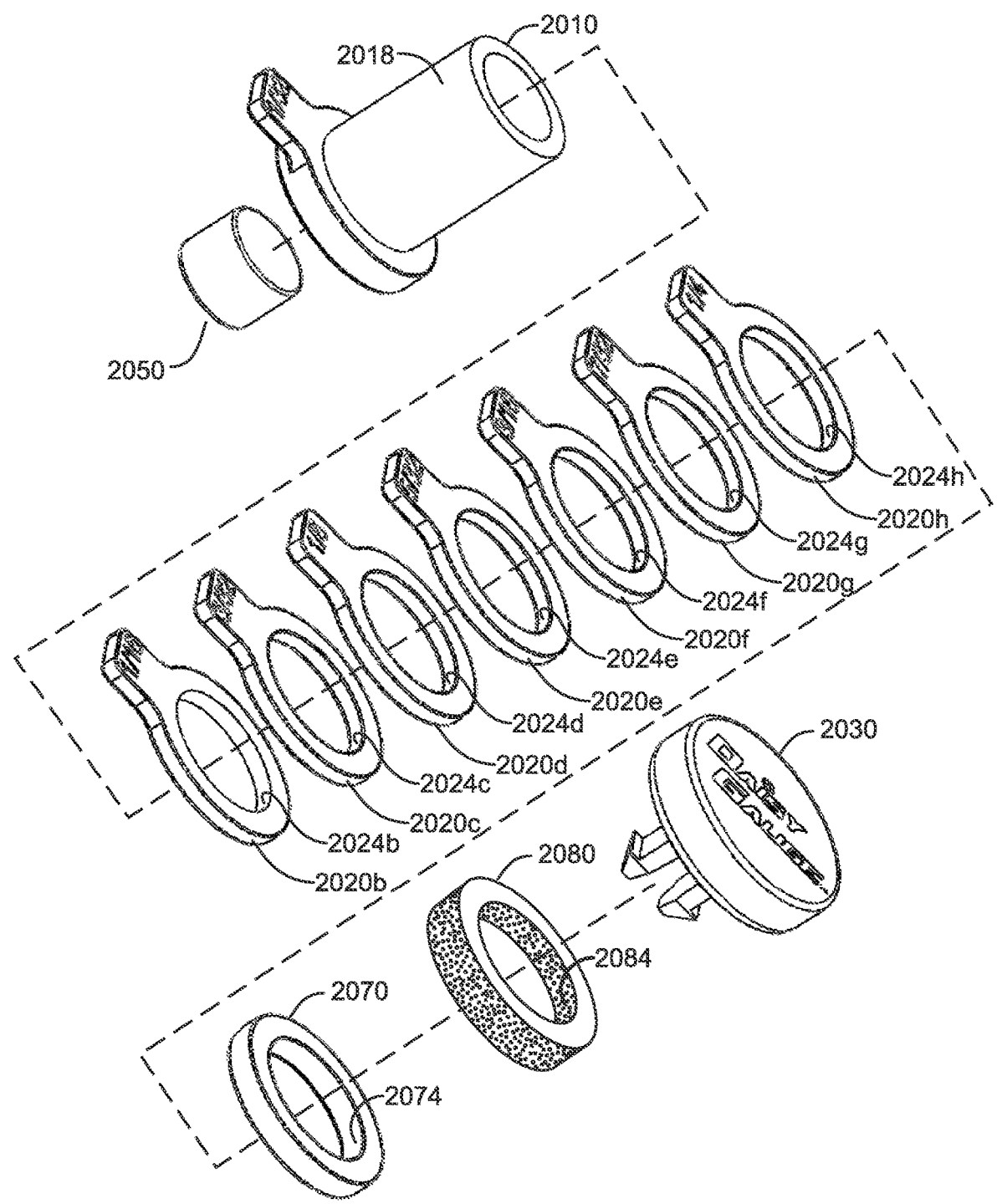
FIG. 19 shows an exploded view of the depth gauge shown in FIGS. 16A-16B.

As shown in FIG. 19 an exploded view of the depth gauge 2000 in FIGS. 16A, 16B, provides an unobstructed view of all its components. The first component is the magnet 2050 located at the upper left position of the image, where next in line is the tubular gauge body 2010, followed by seven rotational fiducials 2020b-2020h, followed by the spacer ring 2070, followed by the compression ring 2080, while last in this exploded view is the retaining cap 2030.

The magnet 2050, having a distal face and a proximal face, may be secured inside the distal end of the tubular gauge body 2010 by any method, such as but not limited to, press fitting, bonding, or any other means a particular application may require.

The tubular gauge body 2010, made of a rigid material such as but not limited to, plastic, metal alloy, or ceramic, having a distal end and a proximal end, is the central structural support for all the other components of this depth gauge 2000 embodiment.

In this example there are seven rotational fiducials 2020b-2020h, made of a rigid material such as but not limited to, plastic, metal alloy, or ceramic, having a distal face and a proximal face, which are placed onto and around the tubular gauge body 2010 with the tubular column 2018 passing through the circular openings 2024b-2024h.

The spacer ring 2070, made of a rigid material such as but not limited to, plastic, metal alloy, or ceramic, having a distal face and a proximal face, is placed onto and around the tubular gauge body 2010 with the tubular column 2018 passing through the circular opening 2074, and provides a buffer and anti-friction means between the top rotational fiducial 2020h and the compression ring 2080.

The compression ring 2080, made of a resilient material, such as but not limited to, foam rubber or rubber, having a distal face and a proximal face, is placed onto and around the tubular gauge body 2010 with the tubular column 2018 passing through the circular opening 2084, and provides a downward force onto the rotational fiducial 2020b-2020h and spacer ring 2070 stack up, upon which it sits. Alternately, a wave washer, compression spring, or other means of providing a downward force on the component stack up may be used in place of, or in conjunction with, the compression ring 2080.

The retaining cap 2030, made of a rigid resilient material such as, but not limited to, nylon or polypropylene, having a distal face and a proximal face, is mechanically coupled to the proximal end of the tubular gauge body 2010 and keeps the rotational fiducials 2020b-2020h, spacer ring 2070, and compression ring 2080 positioned on the tubular column 2018 while providing a downward force on, and partially compresses, the compression ring 2080.

Figure 20:
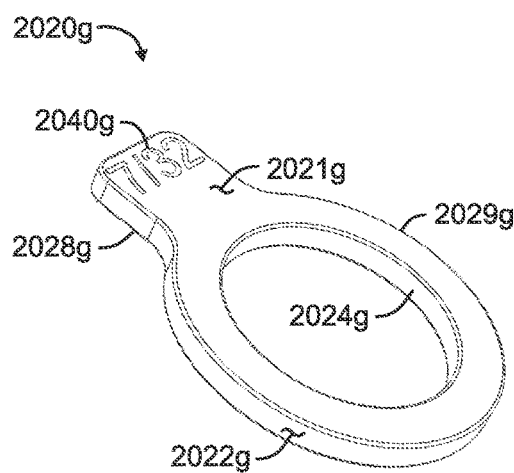
FIG. 20 shows a perspective view of a rotational fiducial of the depth gauge shown in FIGS. 16A-16B.
Figure 21:
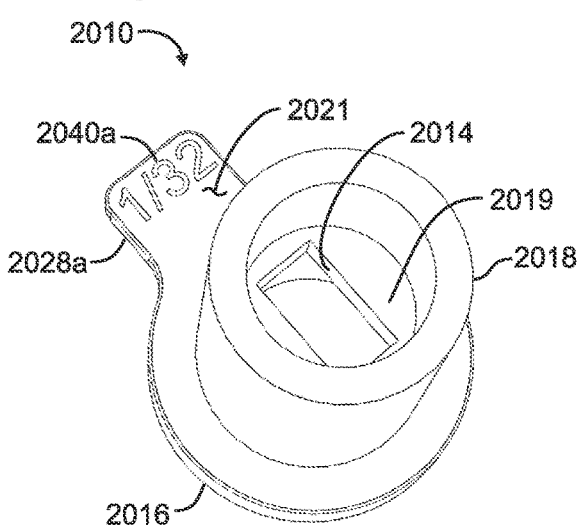
FIG. 21 shows a perspective view of the tubular gauge body of the depth gauge shown in FIGS. 16A-16B.

As shown in FIG. 20, a perspective view of the rotational fiducial 2020g is depicted, made of a rigid material such as but not limited to, plastic, metal alloy, or ceramic, having a distal face and a proximal face, comprising a fiducial ring 2029g, having a circular opening 2024g centrally located while its outer surface 2022g is typically coradial, or near coradial, with the outer surface of the tubular gauge body flange (see 2010, 2016 in FIG. 21). The circular opening 2024g has a close tolerance to the tubular column (see 2018 in FIG. 21) outer diameter, wherein the rotational fiducial 2020g may rotate freely around the tubular column (see 2018 in FIG. 21), but allows little, to no, lateral movement. A fiducial 2028g protrudes laterally from the outer surface 2022g of the rotational fiducial 2020g, while a visual indicator 2040g is marked on the proximal surface 2021g.

As shown in FIG. 21, a perspective view of the tubular gauge body 2010 is depicted, made of a rigid material such as but not limited to, metal alloy, plastic, or ceramic, having a distal end and a proximal end, comprising a tubular column 2018, a flange 2016 located at the distal end of the tubular column 2018, a fiducial 2028a protruding laterally from the outer side surface of the flange 2016, and planar with, the proximal surface 2021 of the flange 2016. The depth gauge further comprising a partition 2019 located centrally inside the tubular column 2018 which is perpendicular to the tubular gauge body 2010 longitudinal axis, while having a rectangular opening 2014 formed through the partition 2019. At least one visual identifier 2040a is formed or marked on the proximal face 2021 at the fiducial 2028a which indicates the distance between the distal coupling face (see 2013 in FIG. 16B) of the tubular gauge body 2010 and the abutment face (see 2023a in FIG. 16B) of the fiducial 2028a, or may indicate a part number of an electrical connector crimp contact, or any other information a particular application may require.

Figure 22:
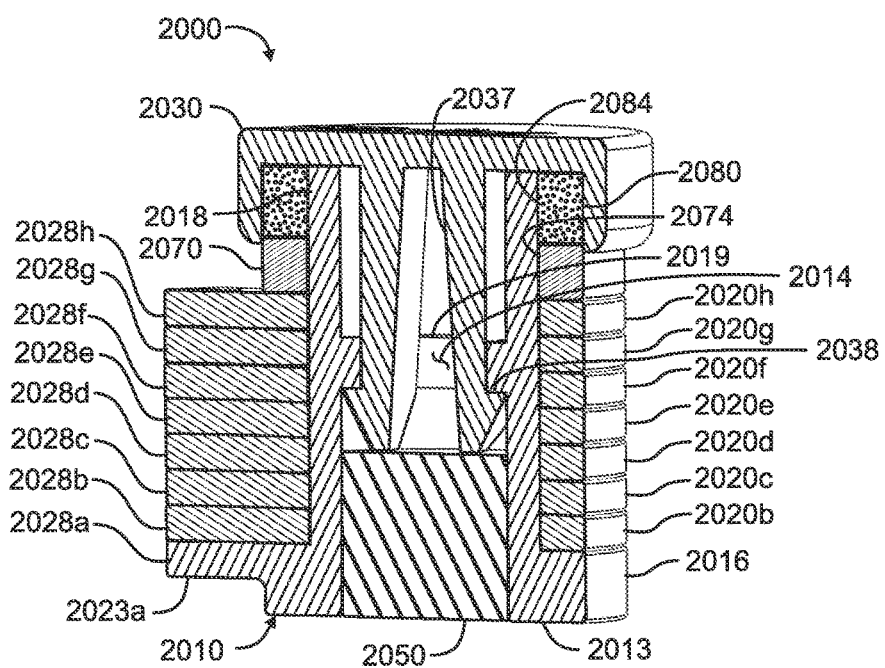
FIG. 22 shows cross-sectional view 22-22 of the depth gauge shown in FIG. 16A.

As shown in FIG. 22, a cross sectional view 22-22 of the depth gauge 2000 in FIG. 16A is depicted, wherein all the fiducials 2028b-2028h of the rotational fiducials 2020b-2020h are rotated to the same position as the gauge body 2010 fiducial 2028a. The rotational fiducials 2020b-2020h are stacked on top of each other and positioned concentrically on top of the flange 2016 with the tubular column 2018 passing through the circular openings (see 2024b-2024h in FIG. 19). The spacer ring 2070 is stacked concentrically on top of the rotational fiducials (see 2020b-2020h in FIG. 16A) with the tubular column 2018 passing through the circular opening 2074. The compression ring 2080 is stacked concentrically on top of the spacer ring 2070 with the tubular column 2018 passing through the circular opening 2084. The retaining cap 2030 is coupled to the proximal end of the tubular gauge body 2010 by inserting the two latch arms 2037 down into the center of the proximal end of the tubular column 2018 and through the rectangular opening 2014 of the partition 2019 wherein the tapered barbs 2038 engage the inside edges of the rectangular opening 2014 thus forcing the two latch arms 2037 to flex inward toward each other, creating stored flexural energy within the two flexed latch arms 2037. The two tapered barbs 2038 progress further through the rectangular opening 2014 until the tapered barbs 2038 pass completely through the rectangular opening 2014 allowing the latch arms 2037 to spring outward to their relaxed state wherein the proximal faces of the tapered barbs 2038 engage the distal face of the partition 2019 thus locking the retaining cap 2030 in place and preventing the retaining cap 2030 from being separated from the tubular gauge body 2010. As the retaining cap 2030 is being coupled to the proximal end of the tubular gauge body 2010, the compression ring 2080 is being compressed, creating stored resistive energy within the compression ring 2080 which transfers a downward force onto the stacked spacer ring 2070 and plurality of rotational fiducials 2020b-2020h below it. This downward force helps keep the rotational fiducials 2020b-2020h from freely rotating around the tubular column 2018 by increasing the drag and friction between them, causing each of them to stay at positions to which they are manually rotated.

The distal end of the tubular gauge body 2010 has a flange 2016 formed integrally around its perimeter as one rigid piece, typically equal in diameter to the rotational fiducials 2020b-2020h wherein a stationary fiducial 2028a is formed integrally with and protrudes laterally from the flange 2016 outer perimeter surface. The flange 2016 is thicker than the thickness of the fiducial 2028a defining a distance between the abutment face 2023a and the coupling face 2013, and is typically thicker than the rotational fiducials 2020b-2020h, but may be of any thickness a particular application may require. In this example the rotational fiducials 2020b-2020h are 1/32" thick, which in turn is equal to the strip depth increments of which the depth gauge 2000 is designed, but may be designed with any thickness increments a particular application may require. The fiducial 2028a is half the thickness of the flange 2016, wherein this example the flange 2016 is 1/16" thick, the fiducial 2028a is 1/32" thick, while the proximal surface of the fiducial 2028a is planar with the proximal surface of the flange 2016, thus creating a 1/32" offset between the tubular gauge body 2010 coupling face 2013 and the abutment face 2023a of the fiducial 2028a. This 1/32" offset is the strip depth, which would be used for stripping 1/32" of coating from a coated wire when used as intended with a shear type wire stripper. While the flange 2016 and fiducial 2028a are formed as one integral feature, the fiducial 2028a could be independent of the flange 2016, and be made as an eighth rotational fiducial, while the flange 2016 would then be 1/32" thick. The magnet 2050 is disposed into the distal end of the tubular gauge body 2010 by press fitting, bonding, or any other means a particular application may require. The distal ends of the latch arm 2037 barbs 2038 also serve as stops in order to help keep the magnet 2050 properly positioned at the distal end if the tubular gauge body 2010.

For illustration purposes and not for limitation, another example embodiment of the depth gauge 2100 is shown in FIGS. 23A, 23B, 24, 25, 26A, 26B, 27, 28A, 28B.

Figure 23A:
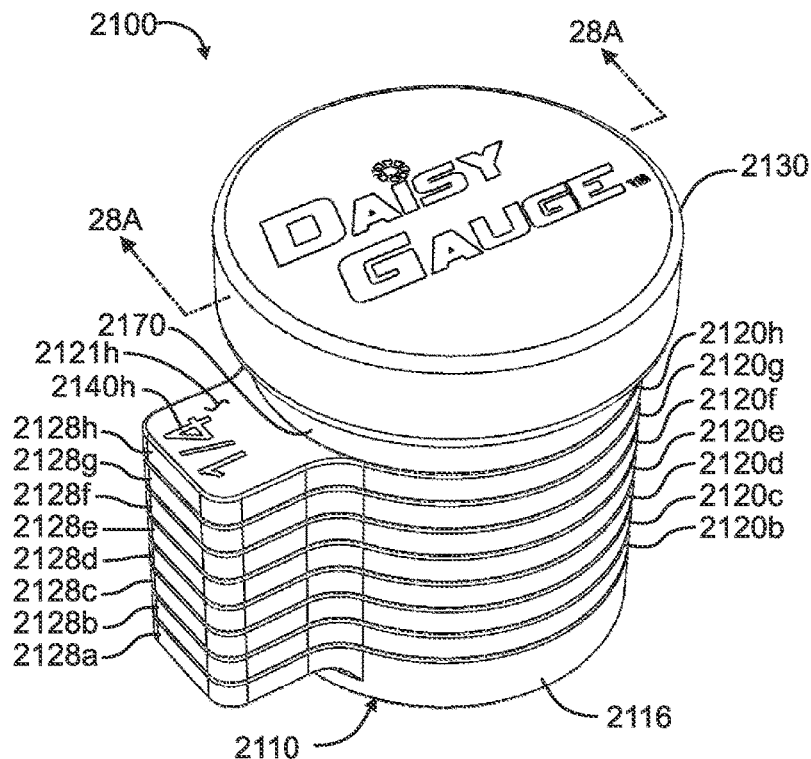
FIGS. 23A-23B show another example embodiment of a depth gauge having a magnetic coupling means with a plurality of stacked indexed rotational fiducials, with indexing dimples, positioned around the tubular gauge body.

As shown in FIG. 23A, the depth gauge 2100 appears identical to the depth gauge 2000 shown in FIG. 16A, with the exception of several features, wherein this example embodiment comprises a tubular gauge body 2110 having a distal and a proximal end, around which seven indexed rotational fiducials 2120b-2120h are able to be manually and independently rotated and will each snap into one of eight repositionable indexed positions. The tubular gauge body 2110 has a flange 2116 designed to retain the indexed rotational fiducials 2120b-2120h, spacer ring 2170, and another feature change, a wave washer (see 2180 in FIG. 27), in addition to supporting a fiducial 2128a, wherein the tubular gauge body 2110, flange 2116, and fiducial 2128a are all formed integrally as one piece made of a rigid material such as, but not limited to, plastic or metal alloy. A 1/4" visual identifier 2140h is formed or marked on the proximal face 2121h of the fiducial 2128h. A retaining cap 2130 is coupled to the proximal end of the tubular gauge body 2110 in order to also retain the indexed rotational fiducials 2120b-2120h, spacer ring 2170, and wave washer (see 2180 in FIG. 27). In this image all the fiducials 2128a-2128h are shown at the same position.

Figure 23B:
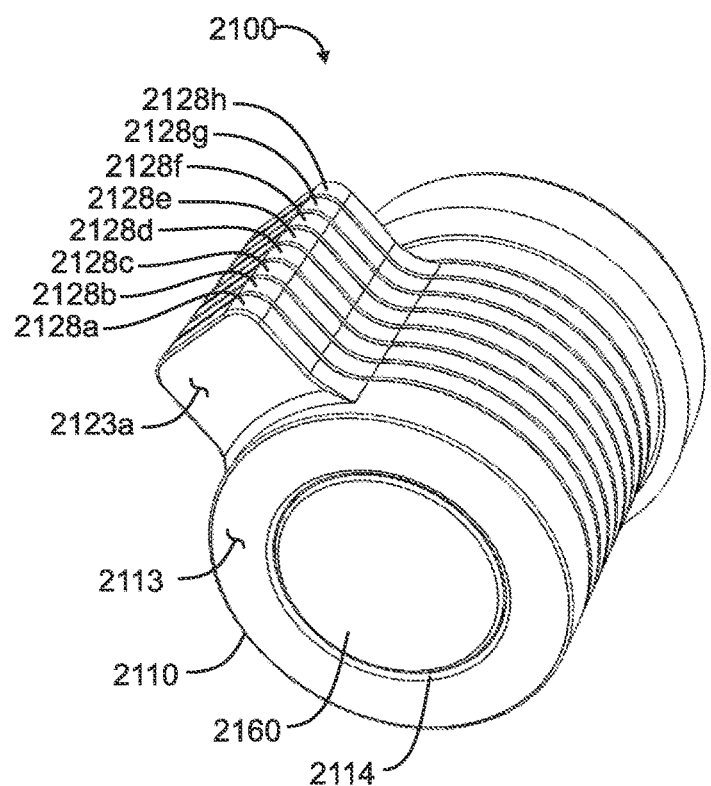

As shown in FIG. 23B, a lower perspective view of the depth gauge 2100 reveals a third exception, a magnet retaining cap 2160 disposed within the distal end of the tubular gauge body 2110. The magnet retaining cap 2160 serves to secure a magnet (see 2150 in FIG. 27) disposed within the distal end of the tubular gauge body 2110. The magnet (see 2150 in FIG. 27) is used to magnetically couple the coupling face 2113 to a tool such as a shear type wire stripper, or any other cutting or stripping tool a particular application may require. An offset is evident between the coupling face 2113 and the abutment face 2123a of the fiducial 2128a, wherein this offset is the strip depth for that particular abutment face 2123a. The distance between the plurality of fiducials 2128a-2128h and the coupling face 2113 comprises a plurality of distances between the plurality of fiducials 2128a-2128h and the coupling face 2113, wherein the plurality of fiducials 2128a-2128h comprise a plurality of abutment faces 2123a, [2123b-2123h] positioned to define a plurality of distances between the coupling face 2113 and the plurality of abutment faces 2123a, [2123b-2123h]. The depth gauge 2100 strip depth increments are defined by the thickness of each indexed rotational fiducial, with the exception of fiducial 2123a wherein its strip depth is defined by an offset from the coupling face 2113. However, the thickness of fiducial 2128a defines the strip depth increment between the abutment face 2123a of fiducial 2128a and the abutment face [2123b] of fiducial 2128b which is a 1/32" increment, meaning that the fiducial 2128a is 1/32" thick. The thickness of each indexed rotational fiducial defines the strip depth increment of the indexed rotational fiducial directly above it, wherein the strip depth increments are all 1/32", meaning the indexed rotational fiducials 2128b-2128h are all 1/32" thick, less the thickness of their male indexing dimples (see 2127g in FIG. 26B). While the strip depth increments are all 1/32" in this this example embodiment of the depth gauge 2100, the strip depth increments may be of any measurement a particular application may require, meaning the indexed rotational fiducials may be of a different uniform thickness, or may be of various thicknesses, within a single depth gauge. Additionally, the quantity of indexed rotational fiducials may vary from one embodiment to another as well. The width of depth gauge 2100 in this example embodiment is typically anywhere from 0.30" to 0.60" in diameter, not counting the fiducials, but may be of any diameter a particular application may require.

Figure 24:
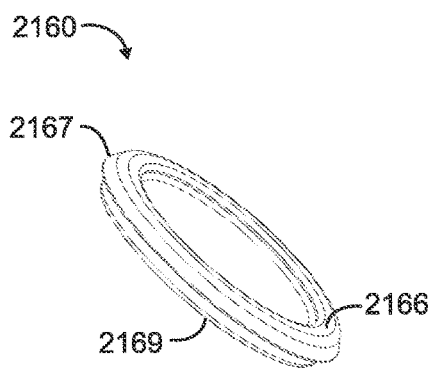
FIG. 24 Shows a perspective view of a magnet retaining cap of the depth gauge shown in FIGS. 23A-23B.

As shown in FIG. 24, a perspective view of the magnet retaining cap 2160 is depicted, having a shallow cup shape comprising a circular base 2169, a lip 2166 around the perimeter of the circular base 2169, and a bead 2167 on and around the outer surface of the lip 2166, while all these features of the magnet retaining cap 2160 are integrally formed as one piece, made of a rigid material, such as but not limited to, plastic or metal alloy, having a distal face and a proximal face. The bead 2167 is designed to be the male portion of a snap-fit engagement in order to mechanically couple the magnet retaining cap 2160 to the distal end of the tubular gauge body (see 2110 in FIG. 25). However, while a snap-fit engagement is used to mechanically couple the magnet retaining cap 2160 to the distal end of the tubular gauge body (see 2110 in FIG. 25), any means may be used to mechanically couple the magnet retaining cap 2160 to the distal end of the tubular gauge body (see 2110 in FIG. 25) as a particular application may require.

Figure 25:
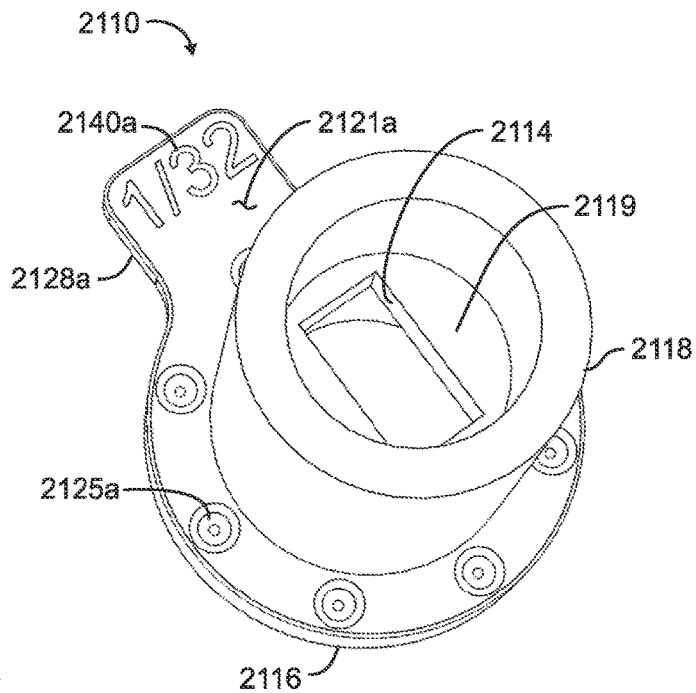
FIG. 25 shows a perspective view of the tubular gauge body of the depth gauge shown in FIGS. 23A-23B having female indexing dimples evenly spaced around a flange.

As shown in FIG. 25, a perspective view of the tubular gauge body 2110 is depicted, having a distal end and a proximal end, comprising a tubular column 2118, a flange 2116 located at the distal end of the tubular column 2118, and a fiducial 2128a protruding laterally from the outer surface of the flange 2116 and planar with the proximal face of the flange 2116, while having a partition 2119 located centrally inside the tubular column 2118, that is perpendicular to the tubular gauge body 2110 longitudinal axis, while having a rectangular opening 2114 formed centrally through the partition 2119, while all these features of the gauge body 2110 are formed integrally as one piece, and made of a rigid material such as, but not limited to, plastic or metal alloy. A plurality of eight evenly spaced concave female indexing dimples 2125a are formed into the proximal face of the flange 2116, along a single radius central to the width of the flange 2116. At least one visual identifier 2140a is formed or marked on the proximal face 2121a of the fiducial 2128a which conveys the distance between the distal coupling face (see 2113 in FIG. 23B) of the tubular gauge body 2110 and the abutment face (see 2123a in FIG. 23B) of the fiducial 2128a. Alternately, the visual identifier 2140a could be a part number of an electrical connector crimp contact, or any other information a particular application may require.

Figure 26A:
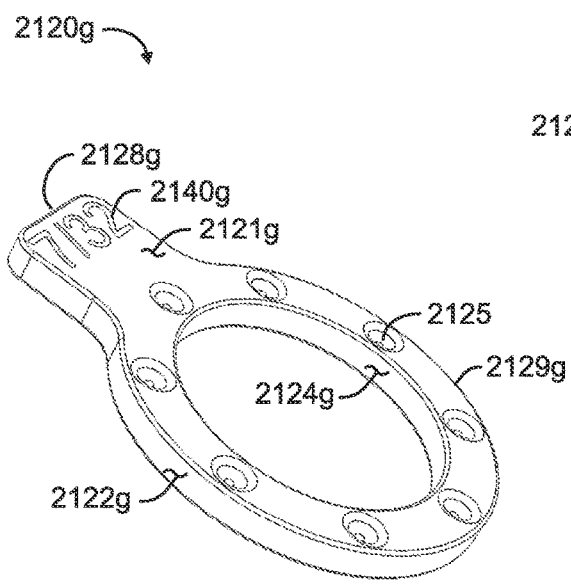
FIGS. 26A-26B show perspective views of an indexed rotational fiducial of the depth gauge shown in FIGS. 23A-23B having male and female indexing dimples evenly spaced around its circumference.

As shown in FIG. 26A, a perspective view of the an indexed rotational fiducial 2120g is depicted, made of a rigid material, such as but not limited to, plastic or metal alloy, having a distal face and a proximal face, comprising a fiducial ring 2129g, having a circular opening 2124g concentrically located, while its outer surface 2122g is coradial, or near coradial, with the outer surface of the tubular gauge body flange (see 2110, 2116 in FIG. 25), female indexing dimples 2125g, and a fiducial, all integrally formed as one rigid piece. The circular opening 2124g diameter has a close tolerance to the tubular gauge body tubular column (see 2110, 2118 in FIG. 25) outside diameter, wherein the indexed rotational fiducial 2120g may rotate freely around the tubular column (see 2118 in FIG. 25), but allows little, to no, lateral movement. A plurality of eight evenly spaced female indexing dimples 2125g are formed into the proximal face 2121g of the fiducial ring 2129g, along a single radius central to the width of the fiducial ring 2129g circular member at the same radial positions as the eight female indexing dimples (see 2125a in FIG. 25) formed into the tubular gauge body flange (see 2110, 2116 in FIG. 25). A fiducial 2128g protrudes laterally from the outer surface 2122g of the fiducial ring 2129g, while a visual indicator 2140g is marked on the proximal face 2121g. When using the depth gauge 2100 with a shear type wire striper as intended, the available strip depth increments are equal to the thickness of each rotational fiducial, less the thickness of its male indexing dimples.

Figure 26B:
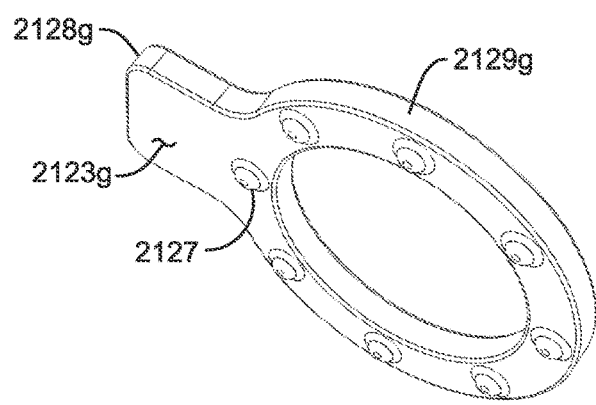

As shown in FIG. 26B a lower perspective view of the an indexed rotational fiducial 2120g in FIG. 26A is depicted, revealing a plurality of eight evenly spaced convex male indexing dimples 2127g formed onto the distal surface 2123g of the fiducial ring 2129g, along a single radius central to the width of the fiducial ring 2129g circular member at the same radial positions as the female indexing dimples (see 2125g in FIG. 26A) formed into the proximal face (see 2121g in FIG. 26A) of the fiducial ring 2129g, wherein the central axis of each male indexing dimple 2127g is collinear with their respective female indexing dimple (see 2125g in FIG. 26A) central axis. In this example the male indexing dimples 2127g and female indexing dimples (see 2125g in FIG. 26A) are in sets of eight, which in turn translates to eight different indexed positions at which each indexed rotational fiducial (see 2120b-2120h in FIG. 23A) may be rotated to. The male and female indexing dimples, fiducials, and indexed rotational fiducials may be of any quantity a particular application may require.

As shown in FIG. 27 an exploded view of the depth gauge 2100 shown in FIGS. 23A, 23B is depicted, wherein the first component is a magnet retaining cap 2160 located at the upper left position of the image, next in line is the magnet 2150, followed by the tubular gauge body 2110, followed by seven indexed rotational fiducials 2120b-2120h, followed by a spacer ring 2170, followed by a wave washer 2180, and last in this exploded view is the retaining cap 2130.

The magnet retaining cap 2160 is mechanically coupled to the distal end of the tubular gauge body 2110 by means of a snap-fit engagement and retains the magnet 2150 at the distal end of the tubular gauge body 2110. However, any means may be used to retain the magnet 2150 at the distal end of the gauge body 2110.

The magnet 2150 magnetically, having a distal face and a proximal face, couples the depth gauge 2100 to a tool and is secured inside the distal end of the tubular gauge body 2110 by the magnet retaining cap 2160. However, any means may be used to retain the magnet 2150 at the distal end of the gauge body 2110, such as but not limited to, press fitting or bonding.

The tubular gauge body 2110, made of a rigid material such as, but not limited to, plastic, metal alloy, or ceramic, having a distal end and a proximal end, is the central structural support for all the other components of this depth gauge 2100 example embodiment.

In this example embodiment there are seven indexed rotational fiducials 2120b-2120h, made of a rigid material such as, but not limited to, plastic, metal alloy, or ceramic, having a distal face and a proximal face, which are placed onto and around the tubular gauge body 2110 with the tubular column 2118 passing through each opening 2124b-2124h.

The spacer ring 2170, made of a rigid material such as, but not limited to, plastic, metal alloy, or ceramic, having a distal face and a proximal face, is placed onto and around the tubular gauge body 2110 with the tubular column 2118 passing through the opening 2174, and provides a buffer and anti-friction means between the top rotational fiducial 2120h and a wave washer 2180.

The wave washer 2180 is made of a thin flexible and resilient material such as, but not limited to, spring steel sheet metal, having a distal face and a proximal face, is placed onto and around the tubular gauge body 2110 with the tubular column 2118 passing through the opening 2184, and provides a downward force onto the indexed rotational fiducials 2120b-2120h and spacer ring 2170 stack up, upon which it sits. Alternately, a foam rubber compression ring, a compression spring, or other means of providing a downward force on the component stack up may be used in place of, or in conjunction with, the wave washer 2180.

The retaining cap 2130, made of a rigid resilient material such as, but not limited to, nylon or polypropylene, having a distal face and a proximal face, is mechanically coupled to the proximal end of the tubular gauge body 2110 and keeps the indexed rotational fiducials 2120b-2120h, spacer ring 2170, and wave washer 2180 situated on the tubular column 2118 while providing a downward force on, and slightly compressing, the wave washer 2180.

Figure 28A:
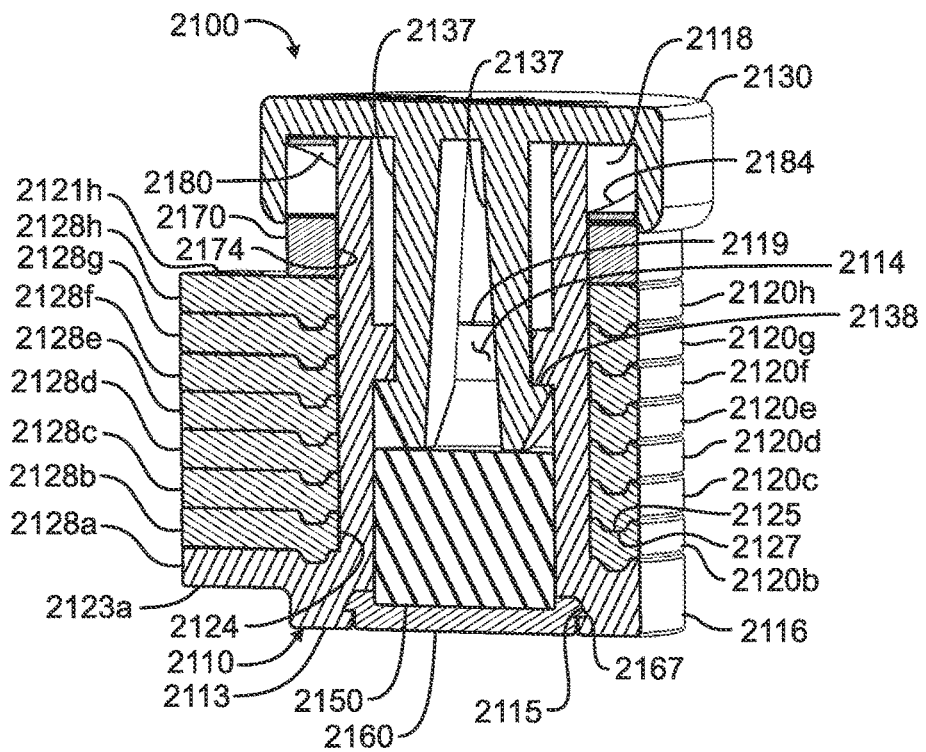
FIG. 28A shows cross-sectional view 28A-28A of the depth gauge shown in FIG. 23A.

As shown in FIG. 28A a cross sectional view 28A-28A of the depth gauge 2100 shown in FIG. 23A is depicted, wherein all the fiducials 2128b-2128h of the indexed rotational fiducials 2120b-2120h are rotated to the same position as the gauge body 2110 fiducial 2128a. The indexed rotational fiducials 2120b-2120h are stacked on top of each other and positioned concentrically on top of the flange 2116 with the tubular column 2118 passing through the circular openings 2124. The spacer ring 2170 is stacked concentrically on top of the indexed rotational fiducials 2120b-2120h with the tubular column 2118 passing through the circular opening 2174. The wave washer 2180 is stacked concentrically on top of the spacer ring 2170 with the tubular column 2118 passing through the circular opening 2184. The retaining cap 2130 is mechanically coupled to the proximal end of the tubular gauge body 2110 by inserting the two latch arms 2137 down into the center of the proximal end of the tubular column 2118 and through the rectangular opening 2114 of the partition 2119 wherein the tapered faces of the barbs 2138 engage two opposing edges of the rectangular opening 2114 thus causing the two latch arms 2137 to flex inward toward each other, creating stored flexural energy within the flexed latch arms 2137. The two tapered barbs 2138 progress further through the rectangular opening 2114 until the tapered barbs 2138 pass completely through the rectangular opening 2114 allowing the latch arms 2137 to spring outward to their relaxed state wherein the proximal faces of the tapered barbs 2138 engage the distal face of the partition 2119 thus preventing the retaining cap 2130 from being separated from the tubular gauge body 2110. The distal ends of the latch arm 2137 barbs 2138 also abut a proximal face of the magnet 2150 and serve as stops in order to keep the magnet 2150 properly positioned at the distal end if the tubular gauge body 2110. As the retaining cap 2130 is being coupled to the proximal end of the tubular gauge body 2110 the wave washer 2180 is slightly compressed creating stored flexural energy within the wave washer 2180 which transfers a force down onto the stacked spacer ring 2170 and indexed rotational fiducials 2120b-2120h below it. This downward force helps keep the indexed rotational fiducials 2120b-2120h from freely rotating around the tubular column 2118 by increasing the drag and friction between them, while also helping to keep the male indexing dimples 2127 nested within the female indexing dimples 2125, causing each of the indexed rotational fiducials 2120 to stop at preset indexed positions to which they are manually rotated, and may also be rotated to any one of seven additional indexed positions, for a total of eight indexed positions. However, the depth gauge 2100 may be configured with any number of rotational fiducial indexed positions a particular application may require.

The distal end of the tubular gauge body 2110 has a flange 2116 formed integrally around its perimeter as one rigid piece, typically equal in diameter to the indexed rotational fiducials 2120b-2120h wherein a stationary fiducial 2128a is formed integrally with and protrudes laterally from the flange 2116 outer perimeter surface. The flange 2116 is thicker than the thickness of the fiducial 2128a defining a distance between the abutment face 2123a and the coupling face 2113, and is typically thicker than the indexed rotational fiducials 2120b-2120h, but may be of any thickness a particular application may require. In this example the indexed rotational fiducials 2120b-2120h are $\frac{1}{32}$", thick less the thickness of the male indexing dimples 2127, which in turn is equal to the strip depth increments of which the depth gauge 2100 is designed, when all fiducials are of a uniform thickness. The fiducial 2128a is half the thickness of the flange 2116, wherein this example the flange 2116 is $\frac{1}{16}$" thick, the fiducial 2128a is $\frac{1}{32}$" thick, while the proximal face of the fiducial 2128a is planar with the proximal face of the flange 2116, thus defining a $\frac{1}{32}$" offset between the tubular gauge body 2110 coupling face 2113 and the abutment face 2123a of the fiducial 2128a. This $\frac{1}{32}$" offset is the strip depth, which would be used for stripping $\frac{1}{32}$" of coating from a coated wire when used as intended with a shear type wire stripper. While the flange 2116 and fiducial 2128a are formed as one integral feature, the fiducial 2128a could be independent of the flange 2116, and be made as an eighth rotational fiducial, while the flange 2116 would then be $\frac{1}{32}$" thick.

The magnet 2150 is disposed inside the distal end of the tubular gauge body 2110 and is contained within the tubular gauge body 2110 by a retaining cap 2160 which is secured to the distal end of the tubular gauge body 2110 via a snap-fit engagement wherein a bead 2167 is nested within a channel 2115. However, the magnet 2150 may be alternately held in place at the distal end of the tubular gauge body 2110 by press fitting, bonding, or any other means a particular application may require.

In this example the indexed rotational fiducials 2120b-2120h are all $\frac{1}{32}$" thick, less the thickness of the male indexing dimples 2127 formed on their distal faces (see example 2123g in FIG. 26B), which corresponds to the $\frac{1}{32}$"

strip depth increments of which this embodiment of the depth gauge 2100 is designed. Each indexed rotational fiducial 2120*b*-2120*h* has a fiducial 2128*b*-2120*h* protruding laterally from its outer surface (see example 2122*g* in FIG. 26A), and a plurality of eight concave female indexing dimples 2125 formed into their proximal faces, and eight convex male indexing dimples 2127 protruding from their distal faces, evenly spaced around its perimeter (see example 2121*g* in FIG. 26A and example 2123*g* in FIG. 26B), excluding the top fiducial 2120*h*, which only has male indexing dimples 2127 on the distal face. The ¼" top fiducial 2120*h* does not have female indexing dimples 2125 on its proximal face 2121*h* because the spacer ring 2170 located above it does not have male indexing dimples. All male and female indexing dimples 2125, 2127, are located in radially identical positions on each of the indexed rotational fiducials 2120*b*-2120*h* and the flange 2116, so that they all align vertically when stacked and are able to nest with each other while having their fiducials 2128*b*-2128*h* also aligned to the same position. The male and female indexing dimples 2125, 2127, are designed to nest inside each other when the indexed rotational fiducial 2120*b*-2120*h* are stacked, and to stop the indexed rotational fiducial 2120*b*-2120*h* at any one of eight set indexed rotational positions, wherein they may be manually rotated from one indexed position to another.

Figure 28B:
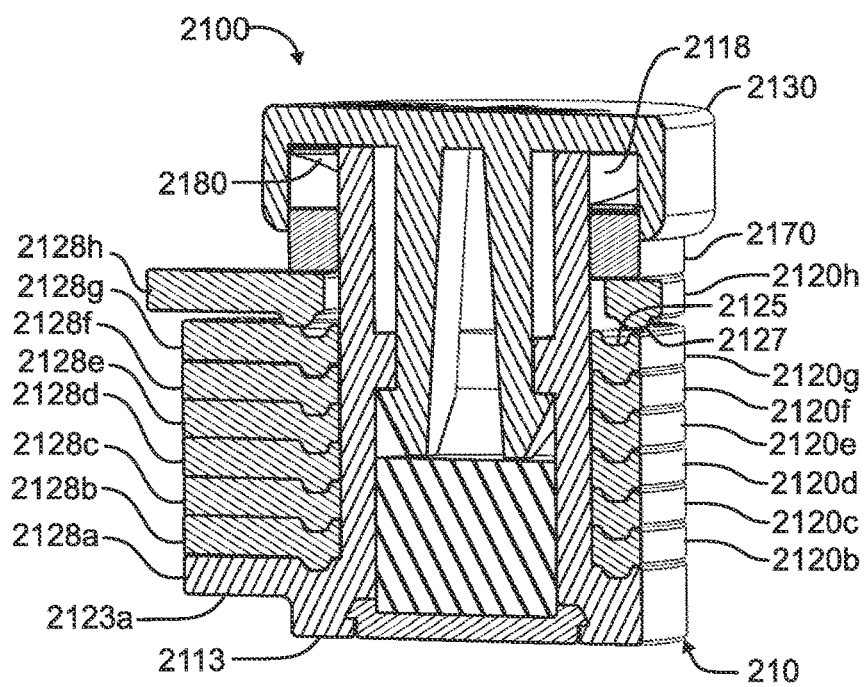
FIG. 28B shows the cross-sectional view of FIG. 26A having the top indexed rotational fiducial slightly rotated in a counterclockwise direction.

As shown in in FIG. 28B, the depth gauge 2100 is identical to the depth gauge 2100 in FIG. 28A except the top indexed rotational fiducial 2120*h* is rotated slightly in a counterclockwise direction wherein, as the indexed rotational fiducial 2120*h* is manually rotated, its lower convex male indexing dimples 2127*h* un-nest from the concave female indexing dimples 2125*g* below it, thus raising the rotated indexed rotational fiducial 2120*h* slightly above the indexed rotational fiducial 2120*g* until the male indexing dimples 2127*h* nest with the female indexing dimples 2125*g* again at the next rotational indexed position allowing the indexed rotational fiducial 2120*h* to drop and sit flush on the indexed rotational fiducial 2120*g* below it. When the indexed rotational fiducial 2120*h* is rotated and its male indexing dimples 2127*h* rise up out of the female indexing dimples 2125*g* below it, causing the indexed rotational fiducial 2120*h* to also rise, and in turn, the spacer ring 2170 is also forced upward into the end cap 2130, further compressing the already slightly compressed wave washer 2180 as it maintains a constant downward resistive force. As the indexed rotational fiducial 2120*h* is rotated further, the male indexing dimples 2127*h* slide along the proximal face (see 2121*g* in FIG. 26A) of the indexed rotational fiducial 2120*g* below it until the male indexing dimples 2127*h* drop down into the next female indexing dimples 2125*g* caused by the downward force of the spacer ring 2170 exerted by the wave washer 2180 as it slightly decompresses. This is repeated as the male indexing dimples 2127*h* disengage and engage other female indexing dimples 2125*g* as the indexed rotational fiducial 2120*h* is manually rotated around the tubular gauge body 2110 tubular column 2118 until the indexed rotational fiducial 2120*h* fiducial 2128*h* is rotated to its desired preset indexed position. Each fiducial 2128*a*-2128*h* is marked with a visual identifier (see example 2140*g* in FIG. 26A) on its proximal face (see example 2121*g* in FIG. 26A) corresponding to its position in the stack up and the distance defined between its distal face (see example 2123*g* in FIG. 26B) and the coupling face 2113 of the tubular gauge body 2110 when all indexed rotational fiducials 2120*b*-2120*h* and their male and female indexing dimples are properly nested.

In an operational example, this embodiment of the depth gauge 2100 is operated in the same manner as the depth gauge 2000 in FIGS. 18A-18C, with the enhancement of indexed rotational fiducial 2120*b*-2120*h*.

For illustration purposes and not for limitation, another example embodiment of the depth gauge is shown in FIGS. 29A-29H, 30A-30C.

As shown in FIG. 29A a perspective view of another embodiment of the depth gauge 2200 is depicted, having a distal end and a proximal end, wherein this embodiment comprises a single fiducial 2220 spanning two gauge bodies 2210 which allows the fiducial 2220 to cover an entire array of wire gauge slots of a shear type wire stripper. A visual identifier 2240 is marked on the proximal face 2221 of the depth gauge 2200. In this example the visual identifier is a fractional measurement of ⅛" which is the length of coating that will be stripped from a coated wire when the depth gauge 2200 is used as intended with a shear type wire stripper.

As shown in FIG. 29B a lower perspective view of the depth gauge 2200 shown in FIG. 29A is depicted, wherein a plurality of gauge bodies 2210, integrally formed on the abutment face 2223 of the fiducial 2220, and a plurality of magnets 2250 are visible. The fiducial 2220 and gauge bodies 2210 are integrally formed as one rigid piece made of a material such as, but not limited to, plastic or metal alloy. The gauge bodies 2210 and magnets 2250, in this example embodiment of the depth gauge 2200, have a rectangular profile, but may be of any shape profile a particular application may require. The gauge bodies 2210 and magnets 2250 are oriented with their opposing corners aligned vertically and horizontally in order to allow any striped sections of wire coating to more easily fall between the fiducial 2220 and the jaw of a shear type wire stripper when stripped, but may be oriented in any manner a particular application may require. While two gauge bodies 2210 and magnets 2250 are incorporated into this embodiment of the depth gauge 2200, any number, size, or shape gauge bodies 2210 and magnets 2250 may be incorporated in the design as a particular application may require. This example embodiment of the depth gauge 2200 is configured to strip ⅛" of coating from a coated wire. The distance between the fiducial 2220 and the coupling faces 2213 comprises a distance between the fiducial 2220 and the coupling faces 2213, wherein the fiducial 2220 comprises an abutment face 2223 positioned to define a distance between the coupling faces 2213 and the abutment face 2223.

Magnets 2250 are disposed into recesses 2214 formed into each of the gauge body 2210 coupling faces 2213 and may be held in place by any means such as, but not limited to, press fitting, or bonding. The magnets 2250 serve to removably couple the depth gauge 2200 to the jaw of a shear type wire stripper. While this embodiment of the depth gauge is designed for a coated wire strip depth of ⅛", any strip depth could be incorporated into the design as a particular application may require by changing the length of the gauge bodies 2210, while the length of the gauge bodies 2210 will be identical. The width of the depth gauge 2200 would typically be wide enough to span the full array of gauge slots in the stripping edge 9111.

Additional views of the depth gauge 2200 are shown in FIG. 29C with a front side elevational view thereof, FIG. 29D with a back side elevational view thereof, FIG. 29E with a right side elevational view thereof, FIG. 29F with a proximal plan view thereof, FIG. 29G with a left side elevational view thereof, and FIG. 29H with a distal plan view thereof.

As shown in FIG. 30A, the depth gauge 2200 is magnetically coupled to the flat side of the lower jaw 9110 of a pair of shear type wire strippers 9100, similar to wire stripper model 45-125 produced by Ideal® Tool Company in Sycamore, IL, with five coated wires of various gauges extending past the wire stripper 9100 stripping edge 9111 and up to the depth gauge 2200 fiducial 2220.

As shown in FIG. 30B an enlarged sectional perspective view of the depth gauge 2200 shown in FIG. 30A is depicted, magnetically coupled to the flat side of a shear type wire stripper 9100 lower jaw 9110, illustrating how the fiducial 2220 spans all of the slots of the stripping edge 9111.

As shown in FIG. 30C an enlarged sectional perspective view shown from the opposite side of the view in FIG. 30B is depicted, wherein the depth gauge 2200 is magnetically coupled to the flat side of a shear type wire stripper 9100 lower jaw 9110, illustrating how the five coated wires of various gauges pass through their respective slots of the stripping edge 9111 and abut the abutment face 2223 of the fiducial 2220. The five wires of various gauges are shown positioned in their respective slots for illustrative purposes only, and would be stripped individually one at a time, whereby when a coated wire is positioned in its respective slot of the stripping edge 9111, extending past the stripping edge 9111, and abuts the fiducial 2220 abutment face 2223, the wire stripper 9100 is actuated on the coated wire extending past the stripping edge 9111 to the abutment face 2223, the wire stripper cuts a portion of a coating of the coated wire extending from the stripping edge 9111 to the abutment face 2223 equal to the distance between the stripping edge 9111 and the fiducial 2220 abutment face 2223, whereby the coated wire is then pulled out from between the closed wire stripper 9200 jaws 9210, 9220 thus stripping a ⅛" section of coating from the proximal end of the coated wire. Once the coating has been stripped from the coated wire, the trapped ⅛" section of stripped coating will need to be pushed down between the lower jaw 9110 and the abutment face 2223, allowing it to fall away from the wire stripper 9100 and depth gauge 2200. Typically, the next wire to be stripped is easily used for this task. In order to strip a different gauge of coated wire, a second gauge coated wire is passed through a second gauge slot and abuts the fiducial 2220 abutment face 2223 defining a ⅛" strip depth between the stripping edge 9111 and the fiducial 2220 abutment face 2223, whereby the wire stripper 9100 is actuated on the on the second gauge coated wire, the wire stripper cuts a portion of a coating of the second gauge coated wire extending from the stripping edge 9111 to the fiducial abutment face 2223 equal to the distance between the stripping edge 9111 and the fiducial abutment face 2223, whereby the second gauge coated wire is then pulled out from between the closed wire stripper 9100 jaws 9110, 9120 thus stripping a ⅛" section of coating from the proximal end of the second gauge coated wire.

This depth gauge 2200 embodiment would be useful for stripping a variety of coated wire gauges at the same strip depth, wherein this example they would all be stripped of ⅛" of coating.

For illustration purposes and not for limitation, another example embodiment of the depth gauge is shown in FIGS. 31A-31H, 32A-32C.

As shown in FIG. 31A, a perspective view of another embodiment of the depth gauge 2300 is depicted, having a distal side and a proximal side, whereas this embodiment is of an elongated gauge body 2310 having a plurality of fiducials 2320a-2320f. The depth gauge 2300 comprising an elongated gauge body 2310 with a plurality of ascending plateaus resembling a staircase with stair treads protruding from at least one side of the gauge body 2310 wherein each protruding stair tread is one of a plurality of fiducials 2320a-2320f, with the gauge body 2310 and fiducials 2320a-2320f formed integrally as one piece, and made of a rigid material such as, but not limited to, plastic or metal alloy. This embodiment example has six fiducials 2320a-2320f with strip depths ranging from 1/32" to 3/16" in 1/32" increments, but may be made with any quantity of fiducials 2320a-2320f, and any length of strip depths, a particular application may require. Visual identifiers 2340 are marked on the proximal surface 2321 of each fiducial 2320a-2320f wherein this example the visual identifiers 2340 are fractional measurements, but may be of any information a particular application requires such as, but not limited to metric or decimal measurements, or electrical connector crimp contact part numbers.

As shown in FIG. 31B, a lower perspective view of the depth gauge 2300 shown in FIG. 31A is depicted, wherein the depth gauge 2300 incorporates at least one magnet to removably couple itself to the wire stripper. A rectangular magnet 2350 is disposed within a rectangular recess 2314 formed into the coupling face 2313 of the gauge body 2310. However any size, shape, or quantity of magnets may be incorporated into the design, as a particular application may require. The coated wire strip depths are each defined by the distance between the coupling face 2313 of the gauge body 2310 and the abutment face 2323 of each fiducial 2320. The distance between each fiducial 2320 and the coupling face 2313 comprises a distance between each fiducial 2320 and the coupling face 2313, wherein each fiducial 2320 comprises an abutment face 2323 positioned to define a distance between the coupling face 2313 and each abutment face 2323. The width of the depth gauge 2300 would typically be wide enough to span the full array of gauge slots in the stripping edge 9111.

Additional views of the depth gauge 2300 are shown in FIG. 31C with a proximal plan view thereof, FIG. 31D with a distal plan view thereof, FIG. 31E with a left side elevational view thereof, FIG. 31F with a front side elevational view thereof, FIG. 31G with a right side elevational view thereof, and FIG. 31H with a back side elevational view thereof.

FIGS. 32A-32C further detail and illustrate an operational example of the embodiments consistent with those shown in FIGS. 31A-31H.

As shown in FIG. 32A, the depth gauge 2300 is magnetically coupled to a shear type wire stripper 9100, similar to wire stripper model 45-125 produced by Ideal® Tool Company in Sycamore, IL, with a 26 gauge coated wire 9950 engaging the wire stripper 9100 and the depth gauge 2300.

As shown in FIG. 32B, an enlarged sectional perspective view of the depth gauge 2300 shown in FIG. 32A is depicted, magnetically coupled to the flat side of a shear type wire stripper 9100 lower jaw 9110, wherein a 26 gauge coated wire 9950 passes through a 26 gauge slot 9115 in the stripping edge 9111 and abuts the 5/32" fiducial 2320e.

As shown in FIG. 32C, an enlarged sectional perspective view shown from the opposite side of the view in FIG. 32B is depicted, wherein the depth gauge 2300 is magnetically coupled to the flat side of a shear type wire stripper 9100 lower jaw 9110, wherein a 26 gauge coated wire 9950 passes through a 26 gauge slot 9115 in the stripping edge 9111 and abuts the 5/32" abutment face 2323e, whereby the wire stripper 9100 is actuated on the coated wire 9950 extending past the stripping edge 9111 to the abutment face 2323e, the wire stripper cuts a portion of a coating of the coated wire 9960 extending from the stripping edge 9111 to the abutment face 2423e equal to the distance between the stripping edge 9111 and the abutment face 2423e. Once the coating has been stripped from the coated wire, the trapped 1/8" section of stripped coating will need to be pushed from between the lower jaw 9110 and the abutment face 2223, allowing it to fall away from the wire stripper 9100 and depth gauge 2200. Typically, the next wire to be stripped is easily used for this task. The depth gauge 2300 can be slid along the flat side of the lower jaw 9110, parallel with the stripping edge, so that other fiducials can align with the 26 gauge slot 9115, or other slots along the stripping edge 9111. In order to strip a different gauge of coated wire with a different strip depth, a second fiducial is aligned proximal to a second gauge slot, wherein a second gauge coated wire is passed through the second gauge slot and abuts the second fiducial abutment face defining a second strip depth between the stripping edge 9111 and the second fiducial abutment face, whereby the wire stripper 9100 is actuated on the on the second gauge coated wire, the wire stripper cuts a portion of a coating of the second gauge coated wire extending from the stripping edge 9111 to the second fiducial abutment face equal to the distance between the stripping edge 9111 and the second fiducial abutment face, whereby the second gauge coated wire is then pulled out from between the closed wire stripper 9100 jaws 9110, 9120 thus stripping a second length section of coating from the proximal end of the second gauge coated wire.

For illustration purposes and not for limitation, another example embodiment of the depth gauge is shown in FIGS. 33A-33H, 34A-34C.

Figure 33A:
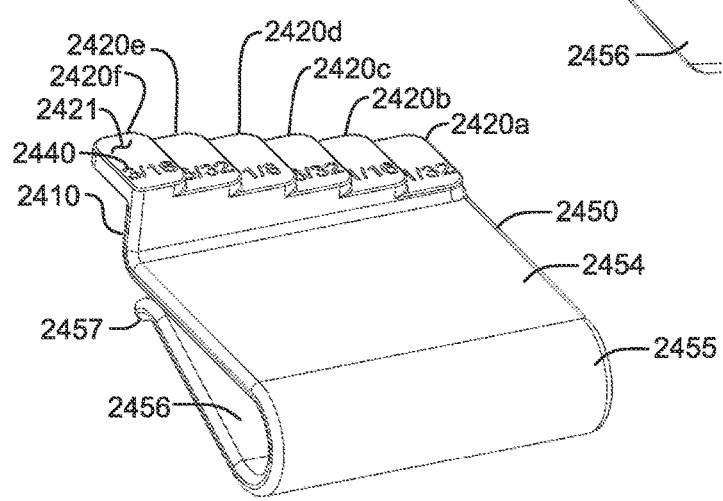
FIGS. 33A-33H show another example embodiment of a depth gauge having a pinch clip coupling means supporting a planar gauge body defining a plurality of graduated plateaus each having a fiducial protruding from its side that are planer with their respective plateau, resembling a staircase.

As shown in FIG. 33A, a perspective view of another embodiment of the depth gauge 2400 is depicted, wherein this embodiment is similar to the depth gauge 2300 in FIG. 31A, but rather than incorporating a magnet as a coupling means, the depth gauge 2400 instead uses a pinch type clip 2450, similar to a binder clip or money clip, in order to removably couple itself to the jaw of a shear type wire stripper. Like the previous depth gauge 2300 embodiment in FIGS. 31A, 31B, this depth gauge 2400 embodiment incorporates a series of ascending fiducials 2420a-2420f, similar to a staircase, protruding latterly from the side of a gauge body 2410. The depth gauge 2400 has six strip depths ranging from 1/32" to 3/16" in 1/32" increments, but may be of any number of fiducials and length of strip depths a particular application may require. The depth gauge 2400 gauge body 2410, fiducials 2420a-2420f, and the pinch clip 2450 coupling means are all formed integrally as one piece, and is made of a resilient rigid material such as, but not limited to, plastic, composite, or sheet metal spring steel. This example embodiment of the depth gauge 2400 comprises a vertical planar gauge body 2410, having a distal side and a proximal side, that is stepped down in height from 3/16" to 1/32", in 1/32" intervals with one of each of the six fiducials 2420a-2420f protruding from the same side of the gauge body 2410 and flush with the proximal face of their respective step, as to create the appearance of a flight of stair steps. At least one visual identifier 2440 is marked on the proximal face 2421 of each fiducial 2420a-2420f wherein this example fractional measurements are incorporated into the design, but may be of any information a particular application requires such as, but not limited to metric or decimal measurements, or electrical connector crimp contact part numbers.

The coupling means in this example embodiment of the depth gauge 2400 is a pinch clip 2450 comprising a stationary planar clip base 2454 protruding from the opposite side of the gauge body 2410 than the fiducials 2420a-2420f, having its width equal to the length of the gauge body 2410 wherein the clip base 2454 extends to, and is integrally formed with, and tangent to, a living torsion spring 2455 that curves back toward the gauge body 2410 and under the clip base 2454, wherein the living torsion spring 2455 extends to, and is integrally formed with, and tangent to, a torsion arm 2456 that is angled, and extends, toward the clip base 2454 and gauge body 2410 junction and is integrally formed with, and tangent to, a torsion arm foot 2457 that is curved away from the clip base 2454. The torsion arm 2456 is shorter in length than the clip base 2454 so that the pinch point, the point where the torsion arm foot 2457 is closest to the clip base 2454, falls short of the clip base 2454 and gauge body 2410 junction, which is designed to ensure that the clip base 2454 lays flat against the flat face of a jaw of a shear type wire stripper that is placed between them. The torsion arm foot 2457 is curved similar to the front end of a ski and is designed to deflect the torsion arm 2456 away from the clip base 2454 when a wire stripper jaw is forced between the torsion arm foot 2457 and the clip base 2454, thus creating a stored counter torsion energy concentrated at the living torsion spring 2455 which in turn provides a constant torsional force of the torsion arm foot 2457 against the wire stripper jaw, which removably couples the depth gauge 2400 to the shear type wire stripper. Once the depth gauge 2400 is coupled to the shear type wire stripper, it can then be positioned so that a particular fiducial can be aligned proximal to a particular slot located along the stripping edge of a shear type wire stripper.

Figure 33B:
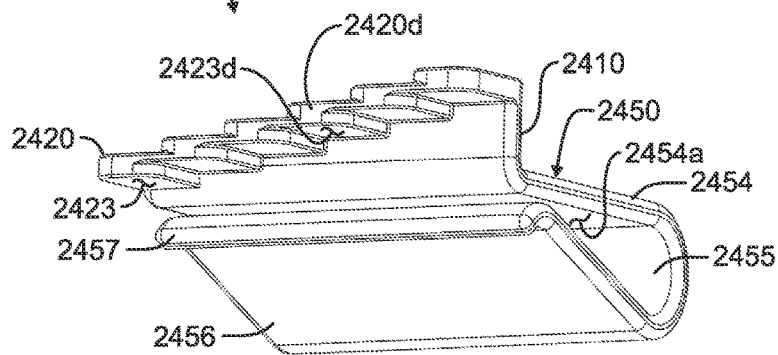

As shown in FIG. 33B, a lower perspective view of the depth gauge 2400 shown in FIG. 33A is depicted, which more clearly illustrates the relationship between the fiducials 2420, gauge body 2410 and pinch clip 2450 coupling means. The wire coating strip length is defined by the distance between the coupling face 2454a of the clip base 2454 and each fiducial 2420 abutment face 2423. The distance between each fiducial 2420 and the coupling face 2413 comprises a distance between each fiducial 2420 and the coupling face 2454a, wherein each fiducial 2420 comprises an abutment face 2423 positioned to define a distance between the coupling face 2454a and each abutment face 2323. For example, a 1/8" fiducial 2420d is positioned on the gauge body 2410 so that its abutment face 2423d is precisely 1/8" from the coupling face 2454a of the clip base 2454. The relationship between the pinch clip 2450 components is also more evident, wherein the torsion arm foot 2457 is positioned very close, less than the thickness of a shear type wire stripper jaw, to the coupling surface 2454a and is set back from the junction of the gauge body 2410 and clip base 2454 in order to hold the coupling face 2454a flat against the flat surface of a wire stripper jaw. Because the torsion arm foot 2457 and the coupling surface 2454a are so close together, forcing the jaw of a shear type wire stripper, which is thicker than the gap between the torsion arm foot 2457 and the coupling surface 2454a, would cause the torsion arm foot 2457 to deflect the torsion arm 2456 away from the clip base 2454 and widen the radius of the living torsion spring 2455, thus creating an opposing torsion force within the living torsion spring 2455, in turn, creating a pinch type grip between the torsion arm foot 2457 and the clip base 2454 on the wire stripper jaw. The width of the depth gauge 2400 would typically be wide enough to span the full array of gauge slots in the stripping edge 9111.

Figure 33C:
Figure 33D:
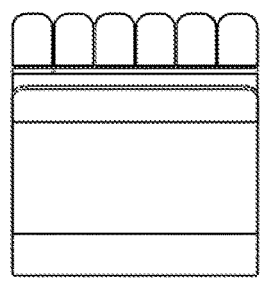
Figure 33E:
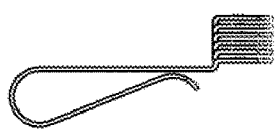
Figure 33F:
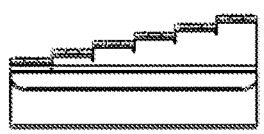
Figure 33G:
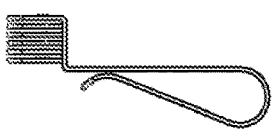
Figure 33H:
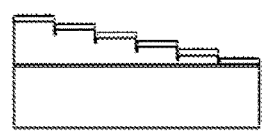

Additional views of a resilient spring steel sheet metal embodiment of the depth gauge 2400 are shown in FIG. 33C with a proximal plan view thereof, FIG. 33D with a distal plan view thereof, FIG. 33E with a left side elevational view thereof, FIG. 33F with a front side elevational view thereof, FIG. 33G with a right side elevational view thereof, and FIG. 33H with a back side elevational view thereof.

Figure 34A:
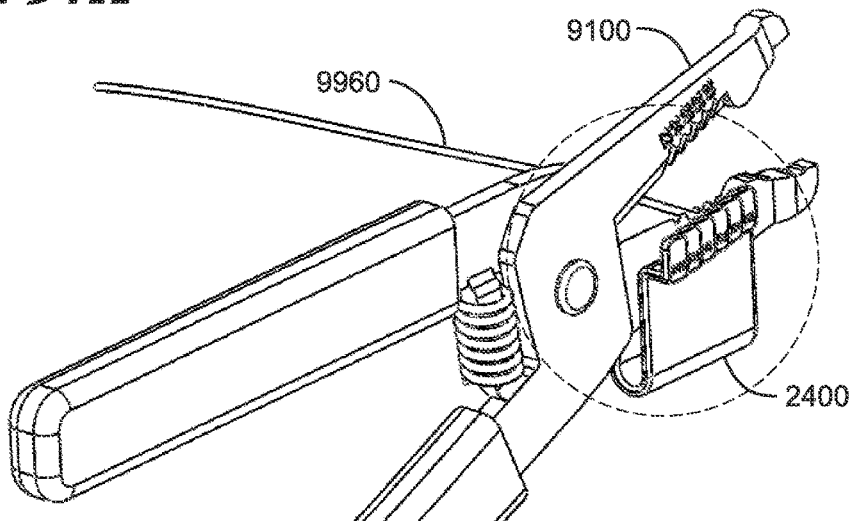
FIGS. 34A-34C show an example method of using the depth gauge shown in FIGS. 33A-33H.
Figure 34B:
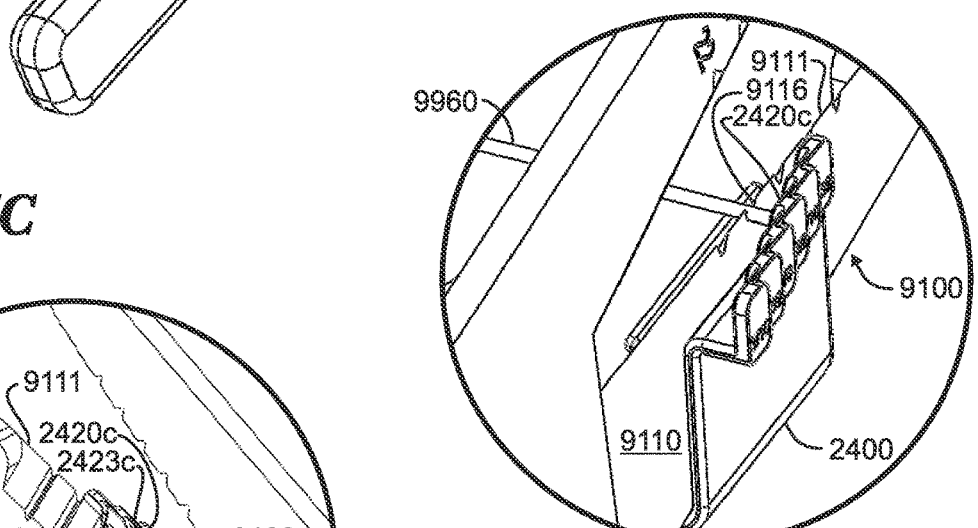
Figure 34C:
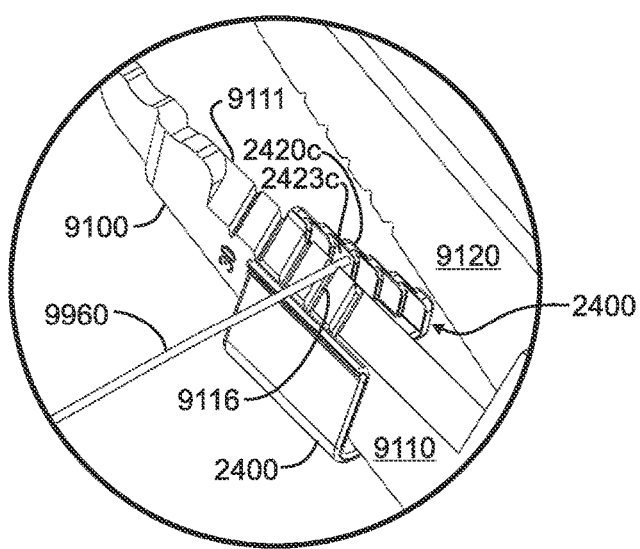

FIGS. 34A-34C, further detail and illustrate an operational example of the embodiments consistent with those shown in FIGS. 33A-33H.

As shown in FIG. 34A, the depth gauge 2400 is mechanically coupled to a shear type wire stripper 9100, similar to wire stripper model 45-125 produced by Ideal® Tool Company in Sycamore, IL, with a 24 gauge coated wire 9960 engaging the wire stripper 9100 and the depth gauge 2400.

As shown in FIG. 34B, an enlarged sectional perspective view of the depth gauge 2400 shown in FIG. 34A is depicted, mechanically coupled to a shear type wire stripper 9100 lower jaw 9110, wherein a 24 gauge coated wire 9960 passes through a 24 gauge slot 9116 in the stripping edge 9111 and abuts the 3⁄32" fiducial 2420c.

As shown in FIG. 34C, an enlarged sectional perspective view shown from the opposite side of the view in FIG. 34B is depicted, wherein the depth gauge 2400 is mechanically coupled to a shear type wire stripper 9100 lower jaw 9110, wherein a 24 gauge coated wire 9960 passes through a 24 gauge slot 9116 in the stripping edge 9111 and abuts the 3⁄32" fiducial 2420c, whereby the wire stripper 9100 is actuated on the coated wire 9960 extending past the stripping edge 9111 to the abutment face 2423c, the wire stripper cuts a portion of a coating of the coated wire 9960 extending from the stripping edge 9111 to the abutment face 2423c equal to the distance between the stripping edge 9111 and the fiducial 2420 abutment face 2423c. Once the coating has been stripped from the coated wire, the trapped 1⁄8" section of stripped coating will need to be pushed from between the lower jaw 9110 and the abutment face 2223, allowing it to fall away from the wire stripper 9100 and depth gauge 2400. Typically, the next wire to be stripped is easily used for this task. The depth gauge 2400 can be slid along the lower jaw 9110 so that other fiducials can align with the 24 gauge slot 9116, or other slots along the stripping edge 9111. In order to strip a different gauge of coated wire with a different strip depth, a second fiducial is aligned proximal to a second gauge slot, wherein a second gauge coated wire is passed through the second gauge slot and abuts the second fiducial abutment face defining a second strip depth between the stripping edge 9111 and the second fiducial abutment face, whereby the wire stripper 9100 is actuated on the on the second gauge coated wire, the wire stripper cuts a portion of a coating of the second gauge coated wire extending from the stripping edge 9111 to the second fiducial abutment face equal to the distance between the stripping edge 9111 and the second fiducial abutment face, whereby the second gauge coated wire is then pulled out from between the closed wire stripper 9100 jaws 9110, 9120 thus stripping a second length section of coating from the proximal end of the second gauge coated wire.

For illustration purposes and not for limitation, another example embodiment of the depth gauge is shown in FIGS. 35A-35H, 36, 37A-37C.

As shown in FIG. 35A, a perspective view of another embodiment of the depth gauge 2500 is depicted, comprising a gauge body 5210, a fiducial 2520 and a mechanical coupling means which are all formed integrally as one piece, and is made of a resilient rigid material such as, but not limited to, plastic, composite, or sheet metal spring steel, wherein this embodiment is similar to the depth gauge 2400 in FIG. 33A, 35B, but rather than incorporating multiple fiducials into one depth gauge, the depth gauge 2500, instead has a single fiducial 2520 protruding laterally from the proximal end of the gauge body 2510. This example embodiment of the depth gauge 2500 comprises a vertical planar gauge body 2510, having a distal end and a proximal end that merges with a single fiducial 2520 protruding laterally from the gauge body 2510 proximal end. At least one visual identifier 2540 is marked on the proximal face 2521 of the fiducial 2520 wherein this example, a fractional measurement is incorporated into the design, but may be of any information a particular application requires such as, but not limited to, metric or decimal measurements, or electrical connector crimp contact part numbers.

The coupling means in this example embodiment of the depth gauge 2500 is a pinch clip 2550 comprising a stationary planar clip base 2554 protruding laterally from the distal end of the gauge body 2510, and from the opposite side of the gauge body 2510 than the fiducial 2520, having its width equal to the width of the gauge body 2510 wherein the clip base 2554 extends to, and is integrally formed with, and tangent to, a living torsion spring 2555 that curves back toward the gauge body 2510 and under the clip base 2554, wherein the living torsion spring 2555 extends to, and is integrally formed with, and tangent to, a torsion arm 2556 that is angled, and extends, toward the clip base 2554 and gauge body 2510 junction and is integrally formed with, and tangent to, a torsion arm foot 2557 that is curved away from the clip base 2554. The torsion arm 2556 is shorter in length than the clip base 2554 so that the pinch point, the point where the torsion arm foot 2557 is closest to the clip base 2554, falls short of the clip base 2554 and gauge body 2510 junction, which is designed to ensure that the clip base 2554 lays flat against the flat face of a jaw of a shear type wire stripper that is placed between them. The torsion arm foot 2557 is curved similar to the front end of a ski and is designed to deflect the torsion arm 2556 away from the clip base 2554 when a wire stripper jaw is forced between the torsion arm foot 2557 and the clip base 2554, thus creating a stored counter torsion energy concentrated at the living torsion spring 2555 which in turn provides a constant torsional force of the torsion arm foot 2557 against the wire stripper jaw, which removably couples the depth gauge 2500 to the shear type wire stripper. Once the depth gauge 2500 is coupled to the shear type wire stripper, it can then be positioned so that a fiducial can be aligned with one of the slots located along the stripping edge of a shear type wire stripper.

As shown in FIG. 35B, a lower perspective view of the depth gauge 2500 shown in FIG. 35A is depicted, which more clearly illustrates the relationship between the fiducial 2520, gauge body 2510 and pinch clip 2550 coupling means. The distance between the fiducial 2520 and the coupling face 2554a of the clip base 2554 comprises a distance between the fiducial 2520 and the coupling face 2554a, wherein the fiducial 2520 comprises an abutment face 2523 positioned to define a distance between the coupling face 2554a and the abutment face 2523. For example, a 1⁄8" fiducial is positioned on the gauge body 2510 so that its abutment face 2523 is precisely 1⁄8" form the coupling face 2554a of the clip base 2554. The relationship between the pinch clip 2550 components is also more evident, wherein the torsion arm foot 2557 is positioned very close, less than the thickness of a shear type wire stripper jaw, to the coupling face 2554a and is set back from the junction of the gauge body 2510 and clip base 2554 in order to hold the coupling face 2554a flat against the flat surface of a wire stripper jaw. Because the torsion arm foot 2557 and the coupling face 2554a are so close together, forcing the jaw of a shear type wire stripper in between the torsion arm foot 2557 and the coupling face 2554*a*, which is thicker than the gap between the torsion arm foot 2557 and the coupling face 2554*a*, would cause the torsion arm foot 2557 to deflect the torsion arm 2556 away from the clip base 2554 and widen the radius of the living torsion spring 2555, thus creating an opposing torsion force within the living torsion spring 2555, in turn, creating a pinch type grip between the torsion arm foot 2557 and the clip base 2554 on the wire stripper jaw.

Additional views of a resilient sheet metal spring steel embodiment of the depth gauge 2500 are shown in FIG. 35C with a proximal plan view thereof, FIG. 35D with a distal plan view thereof, FIG. 35E with a left side elevational view thereof, FIG. 35F with a front side elevational view thereof, FIG. 35G with a right side elevational view thereof, and FIG. 35H with a back side elevational view thereof.

As shown in FIG. 36, the depth gauge 2500 can be produced in a variety strip depths wherein this example there are six different variations of the depth gauge 2500*a*-2500*f* that range from 1/32" to 3/16" strip depths in 1/32" increments, but may be of any quantity depth gauge 2500, any length strip depth, and in any increments a particular application may require.

Figure 37A:
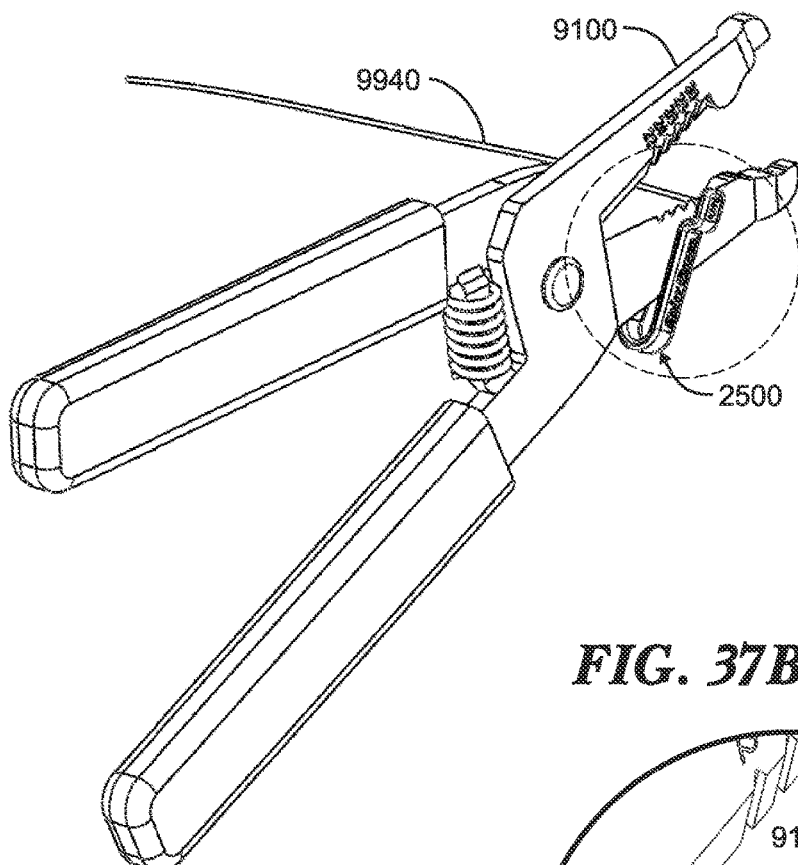
FIGS. 37A-37C show an example method of using the depth gauge shown in FIGS. 35A-35B.
Figure 37B:
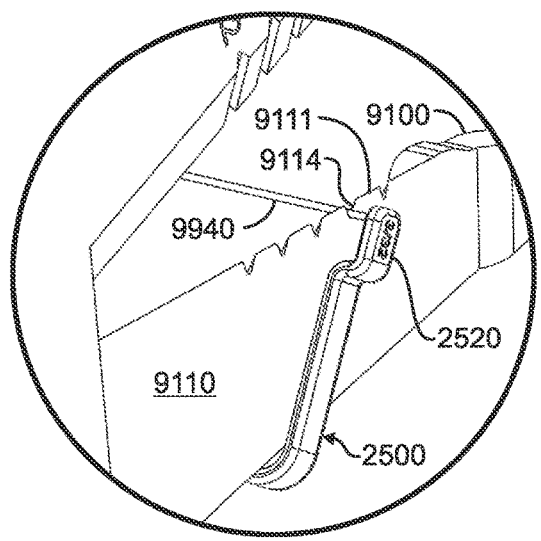
Figure 37C:
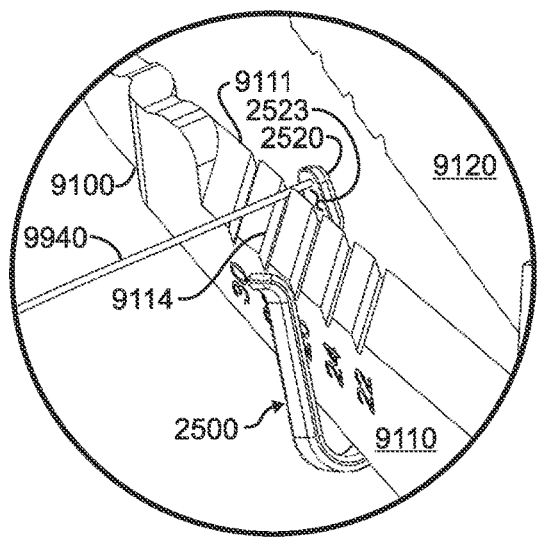

FIGS. 37A-37C further detail and illustrate an operational example of the embodiments consistent with those shown in FIGS. 35A-35H and 36.

As shown in FIG. 37A, a 3/32" depth gauge 2500*c* is mechanically coupled to a shear type wire stripper 9100, similar to wire stripper model 45-125 produced by Ideal® Tool Company in Sycamore, IL, with a 28 gauge coated wire 9940 engaging the wire stripper 9100 and the depth gauge 2500.

As shown in FIG. 37B, an enlarged sectional perspective view of the depth gauge 2500 shown in FIG. 37A is depicted, mechanically coupled to a shear type wire stripper 9100 lower jaw 9110, wherein a 28 gauge coated wire 9940 passes through a 28 gauge slot 9114 in the stripping edge 9111 and abuts the 3/32" fiducial 2520.

As shown in FIG. 37C, an enlarged sectional perspective view shown from the opposite side of the view in FIG. 37B is depicted, wherein the depth gauge 2500 is mechanically coupled to a shear type wire stripper 9100 lower jaw 9110, wherein a 28 gauge coated wire 9940 passes through a 28 gauge slot 9114 in the stripping edge 9111 and abuts the abutment face 2523 of the 3/32" fiducial 2520, whereby the wire stripper 9100 is actuated on the 28 gauge coated wire 9940 extending past the stripping edge 9111 to the abutment face 2523, the wire stripper cuts a portion of a coating of the coated wire 9960 extending from the stripping edge 9111 to the abutment face 2523 equal to the distance between the stripping edge 9111 and the fiducial 2520 abutment face 2523. Once the coating has been stripped from the coated wire, the trapped 3/32" section of stripped coating will need to be pushed from between the lower jaw 9110 and the fiducial 2520 abutment face 2523, allowing it to fall away from the wire stripper 9100 and depth gauge 2500. Typically, the next wire to be stripped is easily used for this task. The depth gauge 2500 can be slid along the lower jaw 9110 so that the fiducial 2520 can align with other gauge slots in the stripping edge 9111. In order to strip a different gauge of coated wire with a different strip depth, the fiducial 2520 is aligned proximal to a second gauge slot, wherein a second gauge coated wire is passed through the second gauge slot and abuts the fiducial 2520 abutment face 2523 defining a second strip depth between the stripping edge 9111 and the fiducial 2520 abutment face 2523, whereby the wire stripper 9100 is actuated on the on the second gauge coated wire, the wire stripper cuts a portion of a coating of the second gauge coated wire extending from the stripping edge 9111 to the fiducial 2520 abutment face 2523 equal to the distance between the stripping edge 9111 and the fiducial 2520 abutment face 2523, whereby the second gauge coated wire is then pulled out from between the closed wire stripper 9100 jaws 9110, 9120 thus stripping a 3/32" section of coating from the proximal end of the second gauge coated wire.

For illustration purposes and not for limitation, another example embodiment of the depth gauge is shown in FIGS. 38A-38H, 39A, 39B.

Figure 38A:
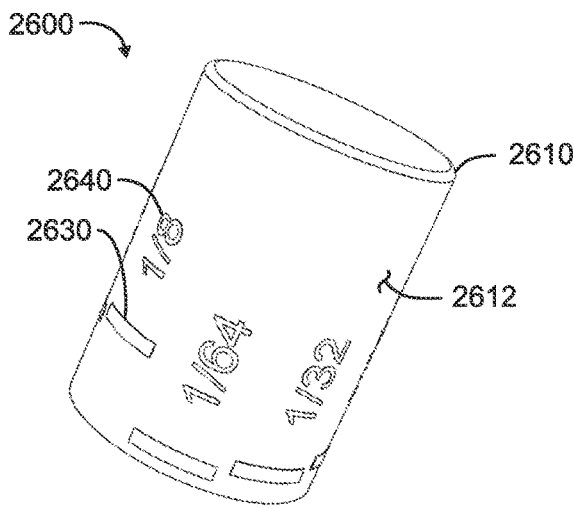
FIGS. 38A-38H show another example embodiment of a depth gauge having a magnetic coupling means and a plurality of visual fiducials marked on the side of the gauge body.

As shown in FIG. 38A, a perspective view of another embodiment of the depth gauge 2600 is depicted, comprising a cylindrical gauge body 2610 having a proximal end and a distal end made of a rigid material such as, but not limited to, plastic, or metal alloy. While previous embodiments of the depth gauge incorporated at least one physical fiducial abutment face in order to set the strip depth of wire coating to be stripped from a coated wire, this embodiment incorporates a plurality of visual fiducial 2630 references instead. Each fiducial 2630 comprises a marking on the outer surface 2612 of the gauge body 2610 defining a particular position for an end of a coated wire when the coated wire is aligned with the fiducial. A plurality of fiducials 2630 that are parallel with the coupling face (see 2613 in FIG. 38B) of the gauge body 2610 are marked around the circumference of the gauge body 2610 outer surface 2612, with each fiducial 2630 at a set distance from the coupling face (see 2613 in FIG. 38B) of the gauge body 2610. Each fiducial 2630 has at least one visual identifier 2640 marked adjacent to it on the gauge body 2610 outer surface 2612, which conveys information regarding a position of the fiducial relative to the coupling face (see 2613 in FIG. 38B) of the gauge body 2610. In this example embodiment of the depth gauge 2600, there are eight fiducials 2630 placed around the circumference of the gauge body 2610 with strip depths ranging from 1/64" to 1/8" in 1/64" intervals. However any number of fiducials and length of strip depths may be incorporated into the depth gauge 2600 design as a particular application may require. In this example embodiment of the depth gauge 2600, fractional measurements are incorporated into the design, but may be of any information a particular application may require such as, but not limited to metric or decimal measurements, or electrical connector crimp contact part numbers.

Figure 38B:
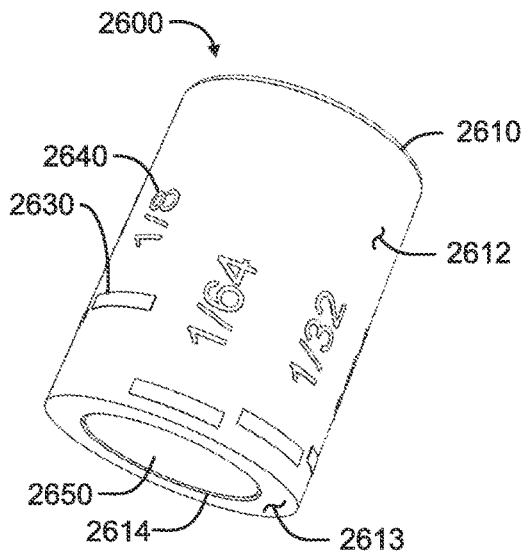

As shown in FIG. 38B, a lower perspective view of the depth gauge 2600 shown in FIG. 38A is depicted, whereas a magnet 2650 is shown disposed within a recess 2614 formed into the distal end of the gauge body 2610. This lower perspective view affords a clear view of the strip depths which are defined by the distances between the gauge body 2610 coupling face 2613 and the closest edge of each fiducial 2630. The distance between the fiducial 2630 and the coupling face 2613 comprises a plurality of distances between the plurality of fiducials 2630 and the coupling face 2613, wherein the plurality of fiducials 2630 positioned to define a plurality of distances between the coupling face 2613 and the plurality of fiducials 2630. In this embodiment example of the depth gauge 2600 the 1/64" visual identifier 2640 that is marked on the outer surface 2612 of the gauge body 2610 indicates that the adjacent fiducial 2630 is 1/64" away from the gauge body 2610 coupling face 2613, and that 1/64" of coating will be stripped from the end of a coated wire when used as intended with a shear type wire stripper. Additional strip depths are indicated by the remaining visual identifiers 2640 and their respective fiducials 2630.

Figure 38C:
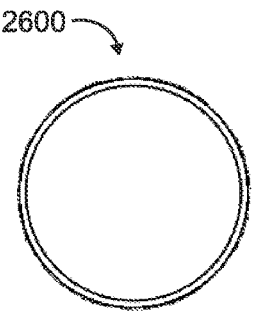
Figure 38D:
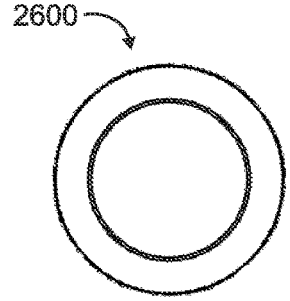
Figure 38E:
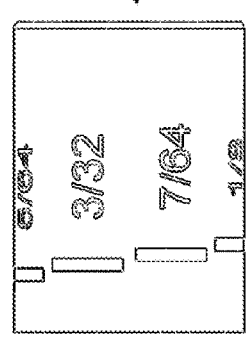
Figure 38F:
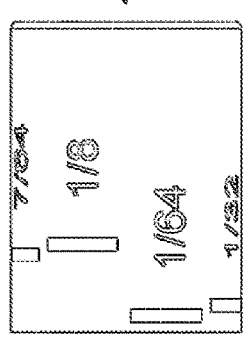
Figure 38G:
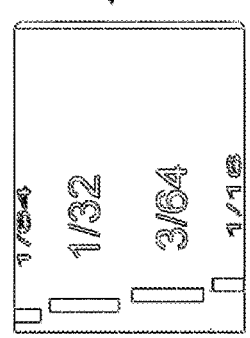
Figure 38H:
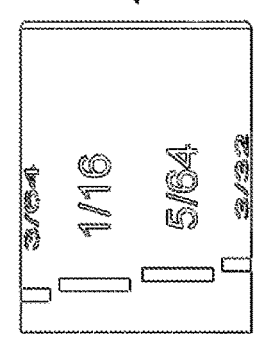

Additional views of the depth gauge 2600 are shown in FIG. 38C with a proximal plan view thereof, FIG. 38D with a distal plan view thereof, FIG. 38E with a left side elevational view thereof, FIG. 38F with a front side elevational view thereof, FIG. 38G with a right side elevational view thereof, and FIG. 38H with a back side elevational view thereof.

Figure 39A:
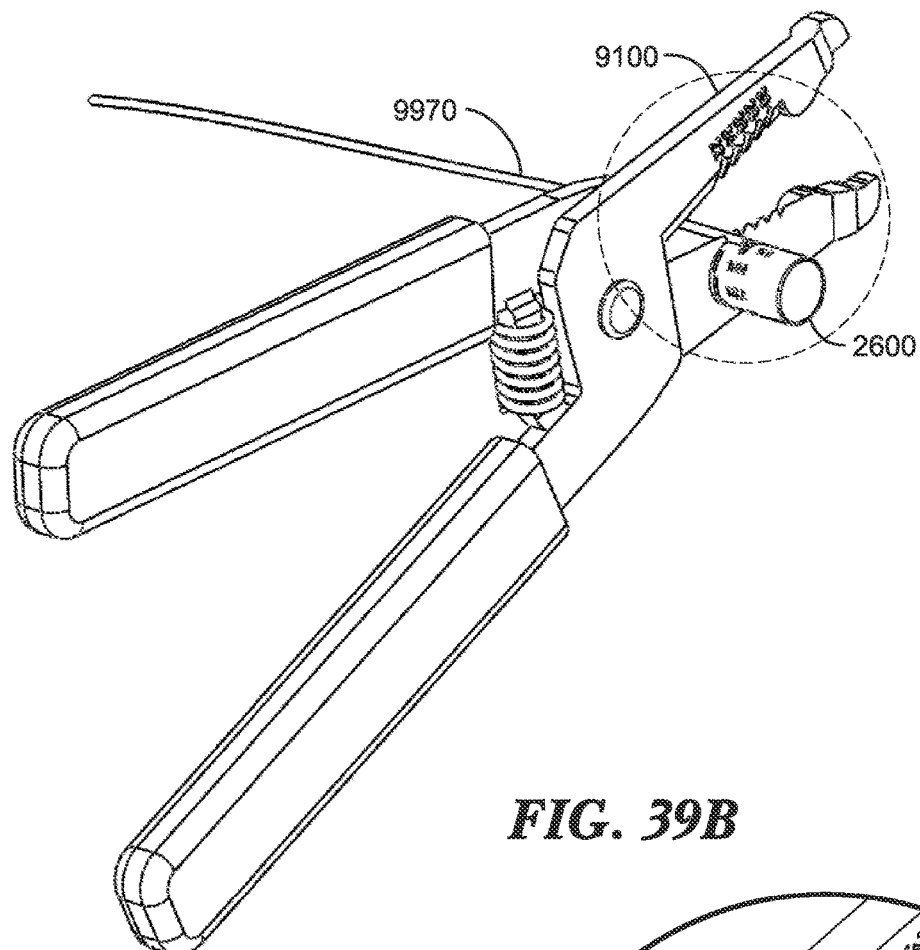
FIGS. 39A-39B show an example method of using the depth gauge shown in FIGS. 38A-38H.
Figure 39B:
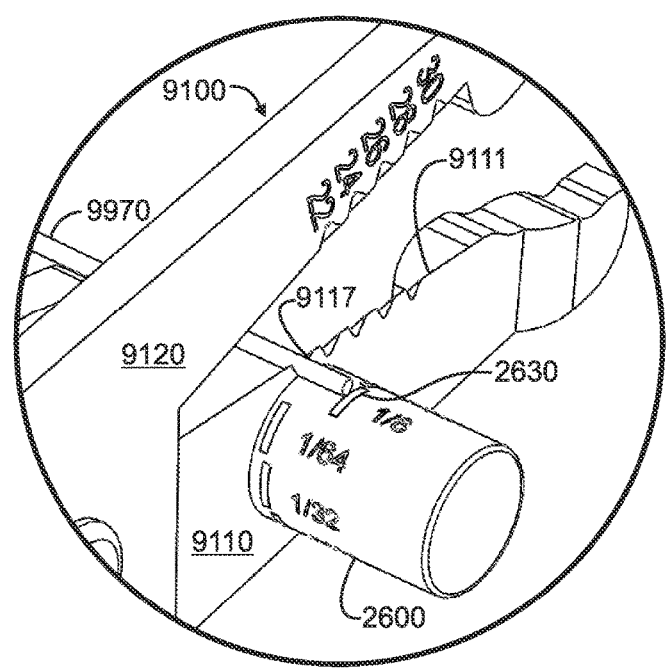

FIGS. 39A-39C further detail and illustrate an operational example of the embodiments consistent with those shown in FIGS. 38A-38H.

As shown in FIG. 39A, the depth gauge 2600 is magnetically coupled to a shear type wire stripper 9100, similar to wire stripper model 45-125 produced by Ideal® Tool Company in Sycamore, IL, with a 22 gauge coated wire 9970 engaging the wire stripper 9100 and the depth gauge 2600.

As shown in FIG. 39B, an enlarged sectional perspective view of the depth gauge 2600 shown in FIG. 39A is depicted, with its coupling face (see 2613 in FIG. 38B) magnetically coupled to the flat side of a shear type wire stripper 9100 lower jaw 9110 with the ⅛" fiducial 2630 aligned proximal to the 22 gauge slot 9117 in the stripping edge 9111 defining a strip depth of ⅛" between the stripping edge 9111 and the fiducial 2630, wherein a 22 gauge coated wire 9970 passes through the 22 gauge slot 9117 and is visually aligned with the ⅛" fiducial 2630. In operation, the wire stripper 9100 is actuated onto the 22 gauge coated wire 9970 extending past the stripping edge 9111 to the fiducial 2630, the wire stripper 9100 cuts a portion of the coating of the coated wire 9970 extending from the stripping edge 9111 to the fiducial 2630 equal the distance between the stripping edge 9111 and the fiducial 2630, wherein the 22 gauge coated wire 9970 is pulled out from between the closed wire stripper 9100 jaws 9110, 9120, thus stripping ⅛" of coating from the proximal end of the 22 gauge coated wire 9970. In order to strip a different length of wire coating, the gauge body 2610 is rotated around its longitudinal axis so that a second fiducial 2630 is aligned with the stripping edge 9111 defining a second strip depth between the stripping edge 9111 and the second fiducial 2630, whereby the wire stripper is actuated on the on the second 22 gauge coated wire 9970, the wire stripper 9100 cuts a portion of the coating of the coated wire 9970 extending from the stripping edge 9111 to the second fiducial 2630 equal the distance between the stripping edge 9111 and the second fiducial 2630, whereby the 22 gauge coated wire 9970 is then pulled out from between the closed wire stripper 9100 jaws 9110, 9120 thus stripping a second and different length of coating from the proximal end of the second 22 gauge coated wire 9970.

For illustration purposes and not for limitation, another example embodiment of the depth gauge is shown in FIGS. 40A-40H, 41A, 41B.

As shown in FIG. 40A, a perspective view of another embodiment of the Depth Gauge 2700 is depicted, comprising two planar rectangular members 2710*a*, 2710*b* integrally joined together forming a right angle profile gauge body 2710 made of a rigid material such as, but not limited to, plastic, composite, or metal alloy, wherein at least one recess 2714 is formed through the coupling face 2713 and into a magnet housing 2719 integrally formed with the gauge body 2710 into which a magnet 2750 is disposed having its distal surface 2753 exposed. The distance between the fiducial 2730 and the coupling face 2713 comprises a plurality of distances between the plurality of fiducials 2730 and the coupling face 2713, wherein the plurality of fiducials 2730 positioned to define a plurality of distances between the coupling face 2713 and the plurality of fiducials 2730. A plurality of visual fiducials 2730 in the form of linear parallel lines are marked onto the outer surface 2712 of the gauge body 2710 and are parallel with the coupling face 2713 and each at a separate distance from the coupling face 2713 while defining a particular position for an end of a coated wire when the coated wire is aligned with the fiducial. Each fiducial 2730 has at least one visual identifier 2740 marked adjacent to each fiducial 2730, which conveys information regarding a position of the fiducial relative to the coupling face 2713 of the gauge body 2710. In this example, the fiducials 2730 are positioned in four, 1/16" intervals, from 1/16" to ¼" from the coupling face 2713. However any number of fiducials and length of strip depths may be incorporated into the depth gauge 2700 design as a particular application may require. This example embodiment of the depth gauge 2700 fractional measurements are incorporated into the design, but may be of any information a particular application requires such as, but not limited to, metric or decimal measurements, or electrical connector crimp contact part numbers.

As shown in FIG. 40B, a perspective view of the opposite side of the depth gauge 2700 shown in FIG. 40A is depicted, where at least one magnet housing 2719 is formed onto the proximal surface 2711*a* and inner surface 2711*b* of the gauge body 2710. The magnet housing 2719 typically contours the shape and size of the magnet (see 2750 in FIG. 40A) so that the magnet (see 2750 in FIG. 40A) is encased on the sides and one end, leaving the distal surface of the magnet (see 2753, 2750 in FIG. 40A) exposed. The width of the depth gauge 2700 would typically be wide enough to span the full array of gauge slots in the stripping edge 9111.

Additional views of the depth gauge 2700 are shown in FIG. 40C with a proximal plan view thereof, FIG. 40D with a distal plan view thereof, FIG. 40E with a left side elevational view thereof, FIG. 40F with a front side elevational view thereof, FIG. 40G with a right side elevational view thereof, and FIG. 40H with a back side elevational view thereof.

Figure 41A:
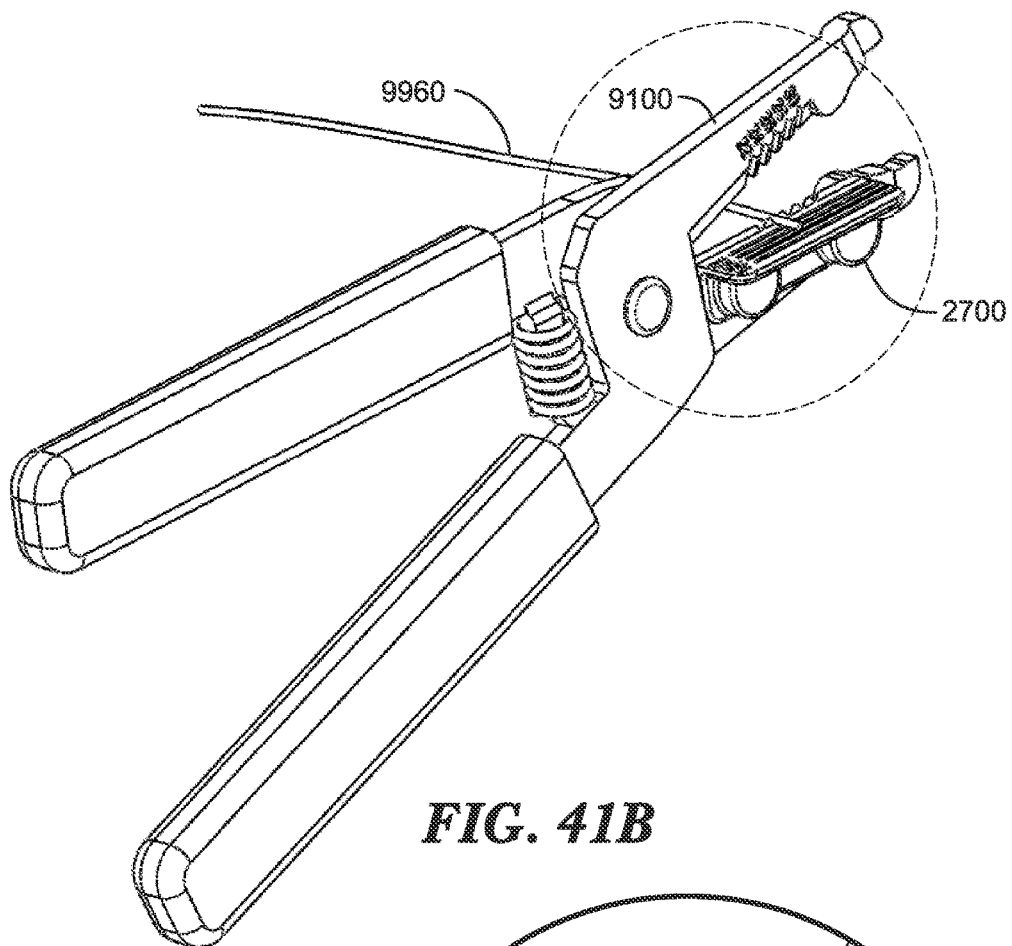
FIGS. 41A-41B show an example method of using the depth gauge shown in FIGS. 40A-40H.
Figure 41B:
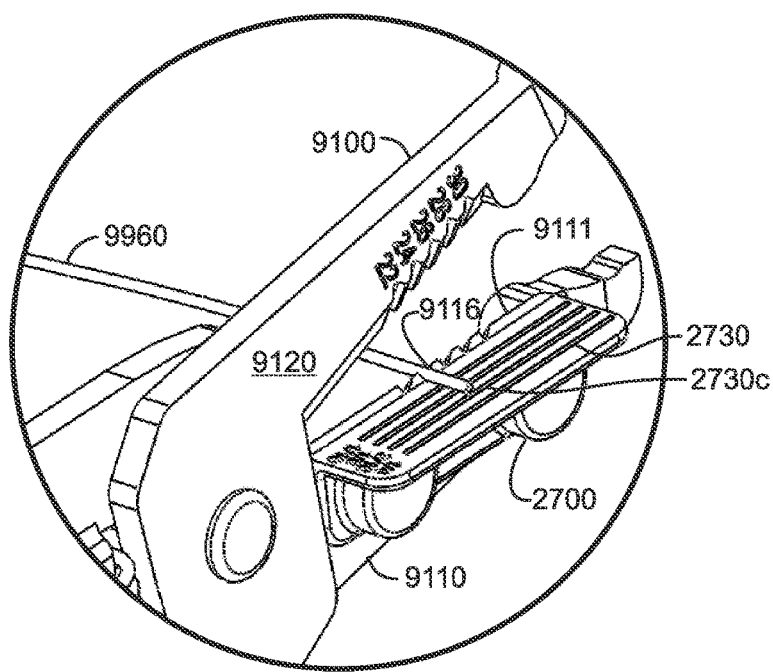

FIGS. 41A-41C further detail and illustrate an operational example of the embodiments consistent with those shown in FIGS. 40A-40H.

As shown in FIG. 41A, the depth gauge 2700 is magnetically coupled to a shear type wire stripper 9100, similar to wire stripper model 45-125 produced by Ideal® Tool Company in Sycamore, IL, with a 24 gauge coated wire 9960 engaging the wire stripper 9100 and the depth gauge 2700.

As shown in FIG. 41B, an enlarged sectional perspective view of the depth gauge 2700 shown in FIG. 41A is depicted, with its coupling face (see 2713 in FIG. 40A) magnetically coupled to the flat side of a shear type wire stripper 9100 lower jaw 9110 having its fiducials 2730 aligned proximal to, parallel with, and spanning a portion of the stripping edge 9111 defining a plurality of strip depths between the stripping edge and the plurality of fiducials 2730, wherein a 24 gauge coated wire 9960 passes through the 24 gauge slot 9116 and is visually aligned with the 3/16" fiducial 2730*c*. The wire stripper 9100 is actuated onto the 24 gauge coated wire 9960 extending past the stripping edge 9111 to the fiducial 2730*c*, the wire stripper 9100 cuts a portion of the coating of the coated wire 9960 extending from the stripping edge 9111 to the fiducial 2730*c* equal the distance between the stripping edge 9111 and the fiducial 2730*c*, wherein the 24 gauge coated wire 9960 is pulled out from between the closed wire stripper 9100 jaws 9110, 9120 thus stripping 3/16" of coating from the proximal end of the 24 gauge coated wire 9960. In order to strip a different length of wire coating, from a different gauge of coated wire, a second gauge coated wire is passed through the a different gauge slot and visually aligned with a second fiducial 2730 defining a second strip depth between the stripping edge 9111 and the second fiducial 2730, whereby the wire stripper is actuated on the on the second gauge coated wire, the wire stripper 9100 cuts a portion of the coating of the coated wire 9960 extending from the stripping edge 9111 to the second fiducial 2730 equal the distance between the stripping edge 9111 and the second fiducial 2730, whereby the second gauge coated wire is then pulled out from between the closed wire stripper 9100 jaws 9110, 9120 thus stripping a second and different length of coating from the proximal end of the second gauge coated wire.

For illustration purposes and not for limitation, another example embodiment of the depth gauge is shown in FIGS. 42A-42H, 43A-43C.

Figure 42B:
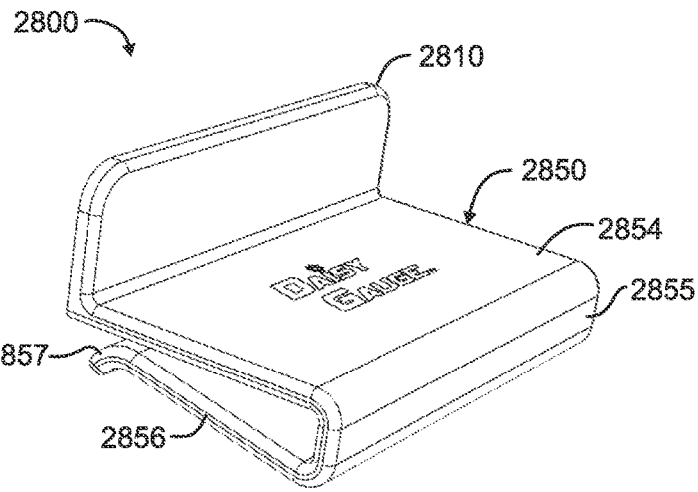
FIGS. 42A-42H show another example embodiment of a depth gauge having a pinch clip coupling means and having a planar gauge body defining a plurality of visual fiducials and visual indicators marked on its outer face.
Figure 42A:
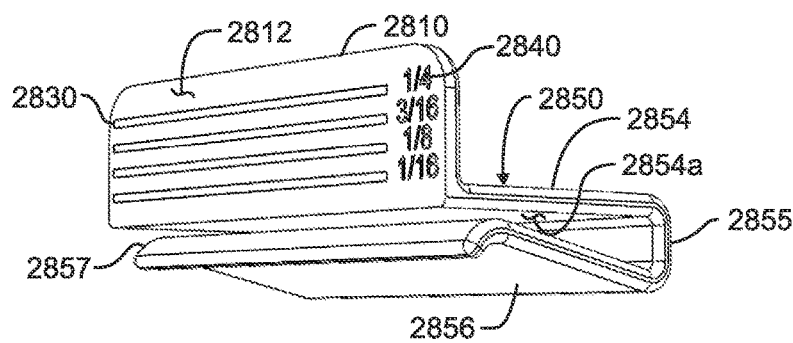

As shown in FIG. 42A, a lower perspective view of another embodiment of the depth gauge 2800 is depicted, wherein this embodiment is similar to the depth gauge 2700 in FIG. 40A, 40B but rather than incorporating a magnetic coupling means into the design, the depth gauge 2800 instead, incorporates a pinch clip 2850 means in order to mechanically and removably couple to a shear type wire stripper. The depth gauge 2800 is made of a resilient rigid material such as, but not limited to, plastic or spring steel sheet metal, and comprises a vertical planar gauge body 2810 with a plurality of visual fiducials 2830 in the form of lines are marked onto the outer surface 2812 of the gauge body 2810 and are aligned proximal to, and parallel with, the coupling face 2854*a*, each at a separate distance from the coupling face 2854*a*, while defining a particular position for an end of a coated wire when the coated wire is aligned with a fiducial. The distance between the fiducial 2830 and the coupling face 2854*a* comprises a plurality of distances between the plurality of fiducials 2830 and the coupling face 2854*a*, wherein the plurality of fiducials 2830 positioned to define a plurality of distances between the coupling face 2854*a* and the plurality of fiducials 2830. Each fiducial 2830 has at least one visual identifier 2840 marked adjacent to each fiducial 2830, which conveys information regarding a position of the fiducial 2830 relative to the coupling face 2813 of the gauge body 2810. In this example, the fiducials 2830 are positioned in four, 1/16" intervals, from 1/16" to 1/4" from the coupling face 2854*a*. However any number of fiducials 2830 and length of strip depths may be incorporated into the depth gauge 2800 design as a particular application may require. In this example embodiment of the depth gauge 2800 fractional measurements are incorporated into the design, but may be of any information a particular application requires such as, but not limited to, metric or decimal measurements, or electrical connector crimp contact part numbers. The coupling means in this example embodiment of the depth gauge 2800 is a pinch clip 2850 comprising a stationary planar clip base 2854 protruding from the opposite side of the gauge body 2810 than the fiducials 2830, having its width equal to the width of the gauge body 2810 wherein the clip base 2854 extends to, and is integrally formed with, and tangent to, a vertical planar living torsion spring 2855 protruding downward, wherein the living torsion spring 2855 extends to, and is integrally formed with, and tangent to, a torsion arm 2856 that is angled upward, and extends, toward the clip base 2854 and gauge body 2810 junction and is integrally formed with, and tangent to, a torsion arm foot 2857 that is curved away from the clip base 2854. The torsion arm 2856 is shorter in length than the clip base 2854 so that the pinch point, the point where the torsion arm foot 2857 is closest to the clip base 2854, falls short of the clip base 2854 and gauge body 2810 junction, which is designed to ensure that the clip base 2854 coupling face 2854*a* lays flat against the flat face of a jaw of a shear type wire stripper that is placed between them. The torsion arm foot 2857 is curved similar to the front end of a ski and is designed to deflect the torsion arm 2856 away from the clip base 2854 when a wire stripper jaw is forced between the torsion arm foot 2857 and the clip base 2854, thus creating a stored counter torsion energy concentrated at the living torsion spring 2855 which in turn provides a constant torsional force of the torsion arm foot 2857 against the wire stripper jaw, which removably couples the depth gauge 2800 to the shear type wire stripper jaw. The gauge body 2810 and the pinch clip 2850 are all formed integrally as one piece, and made of a rigid material such as, but not limited to, plastic or sheet metal spring steel. Once the depth gauge 2800 is coupled to the shear type wire stripper jaw, it can then be repositioned so that the gauge body 2810 and fiducials 2830 can be aligned with the stripping edge of a shear type wire stripper jaw.

As shown in FIG. 42B, a perspective view from the opposite side of the depth gauge 2800 shown in FIG. 42A is depicted, which demonstrates the relationship between the gauge body 2810, the pinch clip 2850, and the pinch clip 2850 components, wherein the gauge body 2810 and the pinch clip 2850 clip base 2854 are joined at approximately a 90° angle while the torsion arm foot 2857 is positioned very close to the coupling face (see 2854*a* in FIG. 42A), less than the thickness of a shear type wire stripper jaw, and is set back from the junction of the gauge body 2810 and clip base 2854 in order to hold the coupling face (see 2854*a* in FIG. 42A) flat against the flat surface of a wire stripper jaw. Because the torsion arm foot 2857 and the coupling surface (see 2854*a* in FIG. 42A) are so close together, forcing the jaw of a shear type wire stripper, which is thicker than the gap between the torsion arm foot 2857 and the coupling surface (see 2854*a* in FIG. 42A), would cause the torsion arm foot 2857 to deflect the torsion arm 2856 away from the clip base 2854 while slightly flexing it, and also flexing the living torsion spring 2855 and slightly flexing the clip base 2854, thus creating an opposing torsional force within the living torsion spring 2855, clip base 2854, and torsion arm 2856, in turn, creating a pinch type grip between the torsion arm foot 2857 and the clip base 2854, on the wire stripper jaw.

Figure 42C:
Figure 42D:
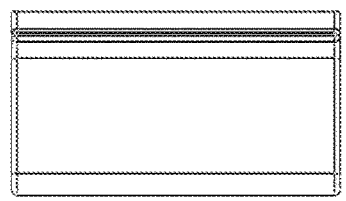
Figure 42E:
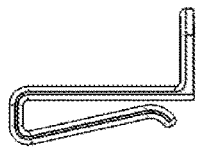
Figure 42F:
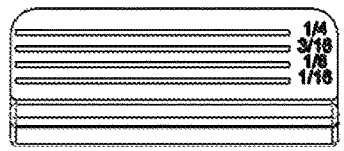
Figure 42G:
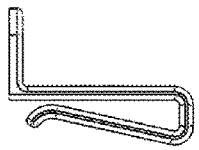
Figure 42H:
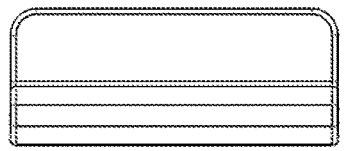

Additional views of the depth gauge 2800 are shown in FIG. 42C with a proximal plan view thereof, FIG. 42D with a distal plan view thereof, FIG. 42E with a left side elevational view thereof, FIG. 42F with a front side elevational view thereof, FIG. 42G with a right side elevational view thereof, and FIG. 42H with a back side elevational view thereof.

Figure 43A:
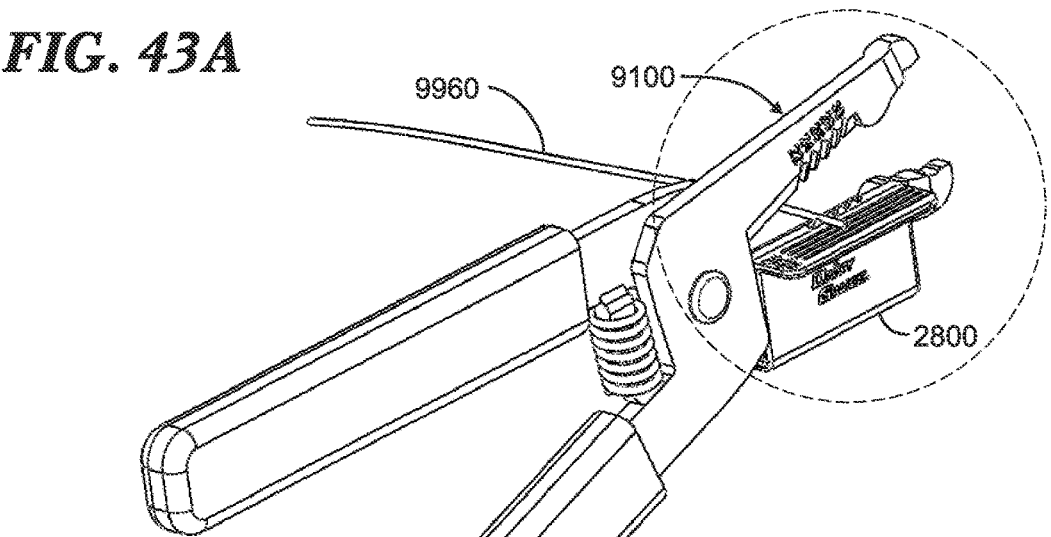
FIGS. 43A-43C show an example method of using the depth gauge shown in FIGS. 42A-42H.
Figure 43B:
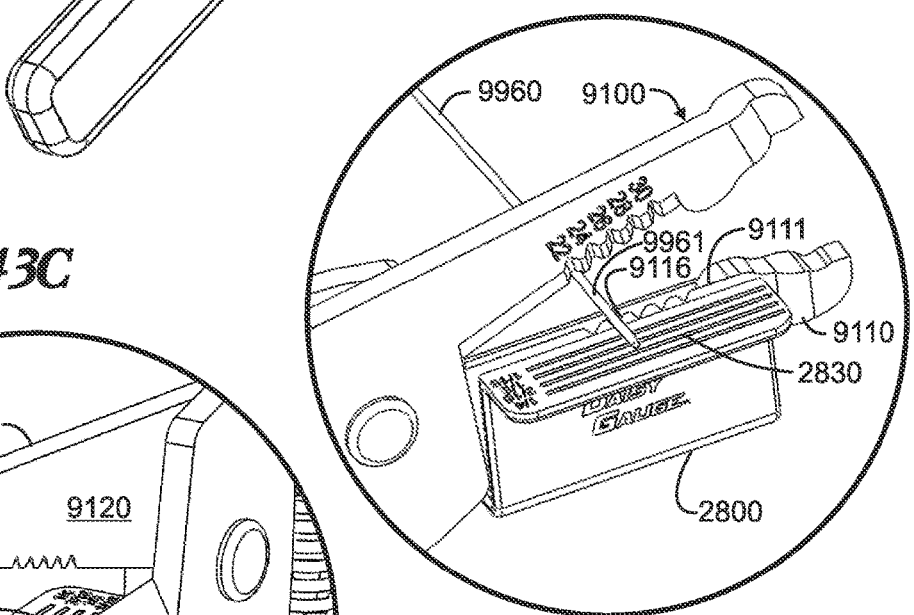
Figure 43C:
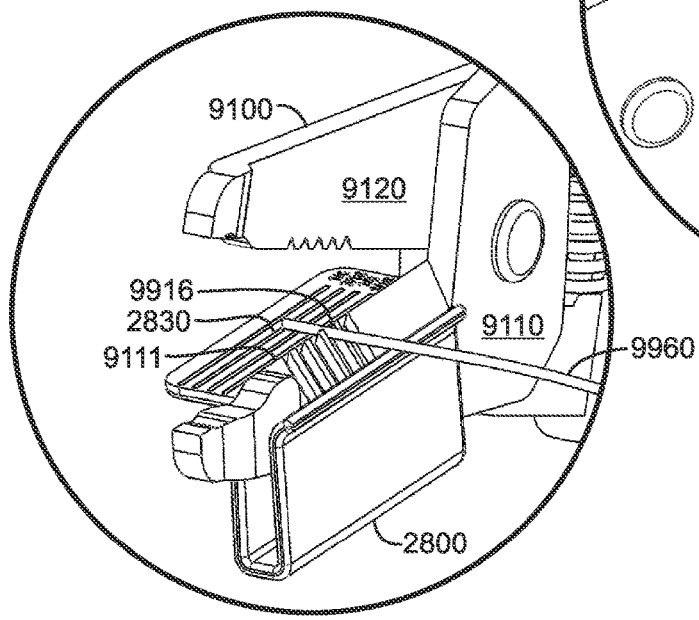

FIGS. 43A-43C further detail and illustrate an operational example of the embodiments consistent with those shown in FIGS. 42A-42H.

As shown in FIG. 43A, the depth gauge 2800 is mechanically coupled to a shear type wire stripper 9100, similar to wire stripper model 45-125 produced by Ideal® Tool Company in Sycamore, IL, with a 24 gauge coated wire 9960 engaging the shear type wire stripper 9100 and the depth gauge 2800.

As shown in FIG. 43B, an enlarged sectional perspective view of the depth gauge 2800 shown in FIG. 43A is depicted, mechanically coupled to the shear type wire stripper 9100 lower jaw 9110. Once the depth gauge 2800 is clipped onto the lower jaw 9110 it can be slid along the lower jaw 9110 so that the fiducials 2830 can be aligned parallel and proximal to the stripping edge 9111 defining a plurality of strip depths between the stripping edge 9111 of the shear type wire stripper 9100 and the plurality of fiducials 2830. The proximal end of the 24 gauge coated wire 9960 passes through the 24 gauge slot 9116 in the stripping edge 9111 and is visually aligned with the 3/16" fiducial 2830.

As shown in FIG. 43C, an enlarged sectional perspective view shown from the opposite side of the view in FIG. 43B is depicted, wherein the depth gauge 2800 is mechanically coupled to the shear type wire stripper 9100 lower jaw 9110. The wire stripper 9100 is actuated onto the 24 gauge coated wire 9960 extending through the 24 gauge slot 9916 and past the stripping edge 9111 to the 3/16" fiducial 2830, the wire stripper 9100 cuts a portion of the coating of the 24 gauge coated wire 9960 extending from the stripping edge 9111 to the fiducial 2830 equal the distance between the stripping edge 9111 and the fiducial 2830, wherein the 24 gauge coated wire 9960 is pulled out from between the closed wire stripper 9100 jaws 9110, 9120 thus stripping 3/16" of coating from the proximal end of the 24 gauge coated wire 9960. Once the coating has been stripped from the coated wire 9960, the wire stripper 9100 is tipped approximately 45-90 degrees, causing the 3/16" section of stripped coating to fall away from the depth gauge 2800. In order to strip a different length of wire coating, from a different gauge of coated wire, a second gauge coated wire is passed through the a different gauge slot and visually aligned with a second fiducial 2830 defining a second strip depth between the stripping edge 9111 and the second fiducial 2830, whereby the wire stripper is actuated on the on the second gauge coated wire, the wire stripper 9100 cuts a portion of the coating of the second gauge coated wire extending from the stripping edge 9111 to the second fiducial 2830 equal the distance between the stripping edge 9111 and the second fiducial 2830, whereby the second gauge coated wire is then pulled out from between the closed wire stripper 9100 jaws 9110, 9120 thus stripping a second and different length of coating from the proximal end of the second gauge coated wire.

For illustration purposes and not for limitation, another example embodiment of the depth gauge is shown in FIGS. 44A-44H, 45A-45C.

Figure 44B:
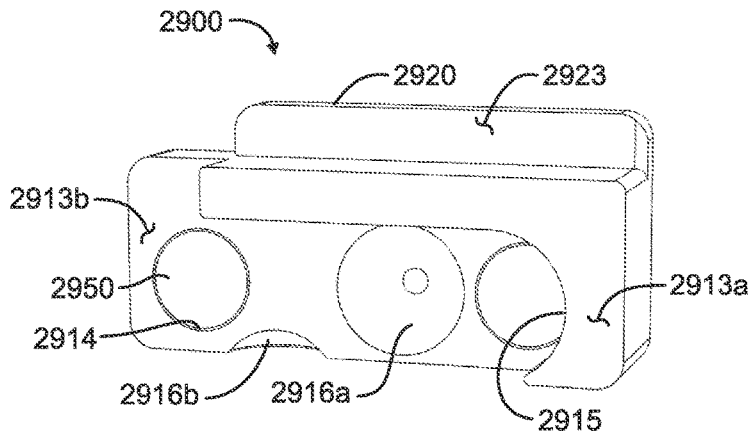
FIGS. 44A-44H show another example embodiment of a depth gauge having a magnetic coupling means and a gauge body coupling face contoured to conform to the irregular multifaceted surface of a tool, while having a planar fiducial positioned parallel with the coupling faces of the gauge body.
Figure 44A:
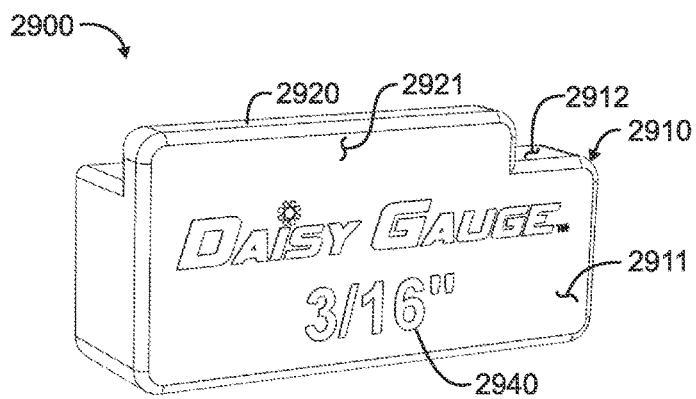

As shown in FIG. 44A, a perspective view of another embodiment of the depth gauge 2900 is depicted, wherein this particular embodiment is designed to magnetically couple to a semi-automatic wire stripper, similar to the Stripmaster® brand of wire strippers produced by Ideal® Tool Company in Sycamore, IL, and is designed to aid in stripping 3/16" of coating from the end of a coated wire. The depth gauge 2900 comprises a rectangular gauge body 2910 made of a rigid material such as, but not limited to, plastic or metal alloy, wherein its longest edge is positioned horizontally and its widest face, the proximal surface 2911, is positioned vertically, wherein a visual identifier 2940 is marked on the gauge body 2910 outer surface. A vertical planar fiducial 2920 is integrally formed lengthwise on the top side surface 2912 wherein its length is typically equal to the width of the exposed portion of a stripping blade of a semi-automatic wire stripper typically having its proximal surface 2921 planar with the gauge body 2910 proximal surface 2911. The gauge body 2910 and fiducials 2920 are formed integrally as one piece, and made of a rigid material such as, but not limited to, plastic or metal alloy, the gauge body having a distal end and a proximal end.

Figure 45A:
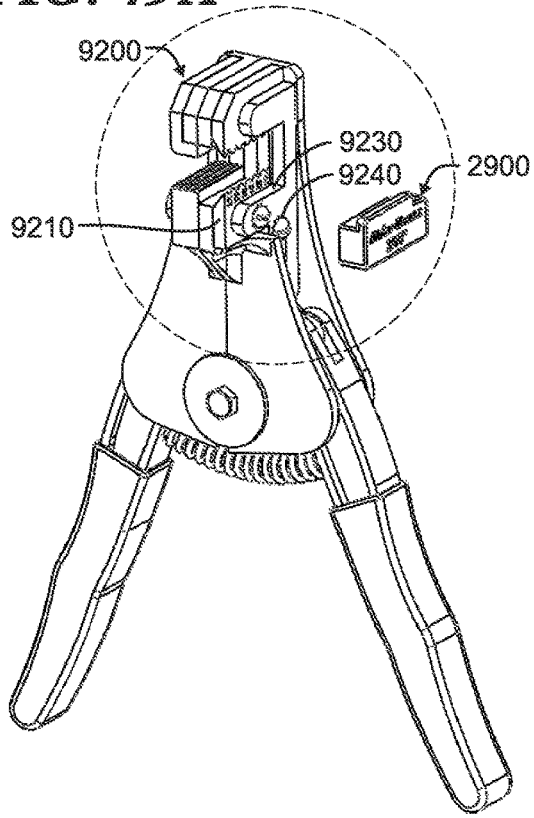
FIGS. 45A-45C show an example method of using the depth gauge shown in FIGS. 44A-44H.

As shown in FIG. 44B, a perspective view of the multi-faceted distal end of the depth gauge 2900 shown in FIG. 44A is depicted, comprising a first coupling face 2913a, and a second coupling face 2913b created by a retaining plate recess 2915 designed to receive and contour a portion of a semi-automatic wire stripper blade retaining plate (see 9200, 9230 in FIG. 45A), wherein the first coupling face 2913a couples to the proximal surface of a semi-automatic wire stripper lower stripping blade (see 9200, 9210 in FIG. 45A) and the second coupling face 2913b couples to the proximal surface of the semi-automatic wire stripper blade retaining plate (see 9200, 9230 in FIG. 45A). Two hardware recesses 2916a, 2916b formed into the coupling face 2913b are designed to receive semi-automatic wire stripper retaining hardware (see 9200, 9240 in FIG. 45A), while two magnets 2950 are disposed into two magnet recesses 2914 which are also formed into the coupling face 2913b. The two magnets 2950 magnetically couple the depth gauge 2900 to the semi-automatic wire stripper (see 9200 in FIG. 45A, B, C), and may be of any quantity, size, or shape, and mounted in any location, as a particular application may require. The distance between the fiducial 2920 and the coupling face 2913a comprises a distances between the fiducial 2920 and the coupling face 2913a, wherein the fiducial 2920 comprise an abutment face 2923 positioned to define a distance between the coupling face 2913a and the abutment face 2923. The strip depth for this example embodiment of the depth gauge 2900 is 3/16" which is defined by the distance between the coupling face 2913a and the fiducial 2920 abutment face 2923, and is also the length of coating that will be stripped from a coated wire when used as intended with a semi-automatic wire stripper (see 9200 in FIG. 45A, B, C), but may be designed for any strip depth a particular application may require. The width of the gauge body 2900 is typically the same width of the lower stripping blade.

The multifaceted contours of the distal end of the depth gauge 2900 are used only as an example and may be of any configuration a particular application may require.

Figure 44C:
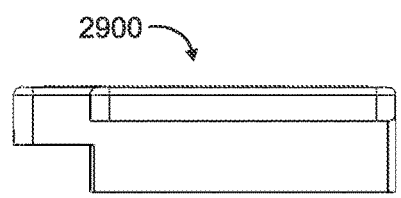
Figure 44D:
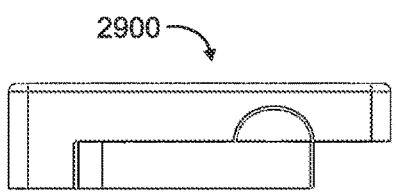
Figure 44E:
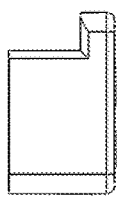
Figure 44F:
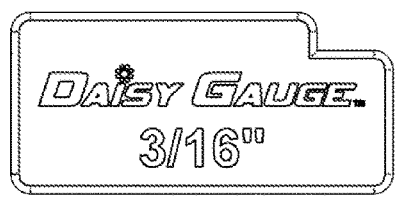
Figure 44G:
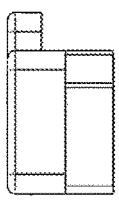
Figure 44H:
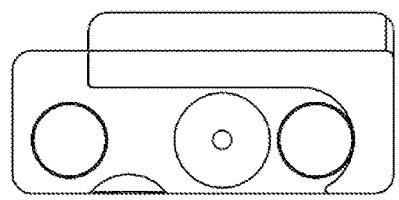

Additional views of the depth gauge 2900 are shown in FIG. 44C with a front side elevational view thereof, FIG. 44D with a back side elevational view thereof, FIG. 44E with a right side elevational view thereof, FIG. 44F with a proximal plan view thereof, FIG. 44G with a left side elevational view thereof, and FIG. 44H with a distal plan view thereof.

Figure 45C:
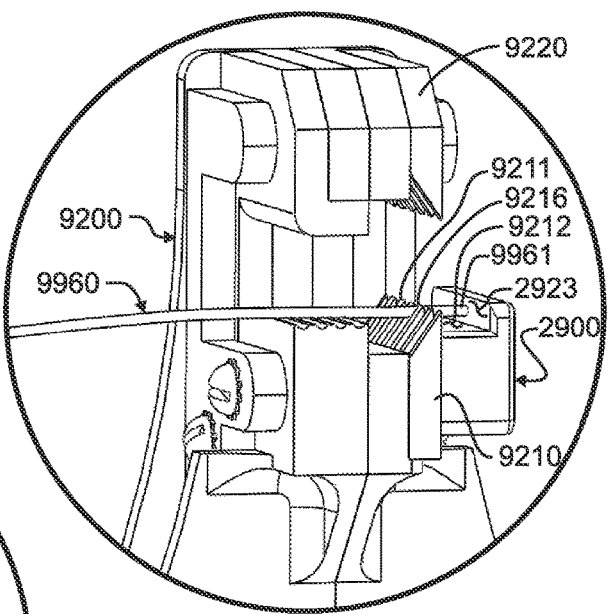
Figure 45B:
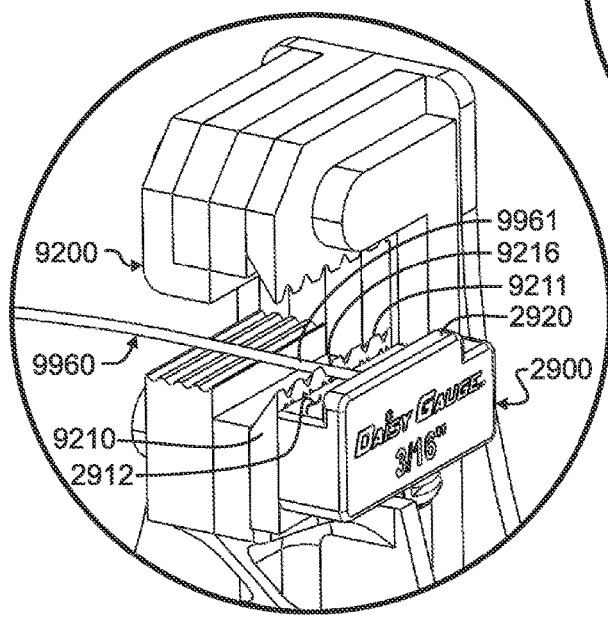

FIGS. 45A-45C further detail and illustrate an operational example of the embodiments consistent with those shown in FIGS. 44A-44H.

As shown in FIG. 45A, a perspective view of the depth gauge 2900 shown in FIGS. 44A-44B is depicted, positioned directly in front of a lower stripping blade 9210 and multi-faceted portion of a semi-automatic wire stripper 9200, similar to the Stripmaster® brand of wire strippers produced by Ideal® Tool Company in Sycamore, IL, comprising a lower stripping blade 9210, a blade retaining plate 9230, and retaining hardware 9240, to which the depth gauge 2900 will magnetically couple.

As shown in FIG. 45B, an enlarged sectional view of the depth gauge 2900 and semi-automatic wire strippers 9200 shown in FIG. 45A is depicted, wherein the depth gauge 2900 is magnetically coupled to the semi-automatic wire strippers 9200, with the depth gauge 2900 coupling face (see 2913a in FIG. 44B) flush against the lower stripping blade 9210 proximal surface. The proximal end of a section of 24 gauge coated wire 9960 is placed into the stripping edge 9211 24 gauge slot 9216 of the lower stripping blade 9210 of the semi-automatic wire stripper 9200, and up against the fiducial 2920 abutment face (see 2923 in FIG. 45C) of the depth gauge 2900, enabling the coated wire 9960 to be precisely stripped of 3/16" of its coating, when used as intended.

As shown in FIG. 45C, an enlarged sectional view from the opposite side of the depth gauge 2900 and semi-automatic wire stripper 9200 shown in FIG. 45B is depicted, wherein the proximal end 9961 of the 24 gauge coated wire 9960 passes through the 24 gauge slot 9216 of the lower stripping blade 9210 of the semi-automatic wire stripper 9200 and abuts the abutment face 2923 of the depth gauge 2900.

The semi-automatic wire stripper 9200 is then actuated on the 24 gauge coated wire 9960 extending past the stripping edge 9211 to the fiducial 2920, the wire stripper 9200 cuts a portion of the coating of the 24 gauge coated wire 9960 extending from the stripping edge 9211 to the fiducial 2920 equal the distance between the stripping edge 9211 and the fiducial 2920, wherein the 24 gauge coated wire 9960 is pulled out from between the closed wire stripper 9200 jaws 9210, 9220 thus stripping 3/16" of coating from the proximal end 9961 of the 24 gauge coated wire 9960. Once the coating has been stripped from the coated wire 9960, the trapped 3/16" section of stripped coating will need to be pushed from between the lower stripping blade 9210 and the abutment face 2923, along the top side surface 2912, and out the opening on the left. Typically, the next wire to be stripped is easily used for this task. In order to strip a different gauge of coated wire, a second gauge coated wire is passed through a second gauge slot and abuts the fiducial 2920 abutment face 2923 defining a 3/16" strip depth between the stripping edge 9211 and the fiducial 2920 abutment face 2923, whereby the wire stripper is actuated on the on the second gauge coated wire, the wire stripper 9200 cuts a portion of the coating of the second gauge coated wire extending from the stripping edge 9211 to the fiducial 2920 equal the distance between the stripping edge 9211 and the fiducial 2920, whereby the second gauge coated wire is then pulled out from between the closed wire stripper 9200 jaws 9210, 9220 thus stripping a 3/16" section of coating from the proximal end of the second gauge coated wire.

For illustration purposes and not for limitation, another example embodiment of the depth gauge is shown in FIGS. 46A-46H, 47A-47C.

Figure 46B:
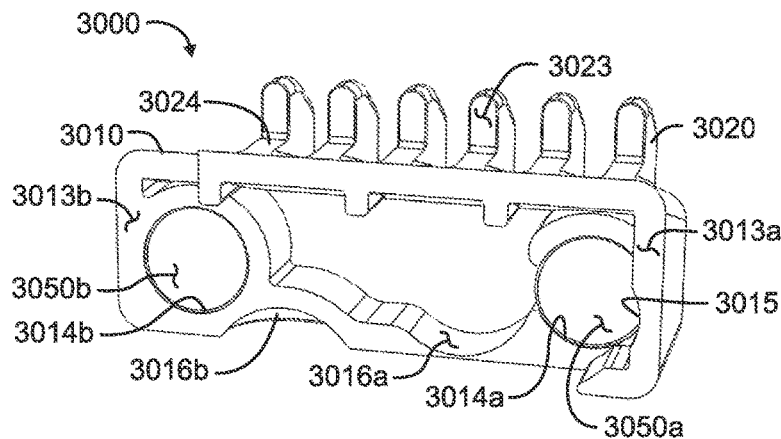
FIGS. 46A-46H show another example embodiment of a depth gauge having a magnetic coupling means and a gauge body coupling face contoured to conform to the irregular multifaceted surface of a tool, while a plurality of vertical planar fiducials are positioned on a sloped top side surface perpendicular to the coupling faces of the gauge body.
Figure 46A:
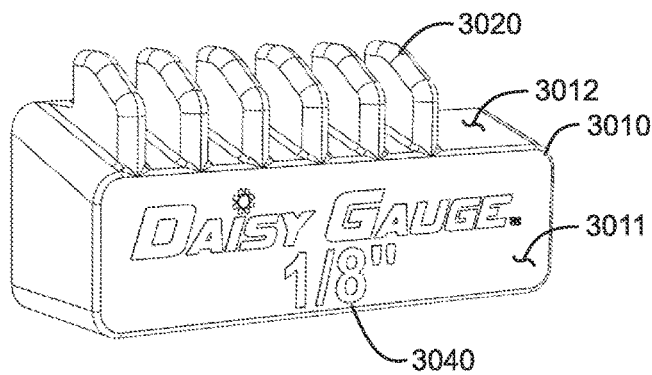

As shown in FIG. 46A, a perspective view of another embodiment of the depth gauge 3000 is depicted, wherein this example embodiment is similar to the depth gauge for semi-automatic wire strippers (see 2900 in FIGS. 44A, 44B), except that rather than having one long vertical planar fiducial (see 2920 in FIG. 44A, 44B), a plurality of vertical planar fiducials 3020 are formed on the depth gauge 3000 top side surface 3012 perpendicular to the proximal face 3011 and each fiducial 3020 is positioned to align in front of each slot (see 9216 in FIG. 47B) along the lower stripping blade stripping edge (see 9210, 9211 in FIG. 47B), while the gauge body 3010 top side surface 3012 is sloped downward and away from the coupling face (see 3013a in FIG. 46B) to the proximal surface 3011. The gauge body 3010, having a distal end and a proximal end, and the fiducials 3020 are formed integrally as one piece, made of a rigid material such as, but not limited to, plastic or metal alloy. This new configuration is designed to allow any stripped sections of wire coating to fall away from the wire stripper more easily. At least one visual identifier 3040 is marked on the gauge body 3010 outer surface. The depth gauge 3000 is designed to be magnetically coupled to a semi-automatic wire stripper (see 9200 in FIG. 47A), similar to the Stripmaster® brand of wire strippers from Ideal® Tool Company, and, in this example embodiment, is designed to aid in precisely stripping 1/8" of coating from a coated wire when used as intended. Additional configurations of different wire coating strip depths would be produced as particular applications require.

As shown in FIG. 46B, a perspective view of the distal end of the depth gauge 3000 is depicted, wherein the fiducials 3020 are notched out by a cutout 3024 that runs horizontally from the uppermost edge of the angled top side surface (see 3012 in FIG. 46A) to a depth equal to the desired strip depth of 1/8" in this example, thus creating a plurality of abutment faces 3023 on the plurality of fiducials 3020. The distance between the fiducial 3020 and the coupling face 3013a comprises a plurality of distances between the plurality of fiducials 3020 and the coupling face 3013a, wherein the plurality of fiducials 3020 comprise a plurality of abutment faces 3023 positioned to define a plurality of distances between the coupling face 3013a and the plurality of abutment faces 3023. The distance between the abutment faces 3023 and the coupling face 3013a, which are parallel to each other, is the strip depth, which is the length of coating that will be stripped from a coated wire when the depth gauge 3000 is used as intended.

Figure 47A:
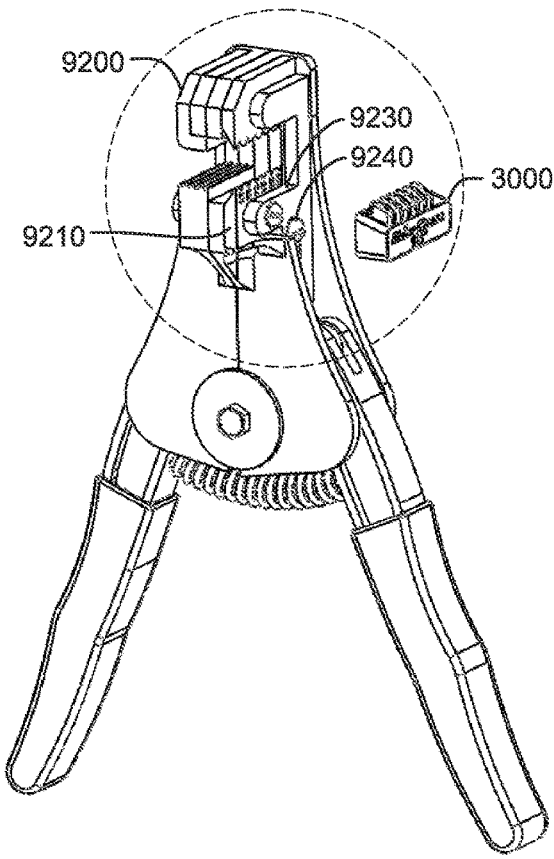
FIGS. 47A-47C show an example method of using the depth gauge shown in FIGS. 46A-46H.

The gauge body 3010 is shelled out for injection molding or 3D printing, while recesses 3015, 3016a, 3016b are incorporated in order to allow the coupling face 3013a to mate with the multifaceted proximal face of the semi-automatic wire stripper lower stripping blade (see 9200, 9210 in FIG. 47B) and allow the coupling face 3013b to mate with the blade retaining plate (see 9230 in FIG. 47A). While this example embodiment of the depth gauge 3000 is shelled out, the depth gauge 3000 could be machined or cast as a solid part, as a particular application may require. Two recesses 3014a, 3014b are formed into the coupling face 3013b, into which two magnets 3050a, 3050b are disposed. The recess 3014b completely surrounds the side surface of the magnet 3050b, while the recess 3014a is partially merged with the recess 3016a, thus causing the recess 3014a to surround a portion of the magnet 3050a. However, configurations of the shelled out body 3010 recesses, and the size quantity location and shape of magnets, may vary as a particular application may require. The width of the gauge body 3000 is typically the same width of the lower stripping blade.

Figure 46C:
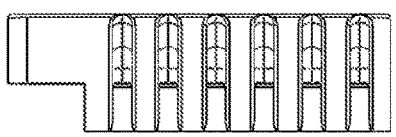
Figure 46D:
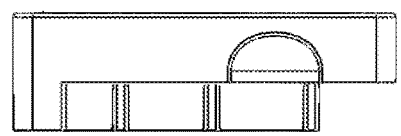
Figure 46E:
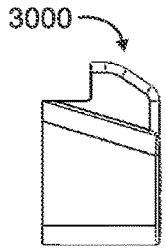
Figure 46F:
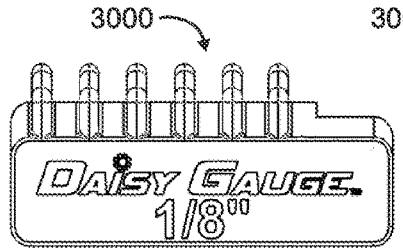
Figure 46G:
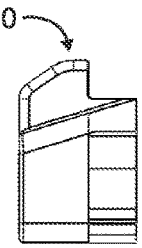
Figure 46H:
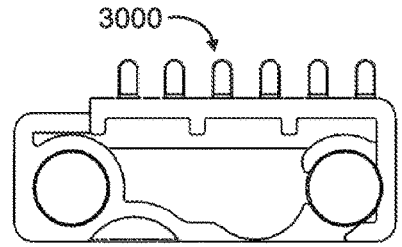

Additional views of the depth gauge 3000 are shown in FIG. 46C with a front side elevational view thereof, FIG. 46D with a back side elevational view thereof, FIG. 46E with a right side elevational view thereof, FIG. 46F with a proximal plan view thereof, FIG. 46G with a left side elevational view thereof, and FIG. 46H with a distal plan view thereof.

Figure 47C:
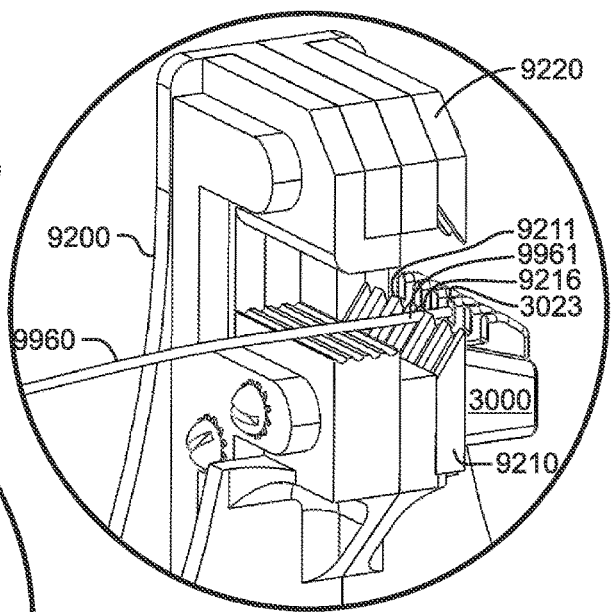
Figure 47B:
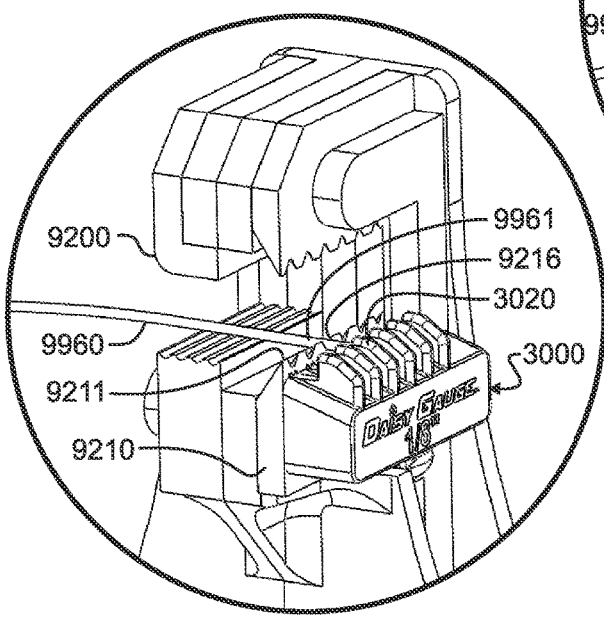

FIGS. 47A-47C further detail and illustrate an operational example of the embodiments consistent with those shown in FIGS. 46A-46H.

As shown in FIG. 47A, a perspective view of the depth gauge 3000 is depicted, positioned directly in front of a lower stripping blade 9210 and multifaceted portion of a semi-automatic wire stripper 9200, similar to the Stripmaster® brand of wire strippers produced by Ideal® Tool Company in Sycamore, IL, comprising a lower stripping blade 9210, a blade retaining plate 9230, and retaining hardware 9240, to which the depth gauge 3000 will magnetically couple.

As shown in FIG. 47B, an enlarged sectional view of the depth gauge 3000 and semi-automatic wire strippers 9200 shown in FIG. 45A is depicted, wherein the depth gauge 3000 is magnetically coupled to the semi-automatic wire stripper 9200, with the depth gauge 3000 coupling face (see 3013a in FIG. 46B) flush against the lower stripping blade 9210 proximal surface. The proximal end 9961 of a section of 24 gauge coated wire 9960 is placed into the 24 gauge slot 9216 of the lower stripping blade 9210 of the semi-automatic wire stripper 9200, and up against the fiducial 3020 abutment face (see 3023 in FIG. 47C) of the depth gauge 3000, enabling the coated wire 9960 to be precisely stripped of 1/8" of its coating.

As shown in FIG. 47C, an enlarged sectional view from the opposite side of the depth gauge 3000 and semi-automatic wire strippers 9200 shown in FIG. 47B is depicted, wherein the proximal end 9961 of the 24 gauge coated wire 9960 passes through the 24 gauge slot 9216 of the semi-automatic wire stripper 9200 lower stripping blade 9210 and abuts the wire abutment face 3023. The semi-automatic wire stripper 9200 is then actuated on the 24 gauge coated wire 9960 is set into the 24 gauge slot, extending past the stripping edge 9211 to the fiducial 3020, the wire stripper 9200 cuts a portion of the coating of the 24 gauge coated wire 9960 extending from the stripping edge 9211 to the fiducial 3020 equal the distance between the stripping edge 9211 and the fiducial 3020, thus stripping 1/8" of coating from the 24 gauge coated wire 9960. Once the coating has been stripped from the coated wire 9960, the trapped 1/8" section of stripped coating will need to be pushed from between the lower stripping blade 9210 and the abutment face 3023, thus causing the coating section to fall away from the semi-automatic wire stripper 9200 and depth gauge 3000. Typically, the next wire to be stripped is easily used for this task. In order to strip a different gauge of coated wire, a second gauge coated wire is passed through a second gauge slot and abuts a second fiducial 3020 defining a 1/8" strip depth between the stripping edge 9211 and the second fiducial 3020, whereby the wire stripper is actuated on the on the second gauge coated wire, the wire stripper 9200 cuts a portion of the coating of the second gauge coated wire extending from the stripping edge 9211 to the fiducial 3020 equal the distance between the stripping edge 9211 and the fiducial 3020, whereby the second gauge coated wire is then pulled out from between the closed wire stripper 9200 jaws 9210, 9220 thus stripping a 1/8" length of coating from the proximal end of the second gauge coated wire.

For illustration purposes and not for limitation, another example embodiment of the depth gauge is shown in FIGS. 48A-48H, 49A-49C.

As shown in FIG. 48A, a perspective view of another embodiment of the depth gauge 3100 is depicted, wherein this particular embodiment is similar to the depth gauge 3000 in FIGS. 46A, 46B, except that rather than having a plurality of vertical planar fiducials (see 3020 in FIG. 46A, 46B) a single horizontal planar fiducial 3120 is integrally formed with, and supported on each end by, fiducial supports 3160 which are integrally formed onto the gauge body 3110 top side surface 3112 wherein the fiducial 3120 is aligned in front of a plurality of slots (see example 24 gauge slot 9216 in FIG. 49B) along the lower stripping blade stripping edge (see 9210, 9211 in FIG. 49B), while the gauge body 3110 top side surface 3112 is sloped downward and away from the coupling face (see 3113a in FIG. 48B) to the proximal surface 3111, thus creating a discharge chute 3170. The gauge body 3110, having a distal end and a proximal end, the fiducial 3120, and fiducial supports 3160, are formed integrally as one piece, made of a rigid material such as, but not limited to, plastic or metal alloy. This new configuration is designed to allow any stripped sections of wire coating to fall away from the wire stripper more easily. At least one visual identifier 3140 is marked on the gauge body 3110, wherein the visual identifier 3140 comprises a marking on a surface of the depth gauge 3100 and the visual identifier 3140 conveys information regarding a position of the fiducial 3120 relative to a coupling face 3113a of the gauge body 3100.

The depth gauge 3100 is designed to be magnetically coupled to a semi-automatic wire stripper (see 9200 in FIG. 49A), similar to the Stripmaster® brand of wire strippers from Ideal® Tool Company, and in this example embodiment, the depth gauge 3100 is designed to aid in precisely stripping 5/32" of coating from a coated wire when used as intended. Additional configurations of different wire coating strip depths would be produced as particular applications require.

As shown in FIG. 48B, a perspective view of the distal end of the depth gauge 3100 is depicted, wherein the fiducial 3120 spans the two fiducial supports 3160 that protrude vertically from the gauge body 3110. The distance between the fiducial 3120 and the coupling face 3113 comprises a plurality of distances between the plurality of fiducials 3120 and the coupling face 3113, wherein the plurality of fiducials 3120 comprise a plurality of abutment faces 3123 positioned to define a plurality of distances between the coupling face 3113 and the plurality of abutment faces 3123. The distance between the fiducial 3120 wire abutment face 3123 and the gauge body 3110 coupling face 3113a, which are parallel to each other, is the strip depth, which is the length of coating that will be stripped from a coated wire when the depth gauge 3100 is used as intended, wherein this example the strip depth is 5/32".

Figure 49A:
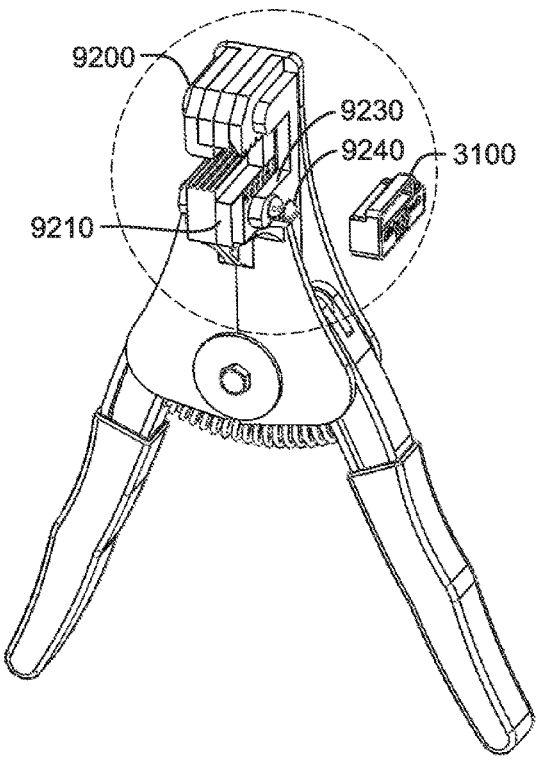
FIGS. 49A-49C show an example method of using the depth gauge shown in FIGS. 48A-48H.

The gauge body 3110 is shelled out for injection molding or 3D printing, while recesses 3115, 3116a, 3116b are incorporated in order to allow the coupling face 3113a to mate with the proximal face of the semi-automatic wire stripper lower stripping blade (see 9200, 9210 in FIG. 49B) and allow the coupling face 3113b to mate with the blade retaining plate (see 9230 in FIG. 49A). While this example embodiment of the depth gauge 3100 is shelled out, the depth gauge 3100 could be machined or cast as a solid part, as a particular application may require. Two recesses 3114a, 3114b are formed into the coupling face 3113b, into which two magnets 3150a, 3150b are disposed. The recess 3114b completely surrounds the side surface of the magnet 3150b, while the recess 3114a is partially merged with the recess 3116a, thus causing the recess 3114a to surround a portion of the magnet 3150a. However, configurations of the shelled out body 3110 recesses, and the size quantity location and shape of magnets, may vary as a particular application may require. The width of the gauge body 3100 is typically the same width of the lower stripping blade.

Additional views of the depth gauge 3100 are shown in FIG. 48C with a front side elevational view thereof, FIG. 48D with a back side elevational view thereof, FIG. 48E with a right side elevational view thereof, FIG. 48F with a proximal plan view thereof, FIG. 48G with a left side elevational view thereof, and FIG. 48H with a distal plan view thereof.

Figure 49C:
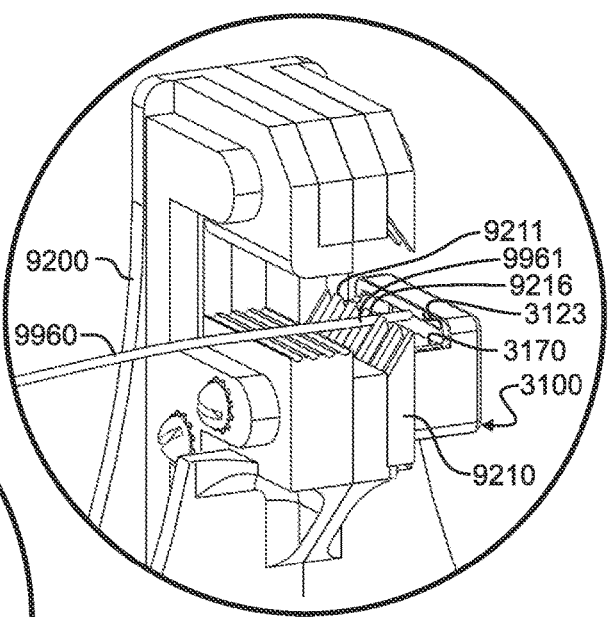
Figure 49B:
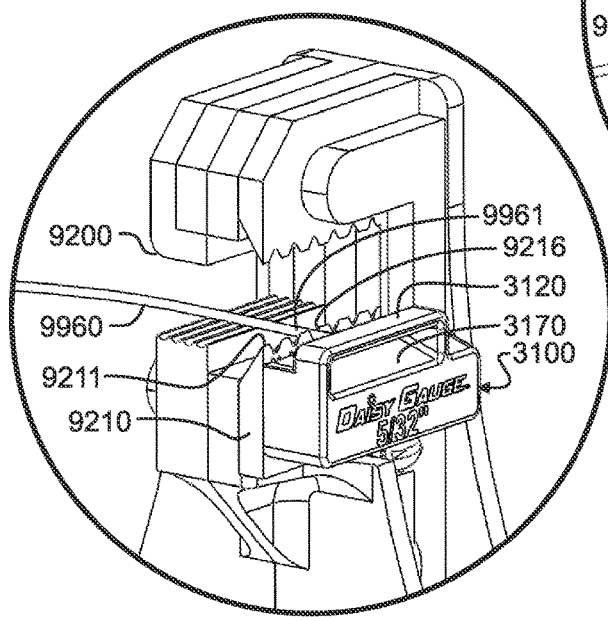

FIGS. 49A-49C further detail and illustrate an operational example of the embodiments consistent with those shown in FIGS. 48A-48H.

As shown in FIG. 49A, a perspective view of the depth gauge 3100 embodiment is depicted, positioned directly in front of a lower stripping blade 9210 and multifaceted portion of a semi-automatic wire stripper 9200, similar to the Stripmaster® brand of wire strippers produced by Ideal® Tool Company in Sycamore, IL, comprising a lower stripping blade 9210, a blade retaining plate 9230, and retaining hardware 9240, to which the depth gauge 3100 will magnetically couple.

As shown in FIG. 49B, an enlarged sectional view of the depth gauge 3100 and semi-automatic wire strippers 9200 shown in FIG. 49A is depicted, wherein the depth gauge 3100 is magnetically coupled to the semi-automatic wire stripper 9200, with the depth gauge 3100 coupling face (see 3113a in FIG. 48B) flush against the lower stripping blade 9210 proximal surface. The proximal end 9961 of a section of 24 gauge coated wire 9960 is placed into the stripping edge 9211 24 gauge slot 9216 of the lower stripping blade 9210 of the semi-automatic wire stripper 9200, and abuts the fiducial 3120 wire abutment face (see 3123 in FIG. 49C) of the depth gauge 3100, enabling the coated wire 9960 to be precisely stripped of 5/32" of its coating.

As shown in FIG. 49C, an enlarged sectional view from the opposite side of the depth gauge 3100 and semi-automatic wire strippers 9200 shown in FIG. 49B is depicted, wherein the proximal end 9961 of the 24 gauge coated wire 9960 passes through the stripping edge 9211 24 gauge slot 9216 of the semi-automatic wire stripper 9200 lower stripping blade 9210 and abuts the wire abutment face 3123.

The semi-automatic wire stripper 9200 is then actuated on the 24 gauge coated wire 9960 extending past the stripping edge 9211 to the fiducial 3120, the wire stripper 9200 cuts a portion of the coating of the 24 gauge coated wire 9960 extending from the stripping edge 9211 to the fiducial 3120 equal the distance between the stripping edge 9211 and the fiducial 3120, thus stripping 5/32" of coating from the proximal end 9961 end of 24 gauge coated wire 9960. Once the coating has been stripped from the coated wire 9960, the trapped 5/32" section of stripped coating will need to be pushed from between the lower stripping blade 9210 and the abutment face 3123, thus causing the coating section to fall down through the discharge chute 3170 (also see 3170 in FIG. 49B) and away from the wire stripper 9200 and depth gauge 3100. Typically, the next wire to be stripped is easily used for this task. In order to strip a different gauge of coated wire, a second gauge coated wire is passed through a second stripping edge 9211 gauge slot and abuts the fiducial 3120 abutment face 3123 defining a 5/32" strip depth between the stripping edge 9211 and the fiducial 3120 abutment face 3123, whereby the wire stripper is actuated on the on the second gauge coated wire, the wire stripper 9200 cuts a portion of the coating of the second gauge coated wire extending from the stripping edge 9211 to the fiducial 3120 equal the distance between the stripping edge 9211 and the fiducial 3120, whereby the second gauge coated wire is then pulled out from between the closed wire stripper 9200 jaws 9210, 9220 thus stripping a 5/32" section of coating from the proximal end of the second gauge coated wire.

For illustration purposes and not for limitation, another example embodiment of the depth gauge is shown in FIGS. 50A-50H, 51A-51C.

Figure 50B:
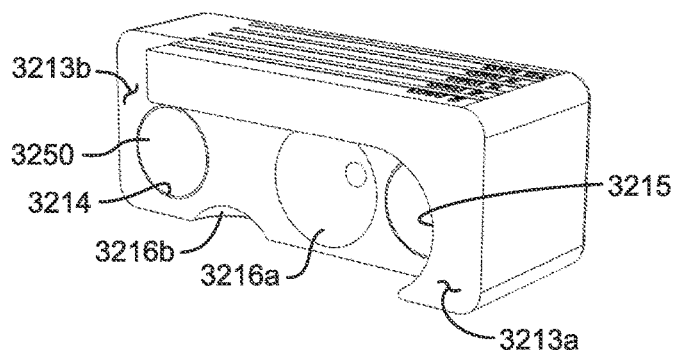
FIGS. 50A-50H show another example embodiment of a depth gauge having a magnetic coupling means and a gauge body coupling face contoured to conform to the irregular multifaceted surface of a tool, while having a plurality of visual fiducials and visual indicators marked on the top side surface of the gauge body positioned parallel with the coupling faces of the gauge body.
Figure 50A:
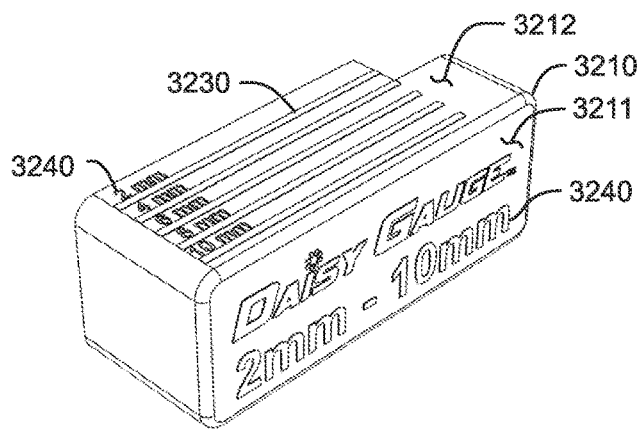

As shown in FIG. 50A, a perspective view of another embodiment of the depth gauge 3200 is depicted, typically comprising a rectangular gauge body 3210, having a distal end and a proximal end, made of a rigid material such as, but not limited to, plastic or metal alloy, wherein its longest edge is positioned horizontally and its widest face, the proximal face 3211, is positioned vertically. At least one visual identifier 3240 is marked on the gauge body 3210, wherein the visual identifier 3240 comprises a marking on a surface of the depth gauge 3200 and the visual identifier 3240 conveys information regarding a position of the fiducials 3230 relative to a coupling face (see 3213a in FIG. 50B) of the gauge body 3200. This example embodiment of the depth gauge 3200 is designed to incorporate the use of visual fiducials 3230 in order to aid in stripping between 2 mm to 10 mm of coating from the end of a coated wire with a choice of five different strip depths in 2 mm increments. The distance between the fiducial 3230 and the coupling face 3213a comprises a plurality of distances between the plurality of fiducials 3230 and the coupling face 3213a, wherein the plurality of fiducials 3230 positioned to define a plurality of distances between the coupling face 3213a and the plurality of fiducials 3230. A plurality of linear visual fiducials 3230 are marked onto the gauge body 3210 orthogonal face 3212 and are parallel with the coupling face (see 3213a in FIG. 50B), each at a different distance from the coupling face (see 3213a in FIG. 50B) while defining a particular position for an end of a coated wire when the coated wire is aligned with a fiducial 3230. Each fiducial 3230 has, located proximal to it, at least one visual identifier 3240 marked onto the gauge body 3210 orthogonal face 3212 which conveys information regarding a position of the fiducial relative to the coupling face (see 3213a in FIG. 50B) of the gauge body 3210 such as, but not limited to, indicating the distance between the fiducial 3230 and the gauge body 3210 coupling face (see 3213a in FIG. 50B), or may convey any other information a particular application may require. The strip depths for this example embodiment of the depth gauge 3200 are between 2 mm and 10 mm which are the distances between the coupling face (see 3213a in FIG. 50B) and each fiducial 3230, and are also the lengths of coating that will be stripped from coated wires when used as intended with a semi-automatic wire stripper, but may be designed for any strip depth a particular application may require. Additionally, any system of measurement, and quantity or length of strip depths, may be incorporated into the design.

Figure 51B:
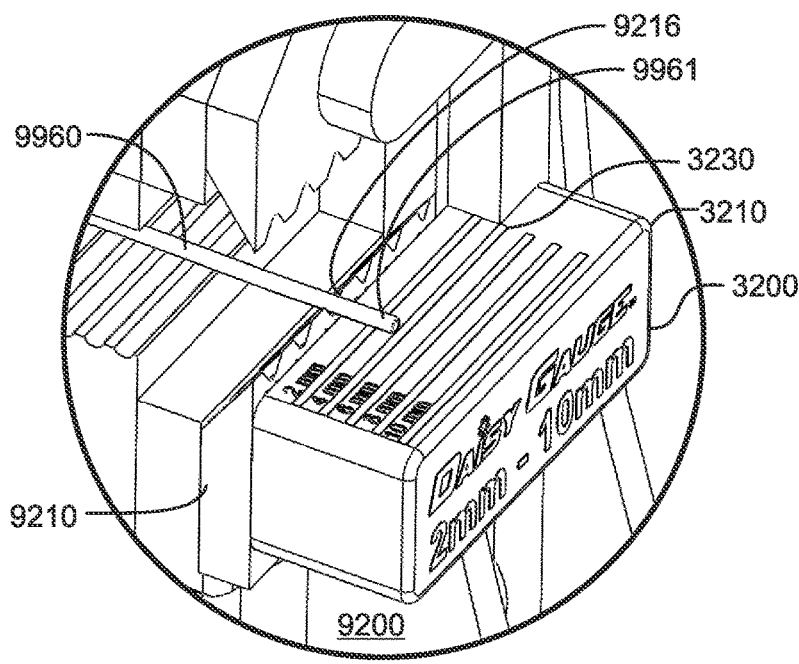
FIGS. 51A-51B show an example method of using the depth gauge shown in FIGS. 50A-50H.
Figure 51A:
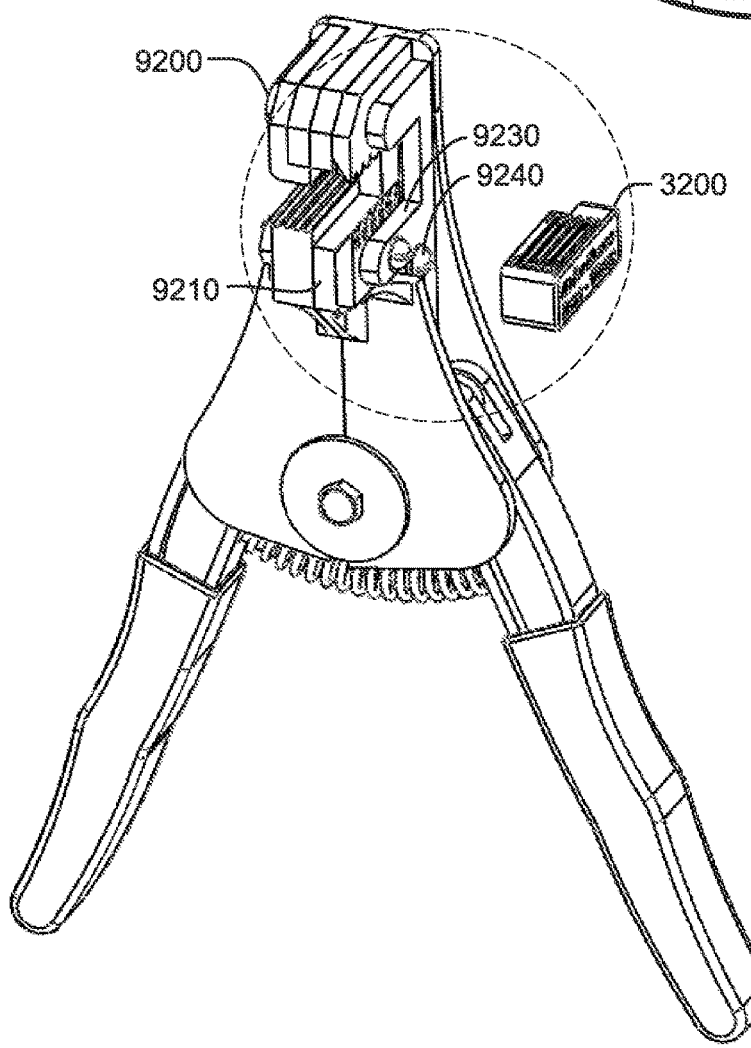

As shown in FIG. 50B, a perspective view of the multifaceted distal end of the depth gauge 3200 embodiment is depicted, comprising a first coupling face 3213a, and a second coupling face 3213b created by a retaining plate recess 3215 designed to receive and contour a portion of a semi-automatic wire stripper blade retaining plate (see 9200, 9230 in FIG. 51A), wherein the first coupling face 3213a couples to the proximal surface of a semi-automatic wire stripper lower stripping blade (see 9200, 9210 shown in FIG. 51A) and the second coupling face 3213b couples to the proximal surface of the semi-automatic wire stripper blade retaining plate (see 9200, 9230 in FIG. 51A). Two hardware recesses 3216a, 3216b formed into the coupling face 3213b are designed to receive semi-automatic wire stripper retaining hardware (see 9200, 9240 in FIG. 51A), while two magnets 3250 are disposed into two magnet recesses 3214 which are also formed into the coupling face 3213b. The two magnets 3250 magnetically couple the depth gauge 3200 to the semi-automatic wire stripper (see 9200 in FIG. 51A), and may be of any quantity, size, or shape, and mounted in any location, as a particular application may require. The multifaceted contours of the distal end of the depth gauge 3200 are used only as an example and may be of any configuration a particular application may require. The width of the gauge body 3200 is typically the same width of the lower stripping blade.

Figure 50C:
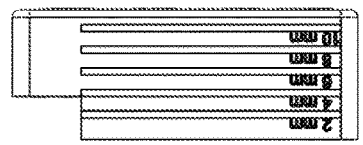
Figure 50D:
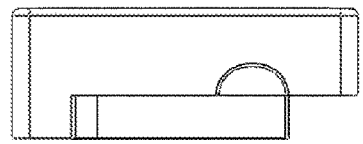
Figure 50E:
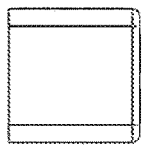
Figure 50F:
Figure 50G:
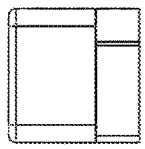
Figure 50H:
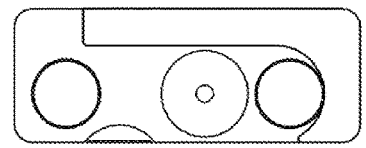

Additional views of the depth gauge 3200 are shown in FIG. 50C with a front side elevational view thereof, FIG. 50D with a back side elevational view thereof, FIG. 50E with a right side elevational view thereof, FIG. 50F with a proximal plan view thereof, FIG. 50G with a left side elevational view thereof, and FIG. 50H with a distal plan view thereof.

FIGS. 51A-51C further detail and illustrate an operational example of the embodiments consistent with those shown in FIGS. 50A-50H.

FIG. As shown in 51A, a perspective view of the depth gauge 3200 embodiment is depicted, positioned directly in front of a lower stripping blade 9210 and multifaceted portion of a semi-automatic wire stripper 9200, similar to the Stripmaster® brand of wire strippers produced by Ideal® Tool Company in Sycamore, IL, the semi-automatic wire stripper 9200 comprising a lower stripping blade 9210, a blade retaining plate 9230, and retaining hardware 9240, to which the depth gauge 3200 will magnetically couple.

As shown in FIG. 51B, an enlarged sectional view of the depth gauge 3200 and semi-automatic wire strippers 9200 shown in FIG. 51A is depicted, wherein the depth gauge 3200 is magnetically coupled to the semi-automatic wire strippers 9200, with the depth gauge 3200 coupling face (see 3213a in FIG. 50B) flush against the lower stripping blade 9210 proximal surface. The proximal end 9961 of a section of 24 gauge coated wire 9960 is placed into the 24 gauge slot 9216 of the lower stripping blade 9210 of the semi-automatic wire stripper 9200, and up to the 4 mm fiducial 3230 of the depth gauge 3200, enabling the coated wire 9960 to be stripped of 4 mm of its coating.

The semi-automatic wire stripper 9200 is then actuated on the 24 gauge coated wire 9960 extending past the stripping edge 9211 to the fiducial 3230, the wire stripper 9200 cuts a portion of the coating of the 24 gauge coated wire 9960 extending from the stripping edge 9211 to the fiducial 3230 equal the distance between the stripping edge 9211 and the fiducial 3230, thus stripping 4 mm of coating from the 24 gauge coated wire 9960. Once the coating has been stripped from the coated wire 9960, the semi-automatic wire stripper 9200 is tipped approximately 45-90 degrees, causing the 4 mm section of stripped coating to fall away from the depth gauge 3200. In order to strip a different length of wire coating, from a different gauge of coated wire, a second gauge coated wire is passed through the a different gauge slot and visually aligned with a second fiducial 3230 defining a second strip depth between the stripping edge 9211 and the second fiducial 3230, whereby the wire stripper is actuated on the on the second gauge coated wire, the wire stripper 9200 cuts a portion of the coating of the second gauge coated wire extending from the stripping edge 9211 to the second fiducial 3230 equal the distance between the stripping edge 9211 and the second fiducial 3230, whereby the second gauge coated wire is then pulled out from between the closed wire stripper 9200 jaws 9210, 9220 thus stripping a second and different length of coating from the proximal end of the second gauge coated wire.

For illustration purposes and not for limitation, another example embodiment of the depth gauge 3300 is shown in FIGS. 52A-52H, 53, 54 as a slight variation of the depth gauge 1400 shown in FIGS. 6A-6H, 7A, 7B.

Figure 52A:
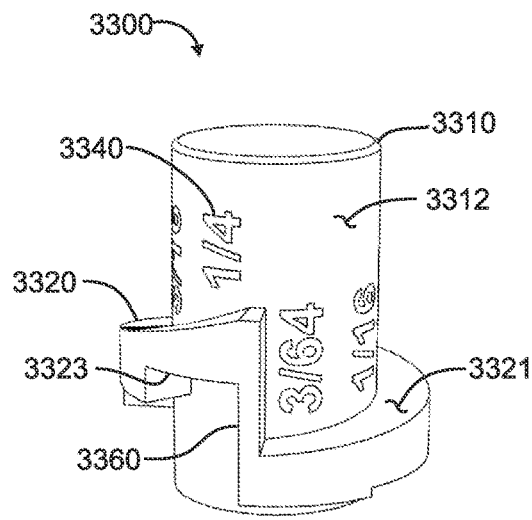
FIGS. 52A-52H show another example embodiment of a depth gauge having a helical fiducial comprising a continuous circumferential protrusion that wraps around the gauge body and serves as a compound fiducial having a plurality of abutment faces formed into its distal surface, while a plurality of ribs located inside the gauge body recess serve as a physical stop for a magnet.

As shown in FIG. 52A, a perspective view of the depth gauge 3300 is depicted, incorporating a compound fiducial 3320, comprising a continuous circumferential protrusion integrally formed with the gauge body 3310 outer surface 3312, defining a plurality of fiducials protruding from the outer surface 3312 of the gauge body 3310 with a connecting rib 3360 integrally formed with, and joining the two ends of the compound fiducial 3320. The proximal face 3321 of the compound fiducial 3320 is smooth in the form of a helical inclined plane, the pitch of which may vary in order to follow the positioning of the various wire abutments 3323. The gauge body 3310, having a distal end and a proximal end, and the fiducial 3320, are formed integrally as one piece, made of a rigid material such as, but not limited to, plastic or metal alloy.

The purpose for this type of compound fiducial 3320 and wire abutment 3323 configuration is to make the process of creating drafts for injection molding less complex than other embodiments of the depth gauge, in addition to enhancing mold flow when the part is injection molded. Alternately, the proximal face 3321 of the compound fiducial 3320 may also have planar facets formed into its surface as well, mimicking the positioning of the various wire abutments 3323, or may be of any other shape a particular application may require. Visual identifiers 3340 are marked onto the outer surface 3312 of the gauge body 3310 proximal to their respective wire abutments 3323.

Figure 52B:
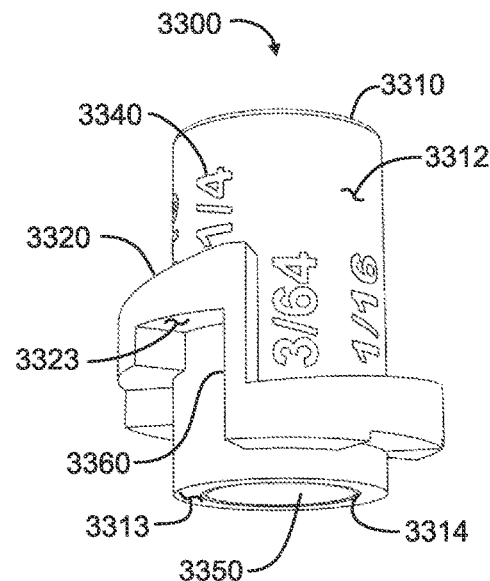

As shown in FIG. 52B, a lower perspective view of the depth gauge 3300 in FIG. 52A is depicted, affording a clear view of the distal end of the depth gauge 3300 and compound fiducial 3320 resembling an inverted spiral staircase. A plurality of planar wire abutments 3323 are formed into the distal face of the compound fiducial 3320 and are parallel with the coupling face 3313 of the gauge body 3310, and each wire abutment 3323 is positioned at a specific distance from the coupling face 3313 defining a distance from the coupling face 3313 to the abutment face 3323, the distance will determine the precise length of coating that will be stripped from a coated wire when used as intended with a pair of shear type wire strippers. The distance between the fiducial 3320 and the coupling face 3313 comprises a plurality of distances between the plurality of fiducials 3320 and the coupling face 3313, wherein the plurality of fiducials 3320 comprise a plurality of abutment faces 3323 positioned to define a plurality of distances between the coupling face 3313 and the plurality of abutment faces 3323.

The distance between the compound fiducial 3320 abutment face 3323 and the gauge body 3310 coupling face 3313 is equal to the distance between the compound fiducial 3320 abutment face 3323 and the stripping edge of a wire stripper when coupled to the wire stripper as intended with the wire abutment 3323 positioned proximal to the stripping edge. The relation in depth between one pair of adjacent wire abutments 3323 and another pair of adjacent wire abutments 3323 may be the same, or may vary, depending on the requirements of a particular application. Additionally, a magnet 3350 is disposed into a recess 3314 formed into the distal end of the gauge body 3300. Visual indicators 3314 are marked on the outer surface 3312 of the gauge body 3310 proximal to their respective wire abutments 3320 and indicate the length of coating that will be stripped from a coated wire when used as intended with a pair of shear type wire strippers.

In an operational example, the coupling face 3313 of the depth gauge 3300 is magnetically coupled to the flat side of the lower jaw of a pair of shear type wire strippers with the ³⁄₁₆" abutment face 3323 is positioned proximal to the 24 gauge slot with a 24 gauge coated wire positioned in the 24 gauge slot of the stripping edge of the wire stripper and extending up to the depth gauge 3300 fiducial 3320 abutment face 3323. The wire stripper is actuated on the 24 gauge coated wire extending past the stripping edge to the abutment face 3323, the wire stripper cuts a portion of the coating of the 24 gauge coated wire extending from the stripping edge to the abutment face 3323 equal the distance between the stripping edge and the abutment face 3323, the 24 gauge coated wire is then pulled from between the closed jaws, wherein a 3/16" section of coating is stripped from the 24 gauge coated wire equal to the 3/16" distance between the stripping edge and the abutment face 3323 of the fiducial 3320. In order to strip a different length of coating from a coated wire the depth gauge 3300 is rotated around its longitudinal axis, while coupled to the wire stripper lower jaw, so that a second fiducial is aligned proximal to a second gauge slot of the stripping edge. A section of the second gauge coated wire is positioned into the second gauge slot extending past the stripping edge with the proximal end of the second gauge coated wire abutting the abutment face of the second fiducial. The wire stripper is actuated on the second gauge coated wire, cutting into the coating, wherein the second gauge coated wire is then pulled from between the closed jaws of the wire stripper, whereby a second length section of coating is stripped from the end of second gauge coated wire equal to the distance between the stripping edge and the abutment face of the second fiducial.

Figure 52C:
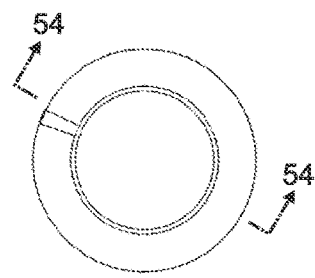
Figure 52D:
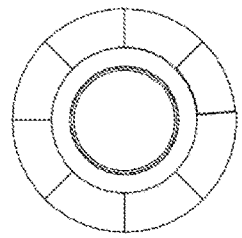
Figure 52E:
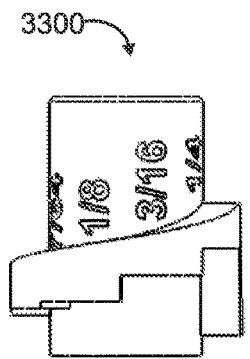
Figure 52F:
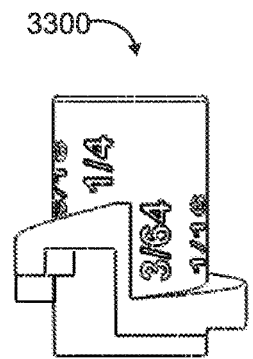
Figure 52G:
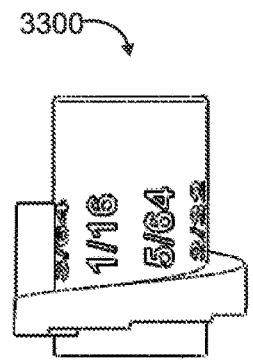
Figure 52H:
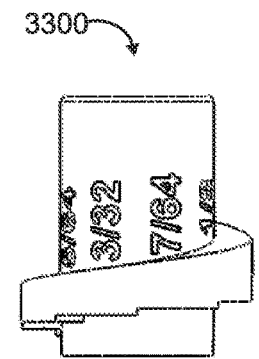

Additional views of the depth gauge 3300 are shown in FIG. 52C with a proximal plan view thereof, FIG. 52D with a distal plan view thereof, FIG. 52E with a left side elevational view thereof, FIG. 52F with a front side elevational view thereof, FIG. 52G with a right side elevational view thereof, and FIG. 52H with a back side elevational view thereof.

Figure 53:
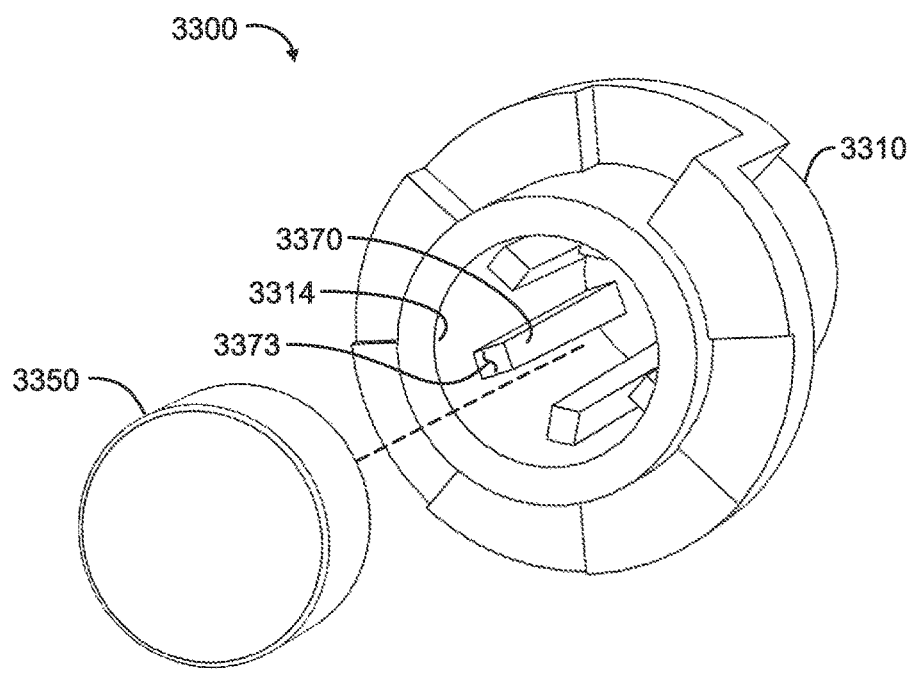
FIG. 53 is an exploded view of the depth gauge and its magnet shown in FIGS. 52A-52H.

As shown in FIG. 53, an exploded view of the depth gauge 3300 is depicted, as seen from the distal end with the magnet 3350 removed from the gauge body 3310 recess 3314, revealing the interior of the recess 3314 formed into the distal end of the gauge body 3310 and extending to the proximal end of the gauge body 3310. A plurality of physical stops 3370 are integrally formed on the inside surface of the recess 3314 extending from the proximal end of the recess 3314 to a point where the proximal surface of the magnet 3350 will be positioned when inserted into the recess 3314. The distal faces 3373 of the physical stops 3370 serve to prevent the magnet 3350 from being inserted into the recess 3314 further than required for a particular application, thus keeping the magnet 3350 positioned at the distal end of the gauge body 3310.

Figure 54:
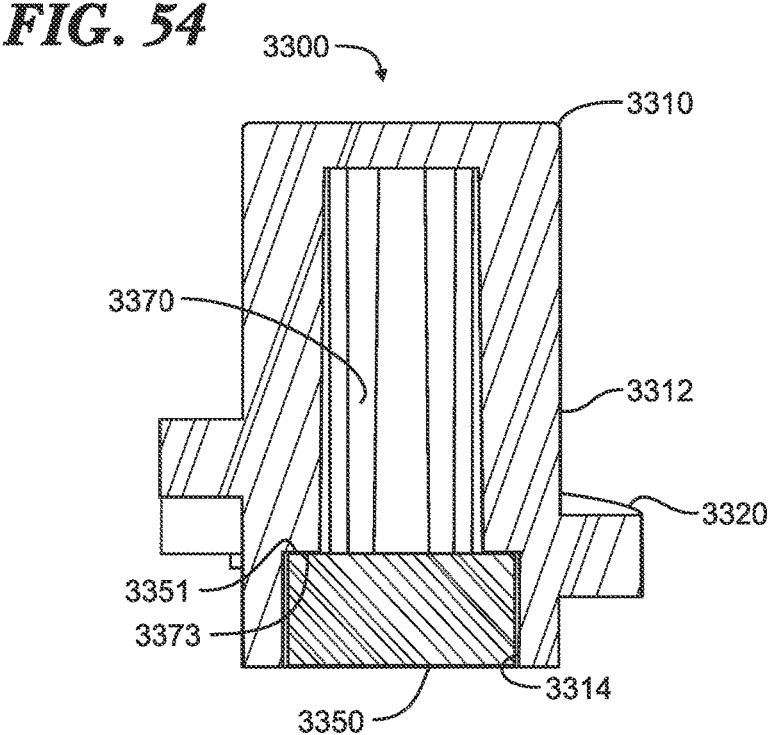
FIG. 54 is cross-sectional view 54-54 of the depth gauge in FIG. 52C.
Figure 55:
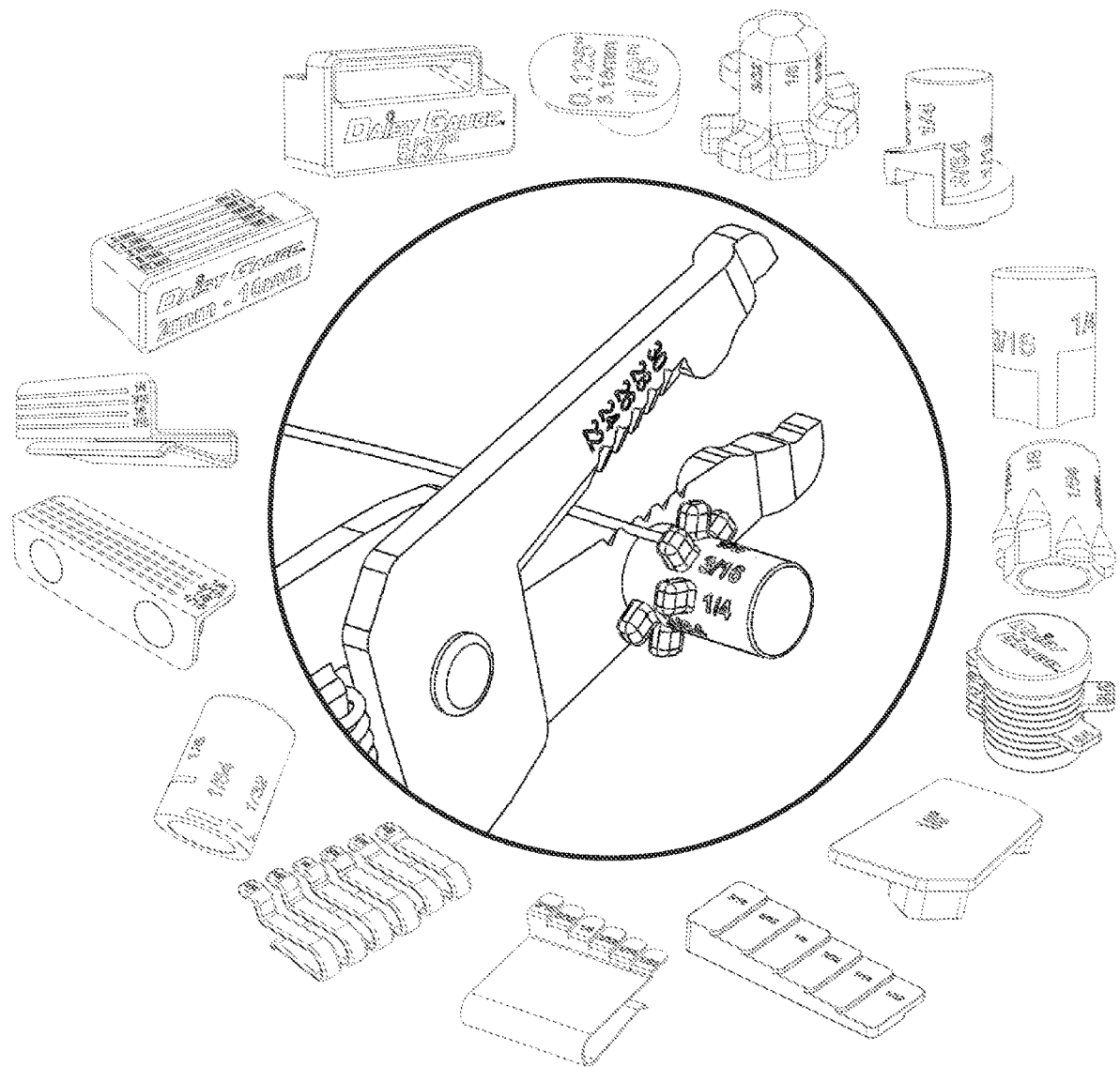
FIG. 55 is a collage of many of the various embodiments of the depth gauge described herein.

As shown in FIG. 54, the cross-sectional view 54-54 of the depth gauge 3300 in FIG. 52C is depicted, and illustrates how a magnet 3350 would be disposed into, and positioned at, the distal end of the recess 3314 of the gauge body 3310. The magnet 3350 is secured into the open end of the recess 3314 of the gauge body 3310 by bonding, over molding, press fitting, or by any other means a particular application may require. The magnet is prevented from being inserted deeper into the recess 3314 by the distal faces 3373 of the physical stops 3370 abutting the proximal face of the magnet 3351. The compound fiducial 3320 is visible protruding from the outer surface 3312 of the gauge body 3310.

For illustration purposes and not for limitation, FIG. 52 is a collage of many of the embodiments of the depth gauge described herein.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

I claim:

1. A depth gauge configured to be magnetically coupled directly to one side of a blade, having a stripping edge, of a wire stripper for stripping an electrical wire, the depth gauge comprising:
   a gauge body and a fiducial;
   the gauge body having a proximal end and a distal end;
   the gauge body comprises a magnet having a proximal end and a distal end;
   whereby the magnet extends from the distal end of the gauge body to the proximal end of the gauge body;
   the distal end of the gauge body having a coupling face configured to be magnetically coupled directly to only the one side of the blade of the wire stripper;
   the distal face of the fiducial is coupled to the proximal end of the gauge body whereby the fiducial extends generally perpendicular to a longitudinal axis of the gauge body and parallel with the coupling face of the gauge body;
   a mating portion of a distal face of the fiducial is bonded to the proximal end of the gauge body in a fixed relationship;
   the fiducial is wider than the gauge body, creating an overhanging portion of a distal face of the fiducial;
   whereby the fiducial defines a fixed distance between the overhanging portion of the distal face of the fiducial and the coupling face of the gauge body;
   the fiducial is a physical abutment configured to engage an end of the electrical wire;
   the overhanging portion of the distal face of the fiducial is an abutment face; and
   whereby the abutment face of the fiducial is parallel with a surface plane of the one side of the blade of the wire stripper when the depth gauge is magnetically coupled to only the one side of the blade of the wire stripper.

2. The depth gauge of claim 1 wherein:
   the gauge body configured to magnetically couple to the blade of the wire stripper whereby the fiducial is aligned proximal to the stripping edge of the wire stripper; and
   the fiducial defines the fixed distance between the stripping edge and the fiducial whereby when the wire stripper is actuated on a coated wire extending past the stripping edge to the fiducial, the wire stripper cuts a portion of a coating of the coated wire extending from the stripping edge to the fiducial equal in length to the fixed distance between the stripping edge and the fiducial.

3. The depth gauge of claim 2 wherein:
   the gauge body and fiducials are formed integrally as one rigid piece;
   the gauge body having a distal end and a proximal end;
   the distal end of the gauge body having a recess;
   the magnet is disposed into the recess;
   the fiducial comprises a plurality of fiducials;
   the plurality of fiducials protruding from an outer surface of the gauge body;
   the plurality of fiducials comprise a plurality of abutment faces positioned to define a plurality of distances between the coupling face and the plurality of abutment faces;
   the wire stripper is a shear type wire stripper; and
   the depth gauge is configured to be rotated around its longitudinal axis on the wire stripper whereby a first distance is defined by a first abutment face of a first fiducial aligned proximal to the stripping edge and when the depth gauge is rotated a second distance is defined by a second abutment face of a second fiducial aligned proximal to the stripping edge of the wire stripper.

4. The depth gauge of claim 2 wherein:
the gauge body having a proximal face at the proximal end of the gauge body and the coupling face at its distal end;
the fiducial comprises an abutment made of a flat rigid material;
the fiducial having a proximal face and a distal face;
the portion of the distal face of the fiducial is bonded to the proximal face of the gauge body creating a fixed relationship between the fiducial and the gauge body and bonding the fiducial and the gauge body as one rigid piece;
the fiducial has a cross-sectional profile larger than a cross-sectional profile of the gauge body wherein both cross-sections are parallel with their respective proximal faces and wherein an overhang of the fiducial is created when bonded to the proximal face of the gauge body;
the overhang of the fiducial comprises a physical abutment;
the distal face of the overhang of the fiducial comprising an abutment face positioned to define the fixed distance between the coupling face of the gauge body and the abutment face of the fiducial;
the wire stripper is a shear type wire stripper; and
the depth gauge is configured to be magnetically coupled to the wire stripper whereby the fixed distance is defined by the abutment face of the fiducial when the fiducial is aligned proximal to the stripping edge of the wire stripper.

5. The depth gauge of claim 2 wherein:
the gauge body and fiducial are bonded together as one rigid piece;
a visual identifier is marked on a proximal surface of the depth gauge;
the fiducial protrudes past an outer surface of the gauge body;
the fiducial comprising an abutment face positioned to define the fixed distance between the coupling face of the gauge body and the abutment face of the fiducial;
the wire stripper is a shear type wire stripper; and
the depth gauge is configured to be magnetically coupled to the wire stripper whereby the fixed distance is defined by the abutment face of the fiducial when the abutment face is aligned proximal to the stripping edge of the wire stripper.

6. The depth gauge of claim 2 wherein:
the gauge body and fiducial are formed integrally as one rigid piece;
the gauge body having a cavity formed into the distal end of the gauge body into which a magnet is disposed;
the fiducial comprising an abutment face positioned to define a distance between the coupling face of the gauge body and the abutment face of the fiducial;
the wire stripper is a shear type wire stripper; and
the depth gauge is configured to be magnetically coupled to the wire stripper whereby the distance is defined by an abutment face of the fiducial when the fiducial is aligned proximal to the stripping edge of the wire stripper.

7. The depth gauge of claim 2 wherein:
the fiducial comprises a plurality of fiducials;
the gauge body and fiducials are formed integrally as one rigid piece;
the gauge body having a recess formed into a proximal end extending to a distal end;
the magnet is disposed into the recess;
a retaining cap is mechanically secured over an open end of the recess; and
a plunger extending from a distal face of the retaining cap, engages the magnet, thus holding it at the distal end of the gauge body;
the fiducial comprises a plurality of fiducials protruding from an outer surface of the gauge body;
the distance between the fiducial and the coupling face comprises a plurality of distances between the plurality of fiducials and the coupling face;
the plurality of fiducials comprising a plurality of abutment faces positioned to define a plurality of distances between the coupling face and the plurality of abutment faces;
a plurality of visual identifiers are marked on the gauge body proximal to their respective fiducials;
the wire stripper is a shear type wire stripper; and
the depth gauge is configured to be rotated around its longitudinal axis on the wire stripper whereby a first distance is defined by a first abutment face of a first fiducial aligned proximal to the stripping edge and when the depth gauge is rotated a second distance is defined by a second abutment face of a second fiducial aligned proximal to the stripping edge of the wire stripper.

8. The depth gauge of claim 2 wherein:
the fiducial comprises a plurality of fiducials;
the gauge body and fiducials are formed integrally as one rigid piece;
the gauge body and fiducials are a magnet;
the fiducials comprise a plurality of abutment channels on a surface of the gauge body;
the plurality of fiducials comprising a plurality of abutment faces positioned to define a plurality of distances between the coupling face and the plurality of abutment faces;
a plurality of visual identifiers are marked on the gauge body proximal to their respective fiducials;
the wire stripper is a shear type wire stripper; and
the depth gauge is configured to be rotated around its longitudinal axis on the wire stripper whereby a first distance is defined by a first abutment face of a first fiducial aligned proximal to the stripping edge and when the depth gauge is rotated a second distance is defined by a second abutment face of a second fiducial aligned proximal to the stripping edge of the wire stripper.

9. The depth gauge of claim 2 wherein:
the fiducial comprises a plurality of fiducials;
the gauge body and fiducials are formed integrally as one rigid piece;
the gauge body having a recess formed into a distal end extending to a proximal end;
a physical stop is formed inside the recess from a proximal end of the recess extending to a depth at which a proximal face of the magnet is to be set;
the magnet is disposed into the recess against the physical stop;
a retaining cap is mechanically secured into an open end of the recess;
the magnet is retained inside the recess by the retaining cap;

the fiducials comprising a planar end face of an abutment channel on a surface of the gauge body and a protrusion on an outer surface of the gauge body, combining to form a fiducial;

the abutment channel having a planar end face that aligns planar with a planar face of the protrusion, combining to form an abutment face of the fiducial;

the fiducial and abutment face comprise a plurality of fiducials and abutment faces;

the distance between the fiducial and the coupling face comprises a plurality of distances between the plurality of fiducials and the coupling face;

the plurality of fiducials comprising a plurality of abutment faces positioned to define a plurality of distances between the coupling face and the plurality of abutment faces;

a plurality of visual identifiers are marked on the gauge body proximal to their respective fiducials;

the wire stripper is a shear type wire stripper; and the depth gauge is configured to be rotated around its longitudinal axis on the wire stripper whereby a first distance is defined by a first distal abutment face of a first fiducial aligned proximal to the stripping edge and when the depth gauge is rotated a second distance is defined by a second distal abutment face of a second fiducial aligned proximal to the stripping edge of the wire stripper.

10. The depth gauge of claim 2 wherein:

the fiducial comprises a plurality of fiducials;

the gauge body and fiducials are formed integrally as one rigid piece;

the gauge body having a distal end and a proximal end;

the distal end of the gauge body having a recess;

a physical stop is formed inside the recess from a proximal end of the recess extending to a depth at which a proximal face of the magnet is to be set;

the magnet is disposed into the recess against the physical stop;

the fiducial comprises a continuous circumferential protrusion defining a plurality of fiducials protruding from an outer surface of the gauge body;

the plurality of fiducials comprising a plurality of abutment faces positioned to define a plurality of distances between the coupling face and the plurality of abutment faces;

the wire stripper is a shear type wire stripper; and the depth gauge is configured to be rotated around its longitudinal axis on the wire stripper whereby a first distance is defined by a first abutment face of a first fiducial aligned proximal to the stripping edge and when the depth gauge is rotated a second distance is defined by a second abutment face of a second fiducial aligned proximal to the stripping edge of the wire stripper.

11. The depth gauge of claim 10 wherein the continuous circumferential protrusion comprises a single continuous circumferential protrusion winding around the outer surface of the gauge body on a helical trajectory.

12. The depth gauge of claim 1 wherein the fiducial comprises an abutment extending past a surface of the gauge body.

13. The depth gauge of claim 1 wherein the fiducial comprises an abutment created by an abutment channel on a surface of the gauge body.

14. The depth gauge of claim 1 wherein the fiducial comprises an abutment comprising a combination of a protrusion from a surface of the gauge body and an abutment channel on the surface of the gauge body wherein an abutment face of the protrusion and an abutment face of the abutment channel combine to create a single planar abutment face.

15. The depth gauge of claim 1 wherein a reinforcement plate is permanently coupled to an abutment face of the fiducial.

16. The depth gauge of claim 1 wherein the fiducial comprises a marking on a surface of the gauge body.

17. The depth gauge of claim 1 wherein the fiducial comprises a marking on a surface of the gauge body conveying a particular position for an end of a coated wire when the coated wire is aligned with the fiducial.

18. The depth gauge of claim 1 further comprising:

a visual identifier comprises a marking on a surface of the depth gauge; and the visual identifier conveys information regarding a position of the fiducial relative to the coupling face of the gauge body.

19. The depth gauge of claim 18 wherein the visual identifier is located on the fiducial.

20. The depth gauge of claim 1 wherein:

the gauge body is magnetically coupled to the blade of the wire stripper whereby the fiducial is aligned proximal to the stripping edge of the wire stripper; and the fiducial defines the fixed distance between a stripping edge and the fiducial whereby when the wire stripper is actuated on a coated wire extending past the stripping edge to the fiducial, the wire stripper cuts a portion of a coating of the coated wire extending from the stripping edge to the fiducial equal in length to the fixed distance between the stripping edge and the fiducial.

* * * * *